United States Patent [19]
Davies

[11] Patent Number: 6,002,396
[45] Date of Patent: Dec. 14, 1999

[54] SYSTEM AND METHOD FOR DEFINING A PROCESS STRUCTURE FOR PERFORMING A TASK

[76] Inventor: Trevor Bryan Davies, Warwick House, Watling La., Essex CM6 1XX, United Kingdom

[21] Appl. No.: 08/628,741
[22] PCT Filed: Oct. 27, 1994
[86] PCT No.: PCT/GB94/02365
   § 371 Date: May 28, 1996
   § 102(e) Date: May 28, 1996
[87] PCT Pub. No.: WO95/12174
   PCT Pub. Date: May 4, 1995

[30] Foreign Application Priority Data

Oct. 27, 1993 [GB] United Kingdom .................... 9322137

[51] Int. Cl.$^6$ ................. G06F 3/14; G06F 17/60
[52] U.S. Cl. .................. 345/339; 345/965; 345/967; 345/349; 345/356; 705/8; 705/7
[58] Field of Search .................... 345/339, 348, 345/349, 356, 965, 967, 346, 964, 440; 364/188; 705/8, 7, 9

[56] References Cited

U.S. PATENT DOCUMENTS

| | | | |
|---|---|---|---|
| 5,134,560 | 7/1992 | Ferriter et al. | 364/188 |
| 5,455,903 | 10/1995 | Jolissaint et al. | 345/348 |
| 5,481,668 | 1/1996 | Marcus | 345/349 |
| 5,487,144 | 1/1996 | Takahashi et al. | 345/348 |
| 5,576,946 | 11/1996 | Bender et al. | 364/188 X |
| 5,630,069 | 5/1997 | Flores et al. | 705/7 |

FOREIGN PATENT DOCUMENTS

| | | |
|---|---|---|
| 0 314 596 | 5/1989 | European Pat. Off. . |
| 0 452 904 | 10/1991 | European Pat. Off. . |
| WO92/08184 | 5/1992 | WIPO . |

OTHER PUBLICATIONS

Winstanley et al., "An integrated project planning environment", Intelligent Systems Engineering, vol. 2, No. 2, pp. 91–106, 1993.

*Primary Examiner*—Raymond J. Bayerl
*Attorney, Agent, or Firm*—Wolf, Greenfield & Sacks, P.C.

[57] ABSTRACT

A system and method for defining a process structure for performing a task. The system comprises a computer, having a data storage memory, a keyboard for inputting data and a screen. A user inputs a first process definition which comprises a verb word and an object word defining the task for which a structure is to be created. The user is then able to define subsequent process definitions which are a predicted consequence of executing the first process definition or a predicted constituent step in executing the first process definition. By analyzing each process definition at each stage a complete process structure for performing the task can be built up and refined. The user is also able to specify particular object words falling within the meaning of the object word of a particular process definition which can be called up in tabular form on the screen, overwriting the display of process definitions in the process structure.

32 Claims, 26 Drawing Sheets

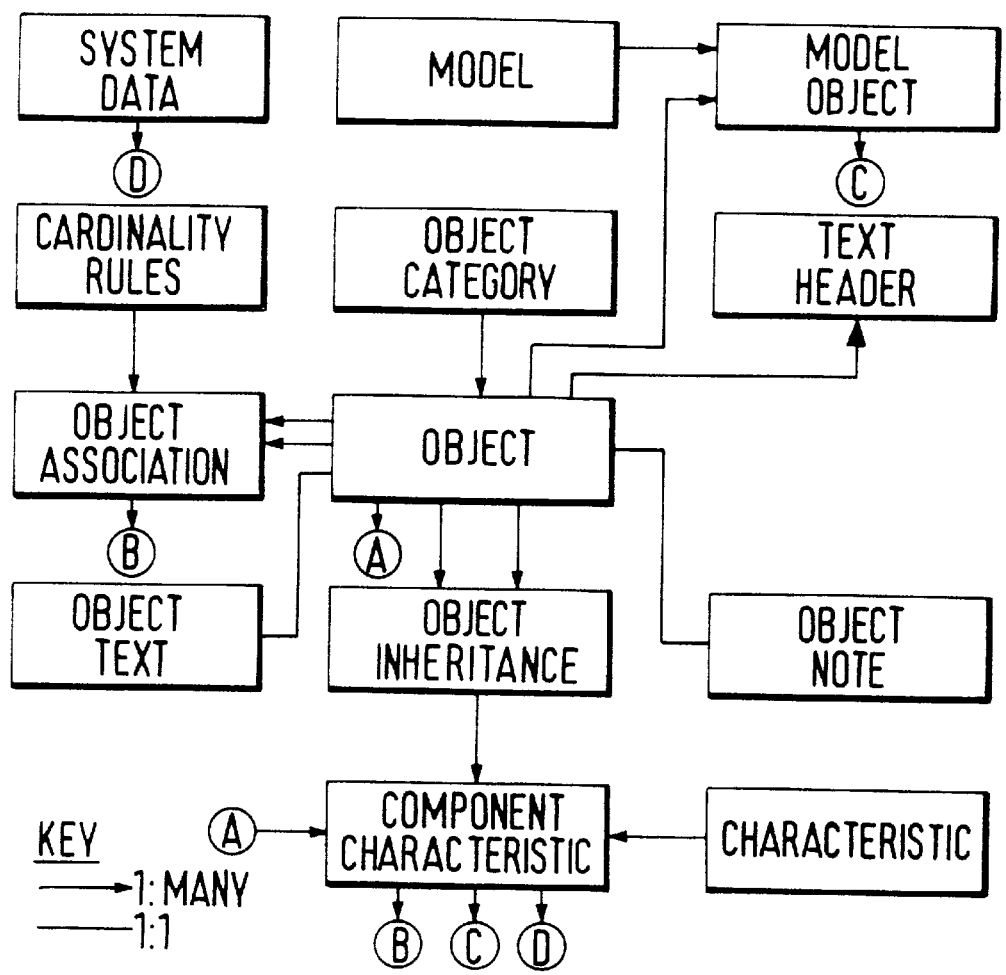

| OBJECT CATEGORY | CHARACTERISTICS | | |
|---|---|---|---|
| 1ST ORDER | COMPONENT COLOUR | BOX WIDTH | |
| 2ND ORDER | COMPONENT FONT | DEFAULT FONT | SYSTEM |
| 3RD ORDER | COMPONENT TYPE | BACKGROUND COLOUR | DATA |
| | COMPONENT MASK | CURRENT PROCESS COLOUR | ONLY |
| | COMPONENT WIDTH | OBJECTIVE PROCESS COLOUR | |
| | COMPONENT HEIGHT | ROW WIDTH | OBJ. INHERITANCE ONLY |
| | WHAT WIDTH | AOT | |
| | WHAT HEIGHT | EXISTING OBJECT | OBJ. ASSOCIATION |
| | PROCESS REF. WIDTH | SUB OBJECT | ONLY |
| | PROCESS REF. HEIGHT | OBJECTIVE | |
| | VERB REF. WIDTH | CHAIN | MODEL PROCESS |
| | VERB REF. HEIGHT | OWNER | ONLY |
| | OBJECT REF. WIDTH | RELATION POSITION | COLUMN |
| | OBJECT REF. HEIGHT | RELATION SORT ORDER | RELATION |
| | | RELATION SEQ.(ASC/DEC) | ONLY |

SYSTEM DATA & MODEL PROCESS ONLY (applies to WHAT WIDTH through OBJECT REF. HEIGHT)

SYSTEM AND METHOD FOR DEFINING A PROCESS STRUCTURE FOR PERFORMING A TASK

FIELD OF THE INVENTION

This invention relates to a system for and a method of creating or modelling a process structure such that the steps necessary in performing a task can be identified and/or refined, and the performance of the process steps in the task can be monitored.

BACKGROUND OF THE INVENTION

Methods are known which enable the user to analyse a system structure in order to establish where in the sequence of system steps hold-ups may occur. Examples of these are GANT charts or PERT software which provide an analysis based on critical path analysis. They do not provide any guidance to the user on how to begin identifying the steps in the task.

In performing a task it is very often the case that a large amount of time is wasted performing unnecessary steps or concentrating on relatively unimportant or simple steps while avoiding, or spending too little time on, steps that warrant the greater attention. It is human nature to spend a lot of time and attention on those steps in the performance of a task that are more interesting or reflect the strengths of the particular operative. If those strengths coincide with the steps requiring the most detail the result is likely to be satisfactory. However, when a task is multi-disciplinary in nature or slightly outside the experience of the operative, the operative either tends to concentrate on his or her relative strengths or is unable to define where the greater effort should be expended.

It is possible to address this by using a multi-disciplinary team, but this still requires an ability to identify the significant areas for which a team member is warranted. In the execution of a large and complex task this may be a necessary aspect of the identification of a task-step and its performance. However, on a smaller scale or at the initial stages of defining the steps in a task this can involve a heavy drain on employee time at a stage when the task concerned may not justify such input.

The person defining a task could usefully use a tool that would assist him or her in taking a logical course through the identification and definition of the steps themselves necessary in performing a particular task.

Furthermore, when a task has been set up it is useful, often essential, to monitor the progress of a task according to the status of each task step. Thus, it would also be advantageous for the user to have a tool that would enable him or her to track the progress of a task and its constituent steps.

SUMMARY OF THE INVENTION

According to one aspect of the present invention there is provided a system for creating a process structure for performing a task, the system comprising:
  a computing device;
  data storage means for storing data accessed by the computing device;
  means for inputting data connected with the computing device; and
  display means for displaying data also connected with the computing device, the computing device being arranged to receive from the user through the means for inputting data a first process definition, comprising a verb word or words and an object word or words, which defines the task or a step in the task, and to require the user to input through the means for inputting data a second process definition in response to receiving the first process definition, which would be a predicted consequence of executing the first process definition.

According to a second aspect of the invention there is provided a system for creating a process structure for performing a task, the system comprising:
  a computing device;
  data storage means for storing data accessed by the computing device;
  means for inputting data connected with the computing means; and
  display means for displaying the data also connected with the computing device, the computing device being arranged to receive from the user through the means for inputting data a first process definition, comprising a verb word or words and an object word or words, which defines the task or a step in the task, and to require the user to input through the means for inputting data a second process definition, in response to receiving the first process definition, which would be a predicted constituent step in executing the first process definition.

According to a third aspect of the invention there is provided a system for creating a process structure for performing a task, the system comprising:
  a computing device;
  data storage means for storing data accessed by the computing device;
  means for inputting data connected with the computing device; and
  display means for displaying the data also connected with the computing device, the computing device being arranged to receive from the user through the means for inputting data a first process definition, comprising a verb word or words and an object word or words, which defines the task or a step in the task, and to require the user to specify particular object words falling within the meaning of the object word of the first process definition.

The invention also extends to a method of creating a process structure for performing a task on computer, the method comprising:
  inputting a first process definition comprising a verb word or words and an object word or words, defining the task or a step in the task; and
  requiring the user to input a second process definition which would be a predicted consequence of executing the first process definition.

The invention also embraces a method of creating a process structure for performing a task on computer, the method comprising:
  inputting a first process definition comprising a verb word or words and an object word or words, defining the task or step in the task; and
  requiring the user to input a second process definition which would be a predicted constituent step in executing the first process definition.

The invention also extends to a method of creating a process structure for performing a task on computer, the method comprising:
  inputting a first process definition comprising a verb word or words and an object word or words, defining the task or step in the task; and requiring the user to specify particular object words, being instances of the object word of the first process definition.

Also according to the present invention there is provided a system for creating a process structure for performing a task, the system comprising:

a computing device;

data storage means for storing data accessed by the computing device;

means for inputting data connected with the computing means; and display means for displaying data also connected with the computing device, the computing device being arranged to receive from the user through the means for inputting data process definitions, comprising at least one verb word and at least one object word, each process definition defining a step in the task which is made up of a plurality of stages, culminating in a process definition of the task, the computing means further being operable to store data associated with one process definition at least one of the stages in the task.

The invention enables the process structure to be identified or developed by addressing how the task steps are to be undertaken as a constituent part of a process structure. The invention also enables a user to refine a process by addressing by the task steps are undertaken as a constituent part of the process structure defining routine. The database and process structure are developed automatically and are dynamically adjustable, as the user responds to selected prompts from the computing means.

Preferably, the object word or words of the constituent process definition(s) in the stage before the said one process definition are arranged by the computing means in a retrievable data display.

Thus, the invention allows information windows to be associated with any or all of the processes in a modelled task. These may be in the form of a standard information window specifying checklist entries, such as process is completed/not completed and the date of completion. However, the processes can also be used in a customised information window to represent the preceding steps in the modelled task at which various data on the task can be displayed for assessment and analysis.

Preferably, the invention is arranged optionally to construct an information window for each process in the modelled task. For example, for a given process the invention may be arranged to generate a column header in an associated information window for each of the processes in the model stage immediately preceding that of the given process.

Preferably, the data display is in tabular form. For example, the object word or words of the associated constituent process definitions of the preceding stage are arranged as column headings and specified objects of the said one process definition are arranged as row headings.

While most data will be associated with the said constituent process definitions, it is desirable that the computing means are also arranged to accept further object words in the arrangement of the data display. The computing means may be arranged to create a constituent process definition when an object word or words is added by the user to the data display. Preferably, the computing means are arranged to inhibit the creation of a constituent process definition when an object word or words is added to the data display at the option of the user.

In a particular form, the invention comprises a system for modelling a process structure for performing a task, the system comprising:

computing means;

data storage means accessed by the computing means;

means for inputting data to the computing means; and display means operably connected with the computing means for displaying prompts and data inputted through the inputting means and from the computing means, the computing means being arranged selectively to display on the display means a prompt for a first process definition requiring a verb word or words and an object word or words input through the data inputting means by a user, and to require the user to select a further input prompt from the computing means requiring the user to input a second process definition which would be a consequence of executing the first process definition or which would be a constituent step in executing the first process definition to create a series of stages in the task model culminating in a model for performing the task, or to require the user to specify a particular object word or words, which are instances of the object word of the first process definition, the computing means further being operable to generate a retrievable tabular data display, associated with one process at one stage, in which the constituent object word or words of the process definition(s) in the stage before the said one process definition are arranged as column headings and specific objects of the said one process are arranged as row headings.

The invention represents a simple way of planning and controlling work. By way of the basic prompts the user is able to take small steps in the definition of the task structure in areas where his or her experience is lacking or to define or establish a step between process definitions that is larger where experience is sufficient not to require shepherding through a plurality of intermediate, more basic, steps. Thus, each process structure for performing a task can be defined logically yet reflecting the level and areas of experience of the user. The process structure or model developed is, therefore, uniquely fitted to the user who has been guided through the important considerations in response to the prompts of the system. The need to monitor steps in a task where the user has less experience is automatically catered for by the use of the more detailed stages.

Preferably, the computing means are arranged to require the addition of a second or subsequent stage of processes in order across the display means. For example, the requirement for a second process definition which would be a consequence of executing the first process definition (a WHY? prompt) is ordered in one direction across the display means and the requirement for a second process definition which would be a preparatory step in executing the first process definition (a HOW? prompt) is ordered in the opposite direction across the display means. The requirements for these process definitions are considered mutually opposing. Thus, by ordering the process definitions in opposite directions in response to the two requirements, a transparent task model is created which can be constructed in greater or lesser detail at each stage to reflect the experience of the user.

For the sake of good order it is preferable that the development of a task model or process structure progresses across the display means from a fundamental task process through the various process stages leading to the basic initialising processes. This progression is desirably from right to left of the display means but could equally well be from left to right or in either direction up and down the display means.

Preferably, the computing means are arranged to order process definitions at the same task stage level in parallel across the display means. This can result in each step at the same level supporting separate sequences of process definitions.

The requirement of the computing means for the user to specify particular object words falling within the meaning of the object word of the first process definition can be arranged to appear on the display means as an overlaid image or window in which more detailed examples of specific objects according to the object type can be listed.

By utilising the particular form of the invention defined above the user is able to build a task model in either direction. For example, the initial identification of a task will lead the user to construct a model based on responses to the HOW? prompt and to define specific objects in the model where necessary. The user is also optionally able to determine the value of the task, or a step in the task, by working backwards in response to the WHY? prompt.

The invention may include calculator verbs in response to which the computing means are arranged to perform arithmetic processes on values, stored in the data storage means, of objects arranged in a task stage. This will be in respect of objects which relate to numerical values of objects, such as amounts of money or numbers of objects.

Preferably, the computing means are arranged to create a text sub-file and/or document headers in response to a command from the means for inputting data for a process, the text sub-file being displayable on the display means in response to a command from the user transmitted via the data inputting means. The documents indicated by the headers can be written in a text processing language associated with the computing means and accessed through the task model. In this way, the user can use the underlying database structure of the computing means to access other files relating to a particular object.

The computing means may also be arranged to generate difficulty ratings from weightings provided by the user via the data inputting means associated with each process in a task model. For example, the weighting can be numerical value assignable by the user.

The invention provides a means of selecting a process object whereby the selected object is an instance of the process, thus defining a separate current process comprising the original process verb and the selected object. How or why tasks can be associated with a process that has a relationship with an object whereby the how or why tasks specifically relate to the separate current process and further object breakdowns of that object process only.

How or why tasks may be inherited by a current process that has a relationship with an object, whereby the how or why tasks of higher level objects of the process object relationship are applied to the current process in addition to the how and why tasks that are separately associated with the current process.

A how process may be compounded whereby the how process objects are associated with the selected objects of the preceding why process which itself may be compounded.

A process may include chainbreaking whereby the how process objects are only associated with the object of that process irrespective of any compounding. Objects in what and information windows may be inherited whereby objects displayed are those related to higher level objects of the why process object together with those related to the why process object.

BRIEF DESCRIPTION OF THE DRAWINGS

The invention can be put into practice in various ways some of which will now be described by way of example with reference to the accompanying drawings, in which:

FIG. 23 is a display screen of an information window and calculation processes for a process;

FIG. 26 is an entity relation diagram for the described embodiment of the invention.

DETAILED DESCRIPTION OF A PREFERRED EMBODIMENT

Figure 1:
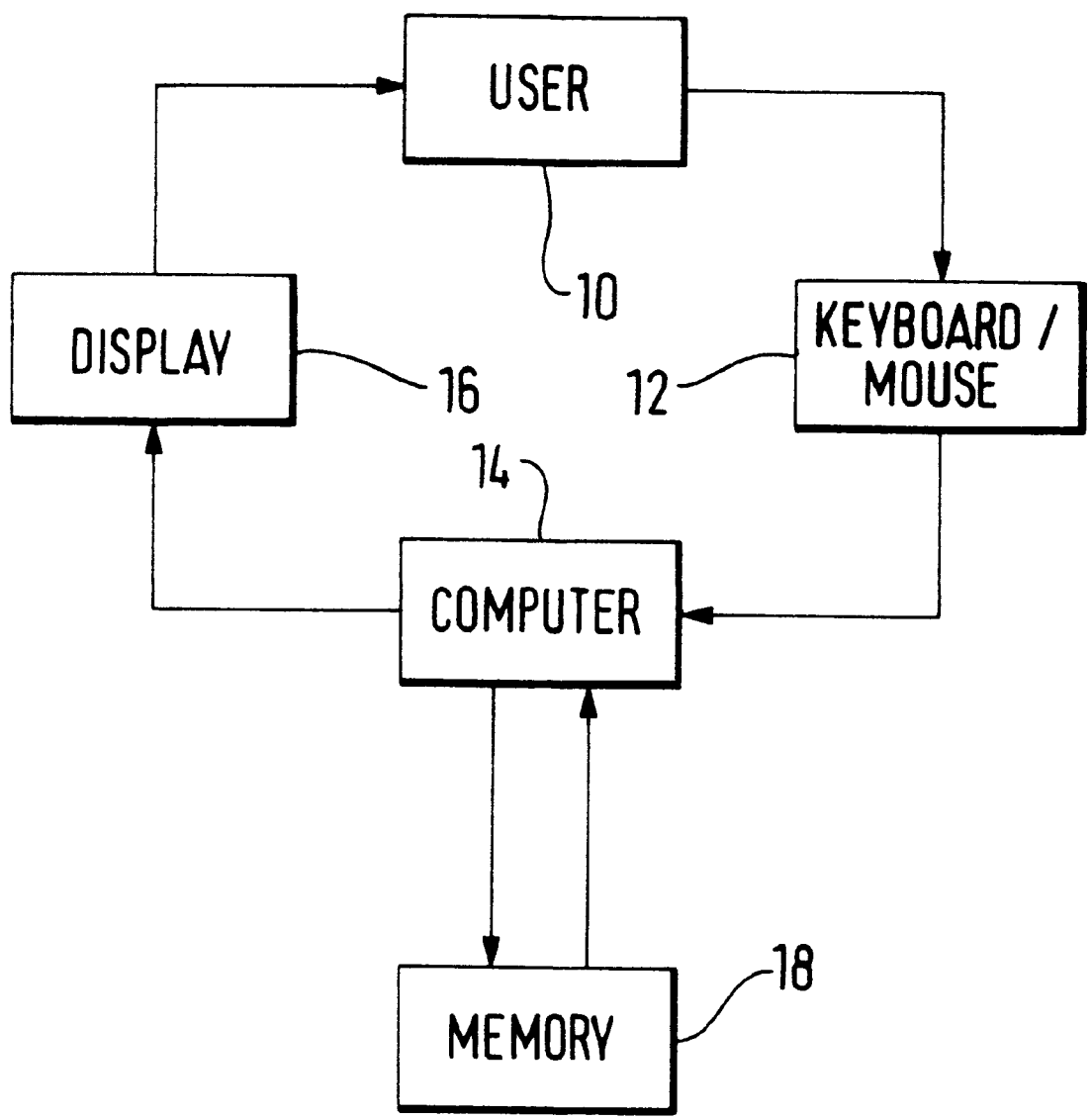
FIG. 1 is a schematic block diagram of a computer system on which the invention can be installed.

The major elements of the system are shown in block form in FIG. 1. The elements are utilised by a user 10 and include a keyboard 12 through which data is inputted by the user to a computer 14. Data is displayed by the computer on a monitor display screen 16. As will be apparent to the skilled person, the computer will have associated with it a memory 18 for storing data.

In the following there are references to a 'cursor' which will be appreciated by the skilled person as references to a mark indicating the area on a screen that is 'current' in which or to which an action or function is addressed. A cursor can be moved about a screen by a 'mouse'. Action or execution switches are incorporated in the mouse. The cursor could be moved by conventional keystrokes such as the up/down/left/right keys on a conventional QWERTY wordprocessing keyboard. Conventional execution of commands or functions on a keyboard is effected by striking, for example, the 'RETURN' or 'SPACE' key or 'clicking' the mouse. For the sake of clarity, the movement of the cursor and the execution of a command or function is to be taken as the result of such movement of the cursor in a conventional manner by the mouse or keyboard and mouse switch actuation (clicking) or key strokes. The process of moving to an area of the screen where a specific feature is indicated and its execution is to be taken to be the above and is often referred to in what follows as 'selection'.

Similarly, the mouse can be used to 'capture' an icon or character displayed on the screen. The captured item can then be 'dragged' around the screen to be positioned where the user requires it. These will be well known operations to the skilled person.

The user 10 is charged with the job of defining how to go about performing a particular task in an efficient manner. An aspect of the present invention is the concept of an object, tangible or intangible, which can be defined. Examples are a report to be written, a sale to be made, a customer to be serviced. Any object can be broken down into categories and further sub-categories, as required by the user, by selecting a WHAT? icon. An object might be employees, a category of employee might be salespeople and a sub-category of salespeople might be an individual salesperson by name.

Associated with an object is a verb to create a verb/object pair ("a process") either encompassing the overall task to be performed or a step on the way to achieving it. Having established a task in the form of a verb/object process, as defined above, that the user wishes to manage as a model in the system, the user may choose between the icons HOW? and WHY?

Taking HOW?, it will be appreciated that the user is required to think, on an on-going basis, about what should be the next step, specific to the current step, or one of the steps at a step level or stage, previously defined. Eventually, a task model is developed, including a hierarchy of intermediate processes at different task stages. Each process is a step in a stage of the task model.

WHY? can be considered as the reverse direction of HOW? In effect addressing HOW? leads to the beginning or initialising steps of a task, whereas WHY? can be used to refine the process steps in the task by working towards the fundamental task process. A significant amount of time is often wasted in the performance of a task when effort is expended disproportionately on minor, unimportant or even irrelevant processes. Hence being able to work towards the task process by addressing the question WHY? is designed to be a refining tool in creating the task model.

A specific example will now be described. The system is run on a personal computer based on an INTEL 486DX/30 MHz microprocessor supported by a 4 Mbyte memory and a VGA monitor display. The computer is loaded with Microsoft Windows 3.1 and DOS 5 (or later versions) operating software, as well as a program for executing the system according to the invention. In this case the program of the system of the present invention has to be compatible with the Windows and DOS operating software. The generation of such a program will largely be a matter of routine development to the skilled software programmer. The skilled person will also be aware that the elements of the invention can be implemented in any suitable software language. In the case of the invention the C++ programming language is used. Appendices A and B list some of the source code associated with the underlying concept behind the invention. This will be referred to in more detail below.

Figure 2:
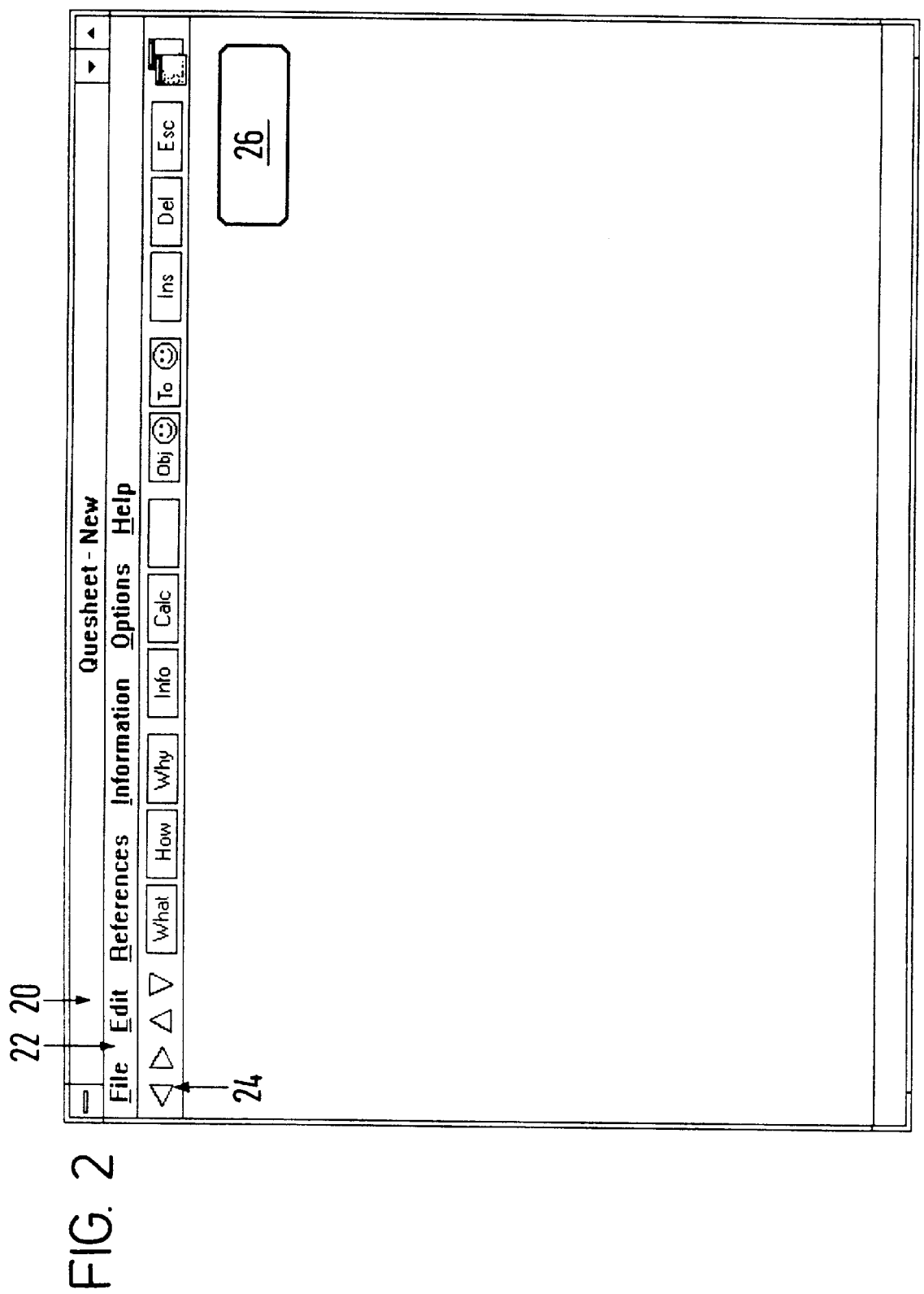
FIG. 2 is a basic display screen of one embodiment of the invention.

Once the system program is installed through the Microsoft Windows Program Manager it is possible to call up on the screen of the VGA monitor the process sheet shown in FIG. 2. The screen display comprises a title bar 20, a menu bar 22 and a button bar 24. To create a model the option 'File' is selected from the menu bar 22. This allows the user to specify an existing file by name or to create a new model. The invention will be illustrated by creating a new model. The result of this will be a field screen which is largely blank except for a process entry box 26. To define what is initially thought to be the overall task process to be modelled, it is necessary to input to the entry box 26 the object which can be a physical entity or an abstract concept and, above that, a verb defining what it is that is to be done to the object. It is possible to move between verb and object region of the box 26 by depressing the TAB key on the keyboard.

Figure 3:
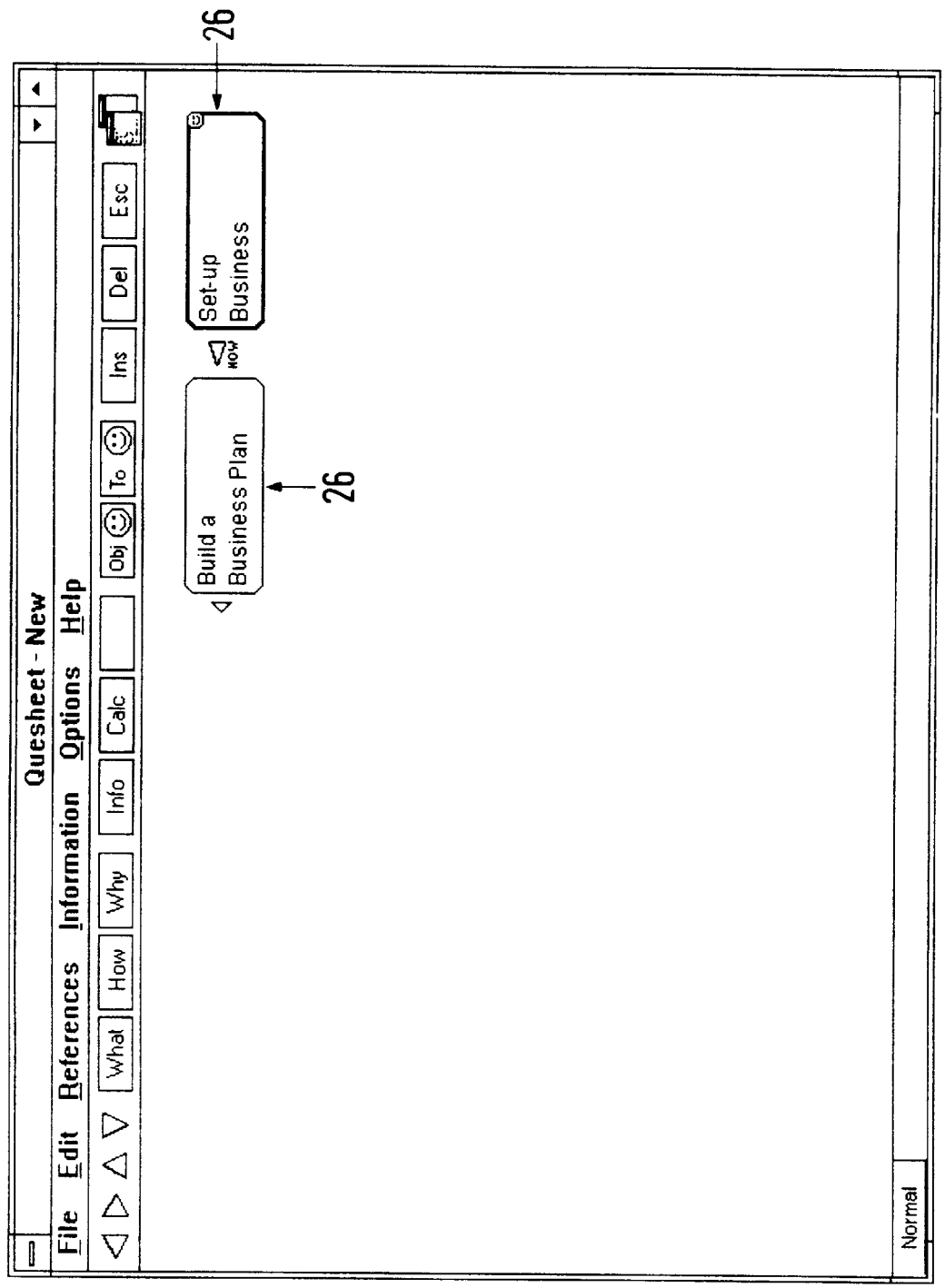
FIG. 3 is a display screen in which the start of a task model is formed.

FIG. 3 illustrates the screen display of the hypothetical task process comprising the verb 'set up' applied to the object 'business'. To take the model towards inclusion of all the necessary constituent processes of the task the cursor is simply moved to the left of the existing process and the mouse clicked or the 'return' key on the keyboard struck. A further entry box 26' appears on the screen immediately to the left of the 'set up business' process.

This is the HOW? mode. The system is arranged to default on start-up to the HOW? mode. It is left by selecting the WHY? or WHAT? modes from the button bar 24. Similarly, the HOW? mode is entered by selecting the HOW? from the button bar 24.

Figure 4:
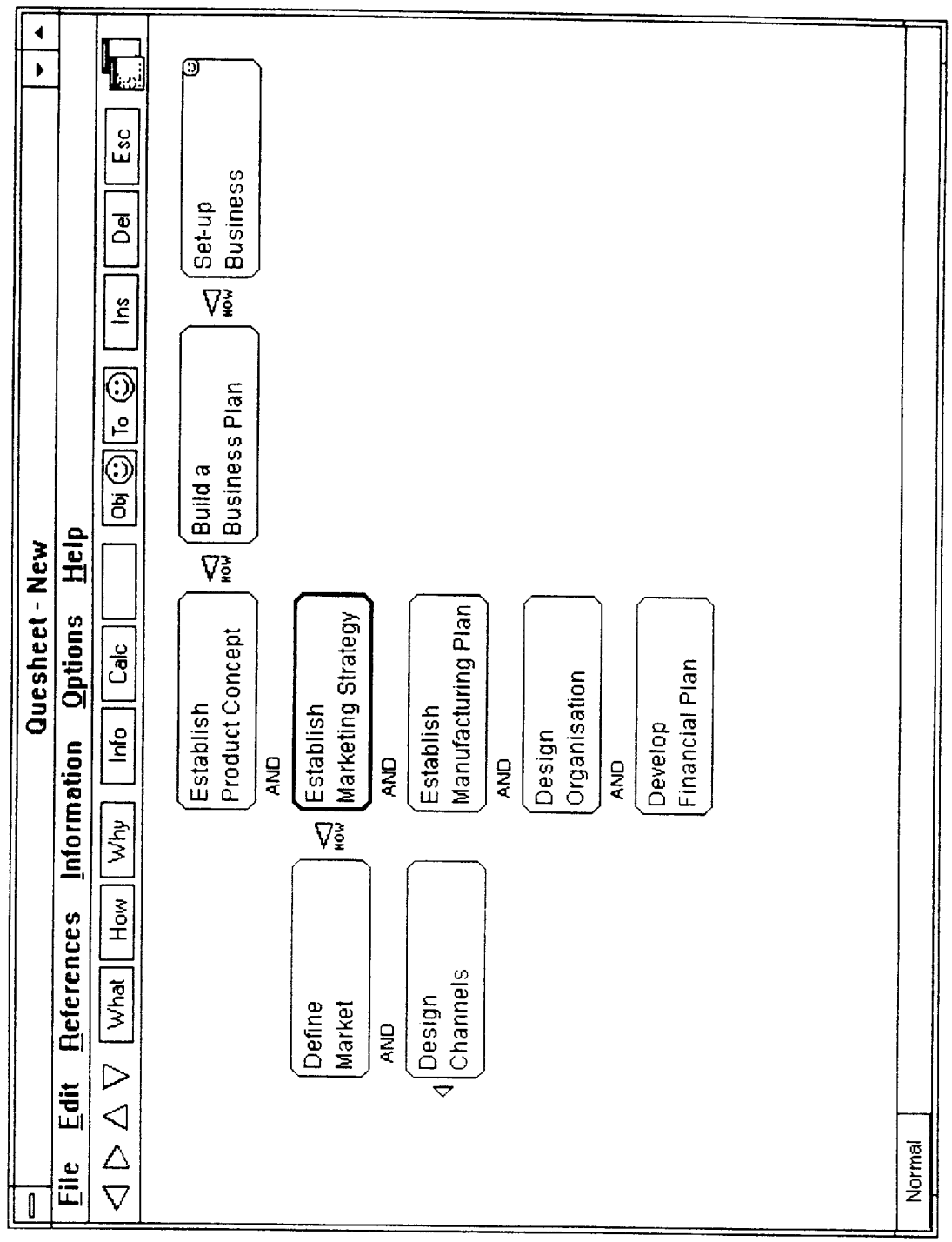
FIG. 4 is a display screen of a more complete task model.

In response the user is free to define a verb/object process that he or she feels is a constituent step in executing the basic task. In this case the preparatory process is 'build a business plan'. The model is developing from right to left across the screen in response to the HOW mode. Following on from the second stage, FIG. 4 shows a series of processes identified by the user as being necessary steps in developing the task model. In the HOW? mode the associated steps in adjacent stages in the developing task model are linked by arrows pointing from right to left (i.e. away from the original task process and towards the initialising processes) and the legend 'HOW'.

It will be seen that each stage in the task model comprises a vertical column of parallel processes. All the processes in a stage are considered necessary in achieving the process to which they are indicated as being linked (by the 'AND' between them) in the stage immediately to the right. In the case of a user experienced in setting up business plans the definition of each detailed aspect of a business plan can be narrowed down to fewer defined processes, enabling the user to manage the building of the business plan according to experience. It is likely that an experienced person will be able to make do with less steps if they are confident of the processes to be undertaken or to avoid detailed recitation of processes in a task step. A user requiring more guidance is able to put in more stages and more detailed processes in order to help them identify the processes involved and to decide on which are actually necessary or in need of modification. The example is expanded further with additional processes as shown in FIG. 4.

As mentioned above, the opposite of HOW? is WHY? The system according to the invention allows the user to work back from a particular process in order that the relevance of that process in the task model is clearly ascertained. By allowing the user to concentrate on exactly why a process in a task model is there will assist in keeping the model efficient and directed to the task.

In FIG. 4 there is a process 'develop financial plan'.

Figure 5:
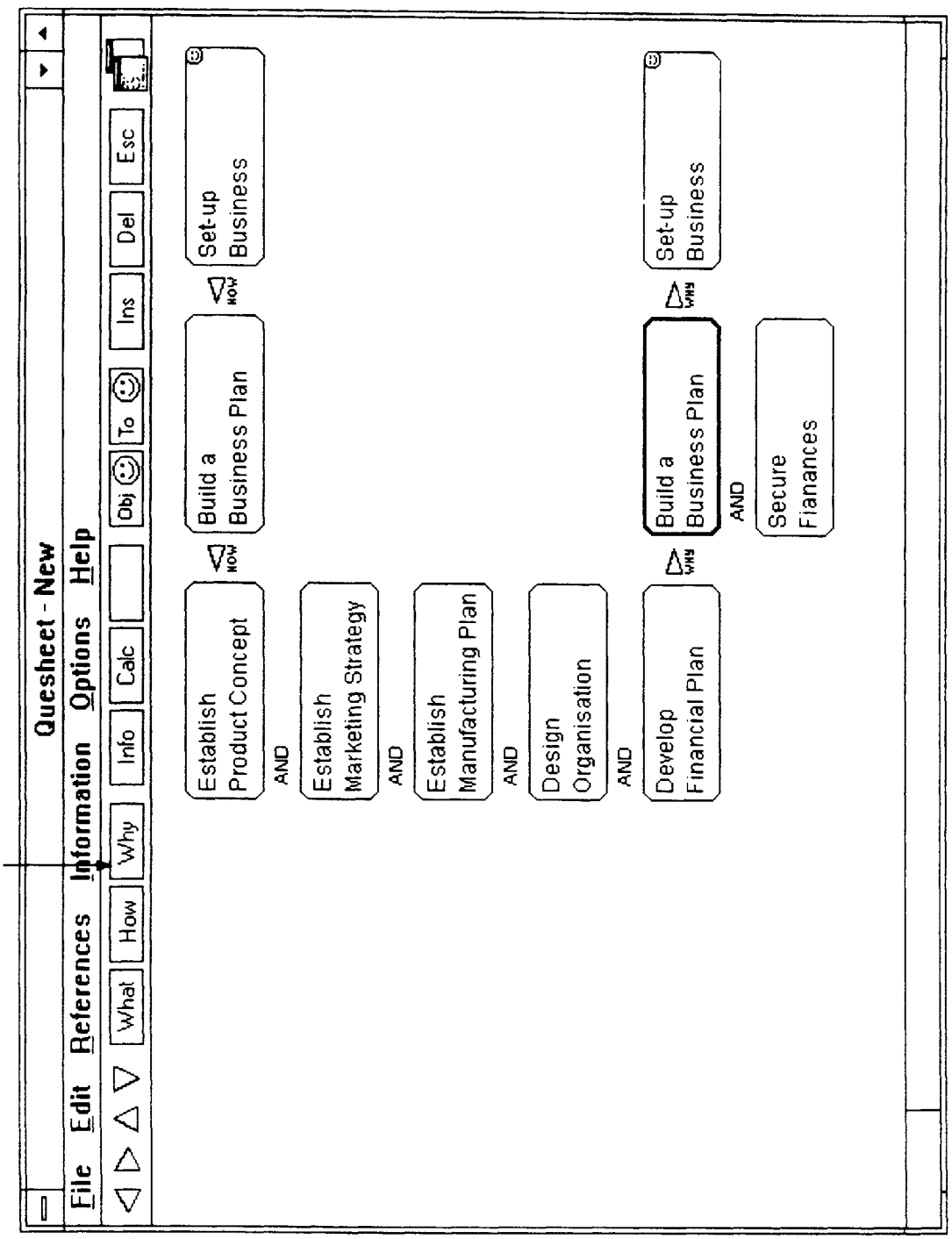
FIG. 5 is a display screen of a detail of a refined task step.

Now the user can select the WHY mode from the button bar 24. The user in this example can then work backwards, asking the question WHY? to define for the model the relevance of this process. This is illustrated in FIG. 5 in which the basic task processes of 'build a business plan' and 'secure finances' appear. The WHY? mode is effected by moving the cursor to the right of the process 'develop financial plan'. Again, the blank entry box will appear, requiring the user to consider the reasons for the process being included in the model.

To add entry boxes in the same task stage, the cursor is moved downwardly and a new blank entry box is called up by clicking the mouse or striking the 'TAB' key on the keyboard. These processes serve to justify (or otherwise) the presence of the process 'develop a financial plan'. Justification will be associated with the weight attached to the additional answers to the question WHY? Thus, by moving the cursor relative to a process the questions HOW? and WHY? can be addressed and a plurality of processes built in to a particular task stage.

Figure 6:
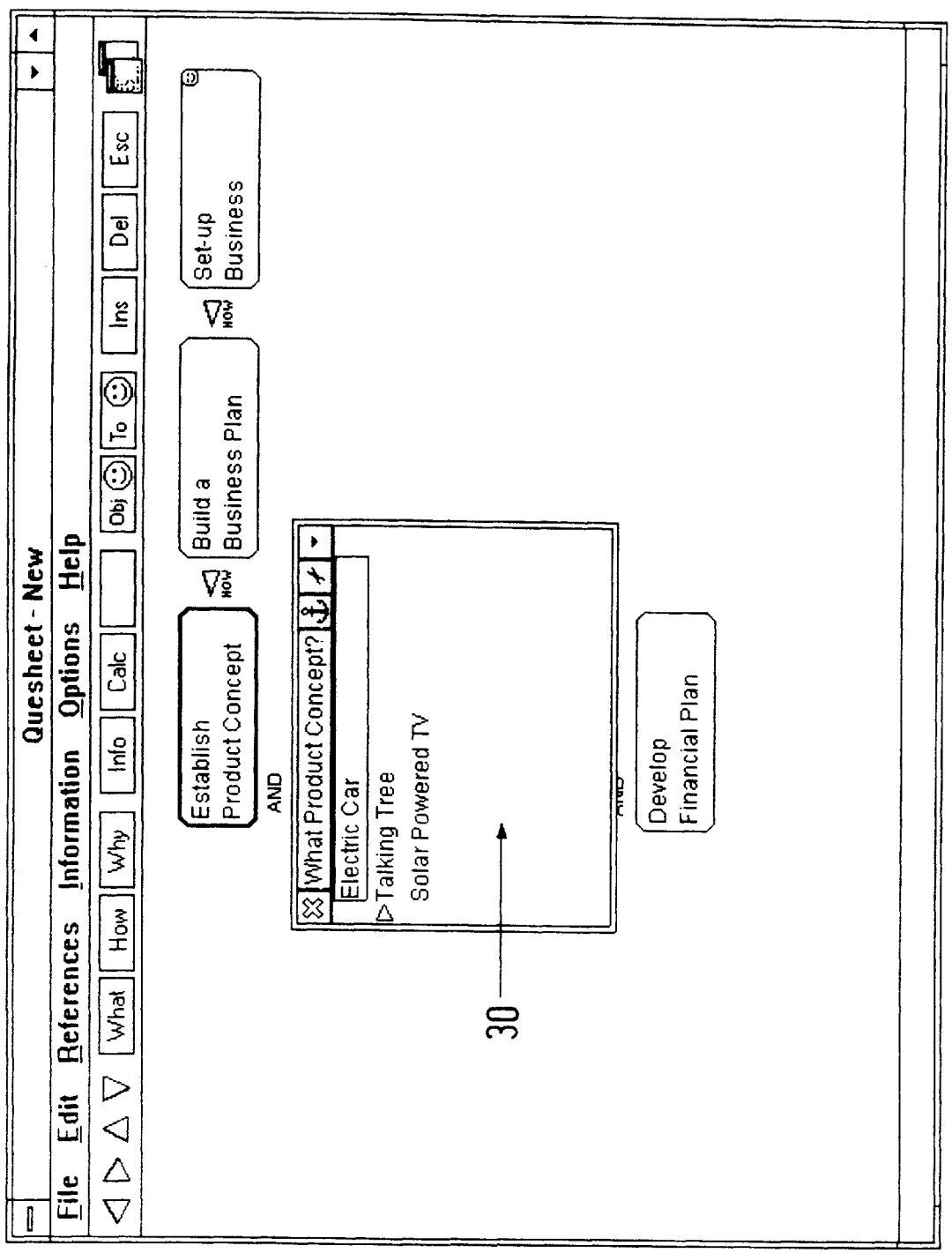
FIG. 6 is a display screen of an overlaid window in which objects in a task step process are specified.
Figure 7:
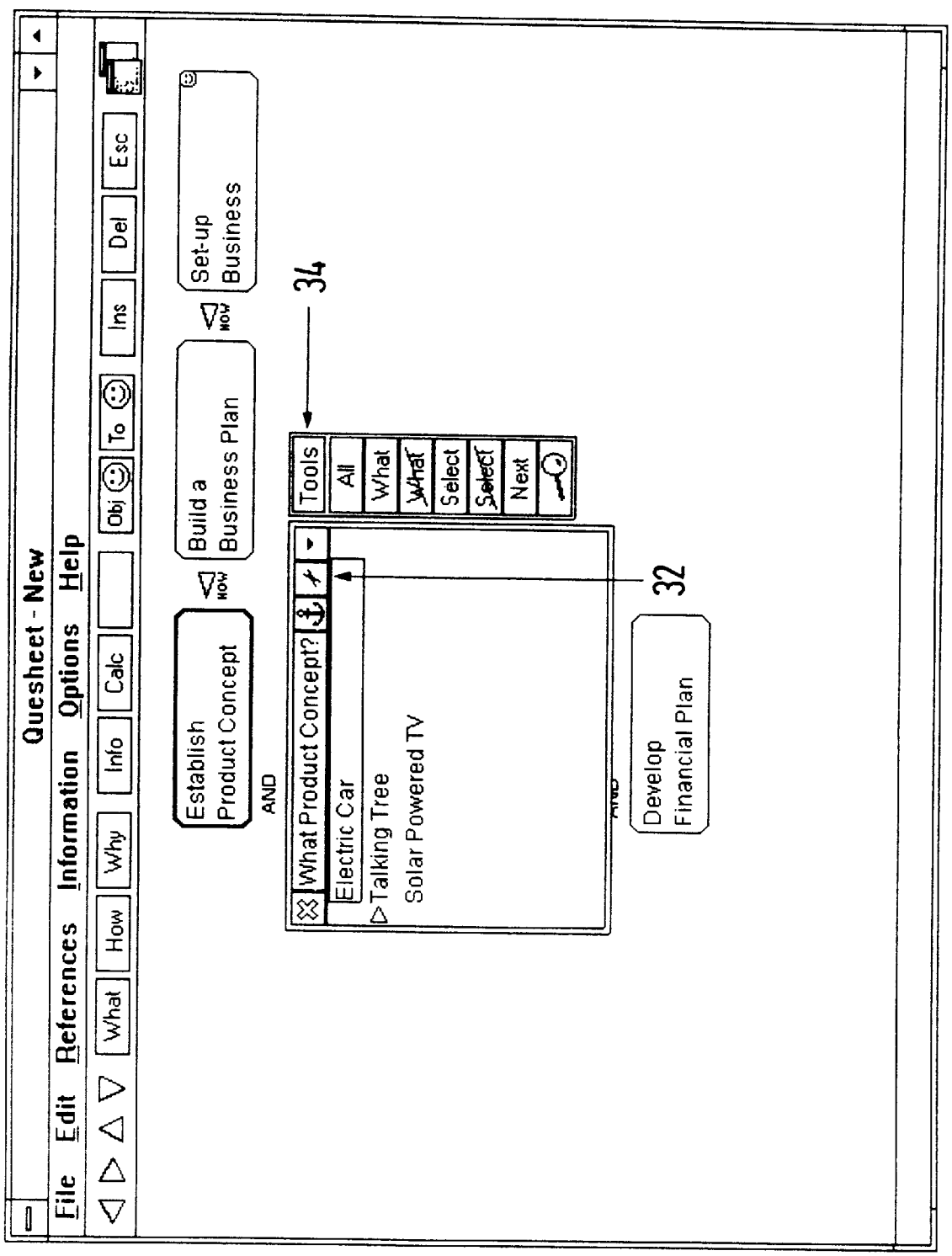
FIG. 7 is a display screen of an overlaid window as in FIG. 6 with the Tool Button depressed and the Tool Bar opened.

At any stage in the model it may be necessary to define more specifically the object of a process. FIG. 6 illustrates the on-screen display generated when the WHAT? icon is selected from the button bar 24 for a particular process over which the cursor is positioned. In this case, the process is to establish a product concept. Once the WHAT? window is overlaying the task model screen it is possible for the user to input, via the keyboard, a list of objects: in this case product concepts to which the process concerned relates. Thus, for those processes in the task where it is necessary to specify different items under the same object definition the system is arranged to provide an optional inventory to which relevant items can be added to taken away. The WHAT? window has an associated Tool Bar as illustrated in FIG. 7. The Tool Bar 34 has a set of tool buttons that activate specific functions as described below. The Tool Bar is opened and closed by clicking on the tool icon 32 and lowering/raising the button respectively.

Figure 8:
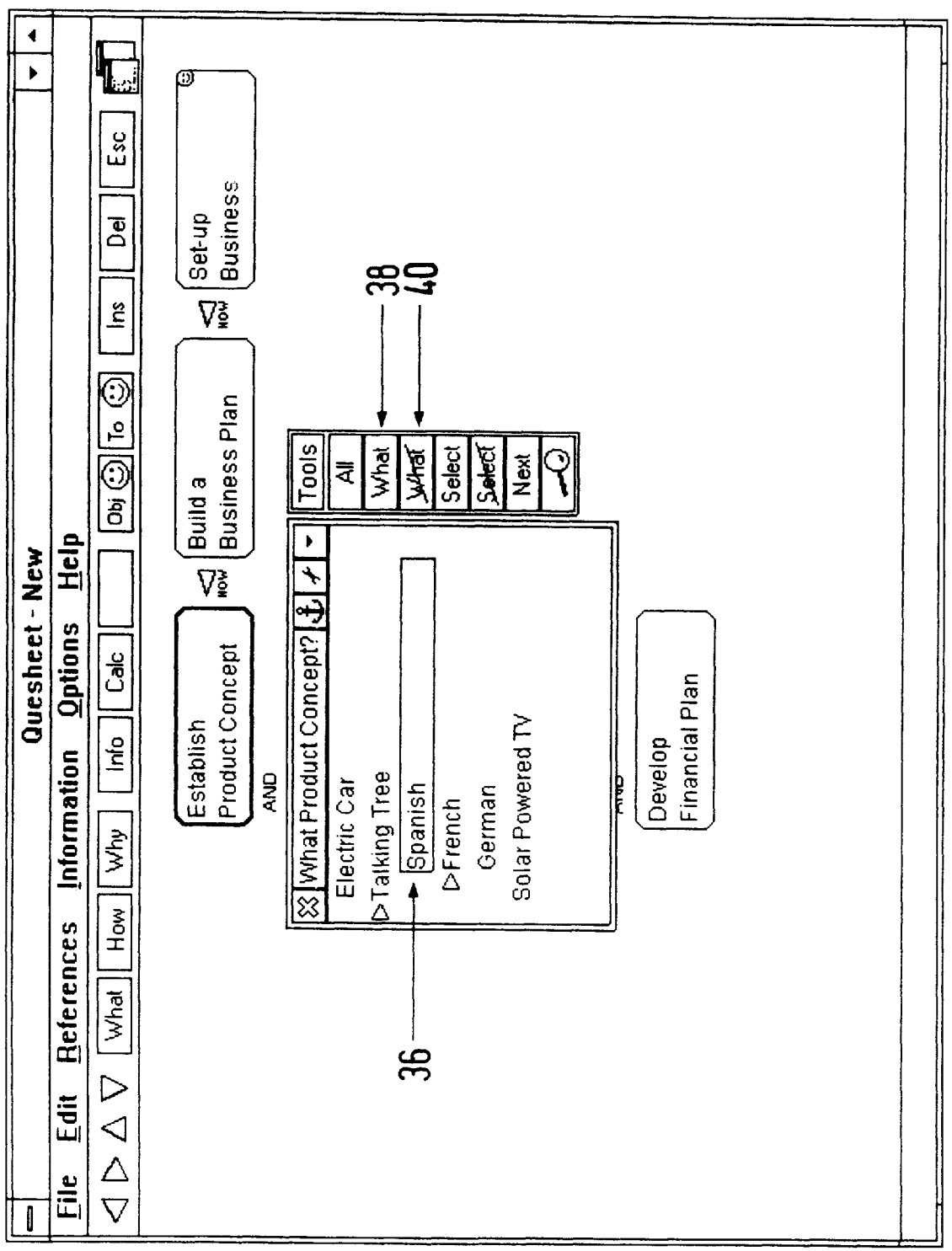
FIG. 8 is a display screen of an overlaid window as in FIG. 7 with an object expanded to two additional levels.

Any item appearing in the inventory as a result of a WHAT? enquiry can be made the subject of a further WHAT: enquiry. FIG. 8 illustrates this in relation to the "talking tree" object item in the inventory "WHAT product concept?" The indented list of sub-items under "talking tree" lists the inventory of languages. Indented lists are opened or closed by clicking on the Tool Bar What 38 and Not What 40 buttons respectively.

Figure 9:
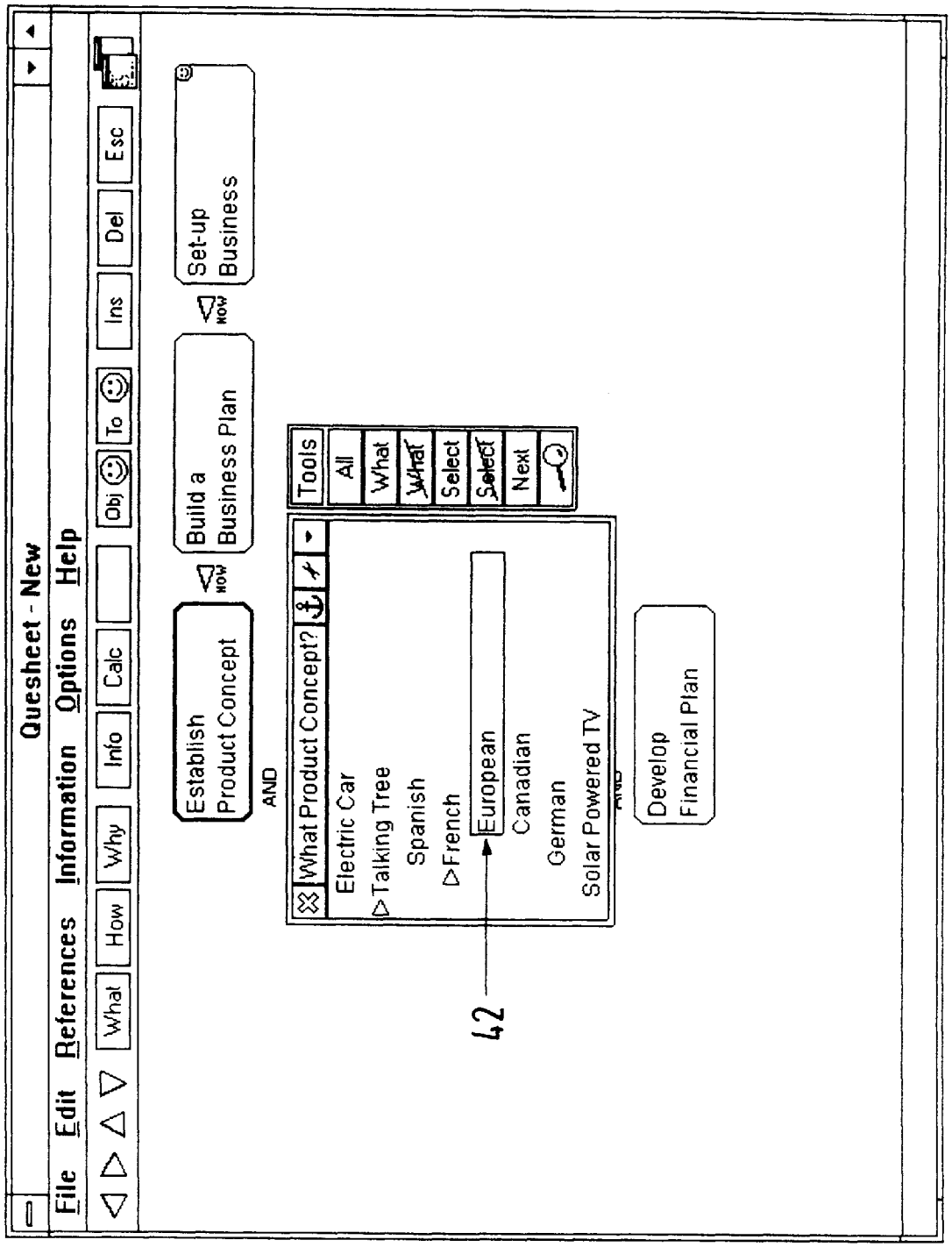
FIG. 9 is a display screen of an overlaid window as in FIG. 7 with an object expanded to two additional levels.

WHAT? lists may be indented to as many levels as the user wishes. FIG. 9 illustrates a "French" object of the "Talking Tree" object expanded to show the currently entered French dialects 42.

Figure 10:
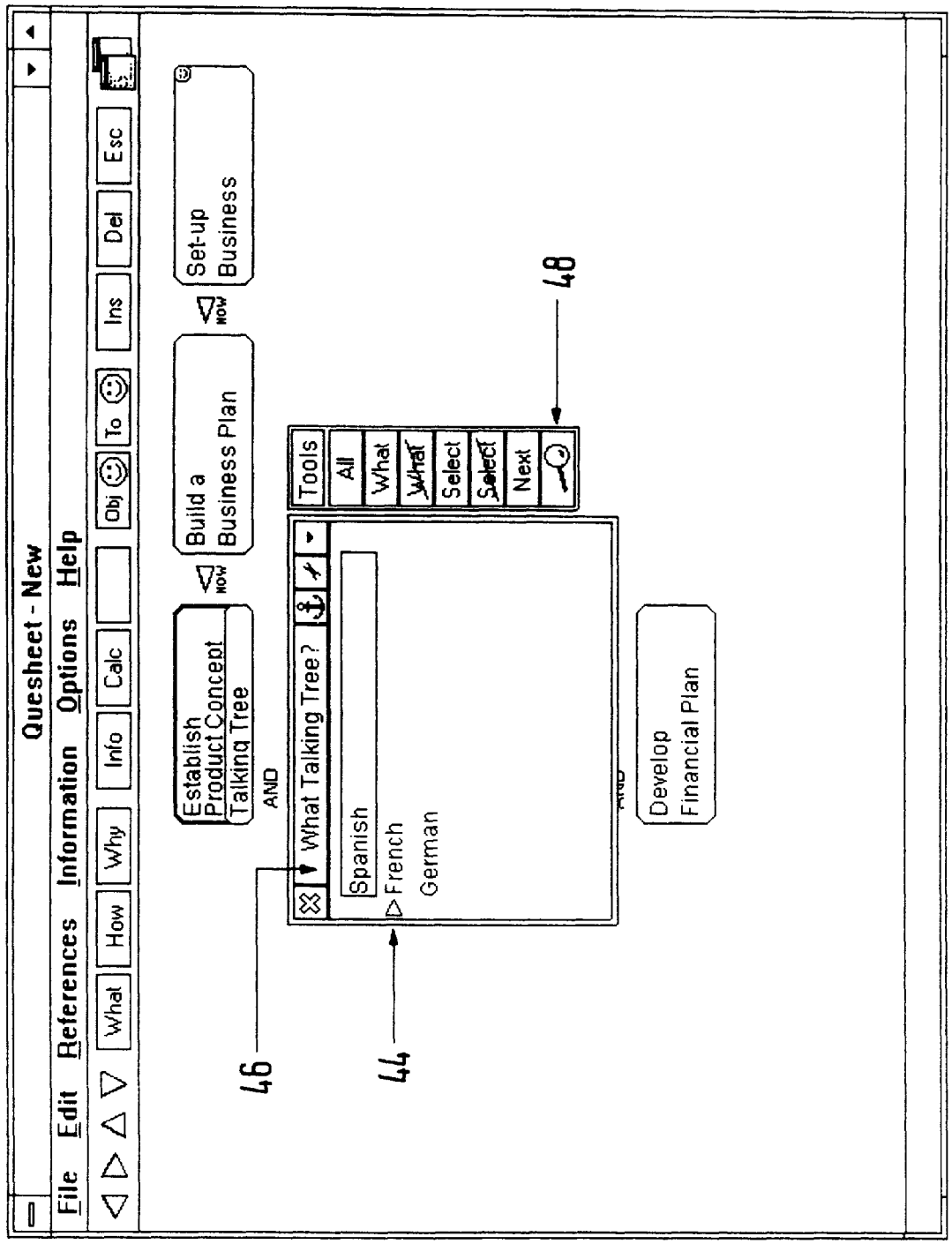
FIG. 10 is a display screen of an overlaid window as in FIG. 6 with one specific object focused into.

In addition to the indented lists as illustrated in FIG. 9, the user may focus upon a specific object layer within a WHAT? list, as illustrated in FIG. 10. To focus on an object and its further breakdown, the user moves the cursor to the required object in the list, in this case "Talking Tree", and clicks on the Focus button 48. The WHAT? window is re-displayed, with "What Talking Tree?" in the title bar 46 and the list of objects and indented objects restricted to a breakdown of "Talking Tree" 44.

Figure 11:
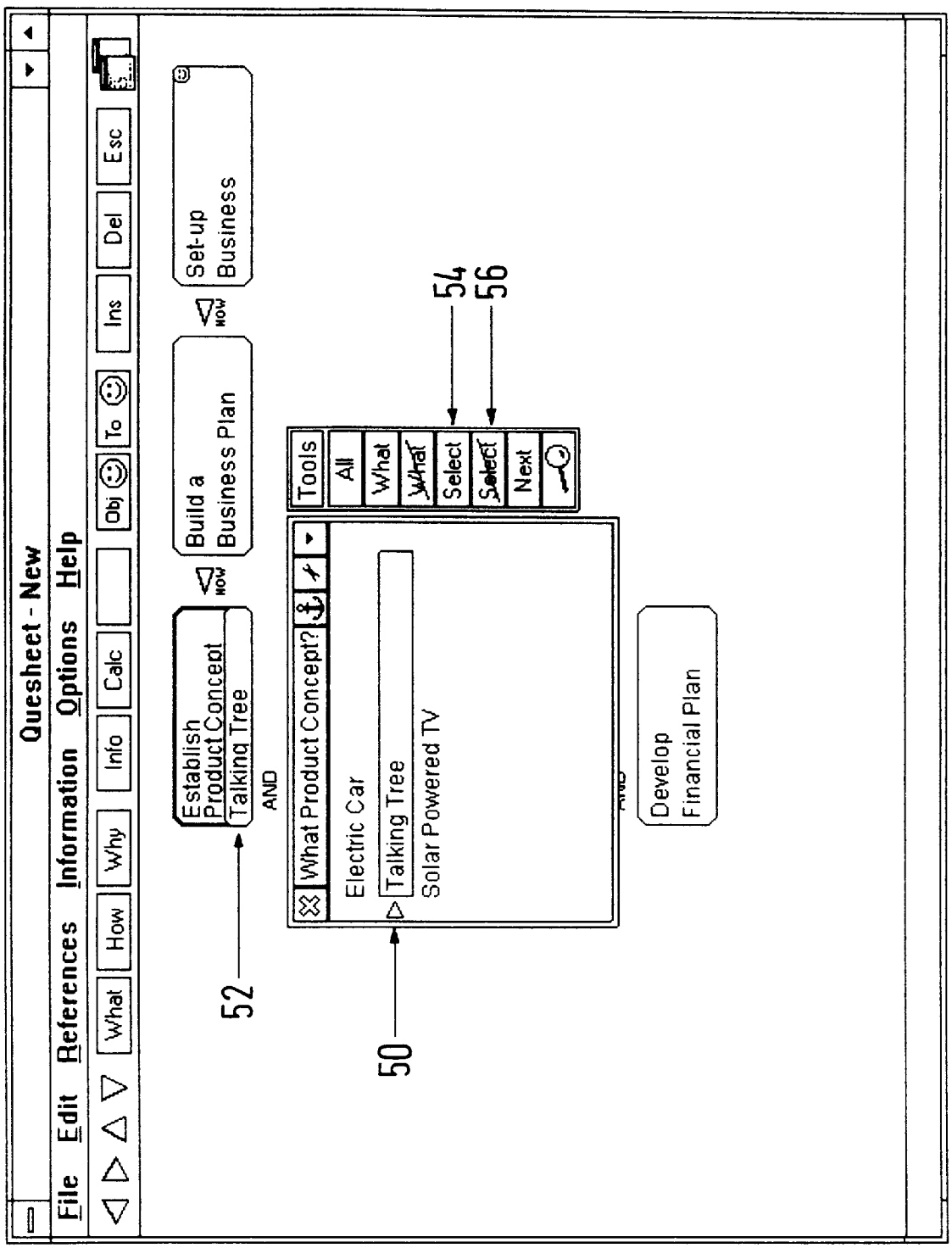
FIG. 11 is a display screen of an overlaid window as in FIG. 6 with an object from that window selected into the Process Selection Field.

The user may changed the context of the process model by promoting an object from the object inventory to the Process Selection Field (PSF). In so doing the user changes the context of all information displayed to the left of the process with the PSF selection. An example of PSF selection is illustrated in FIG. 11, where "Talking Tree" has been promoted to the PSF 52. The user promotes an object to the PSF by highlighting the required object 50 and clicking on the Tool Bar Select button 54. The user clicks on the De-select button 56 to remove an object context from the PSF.

Figure 12:
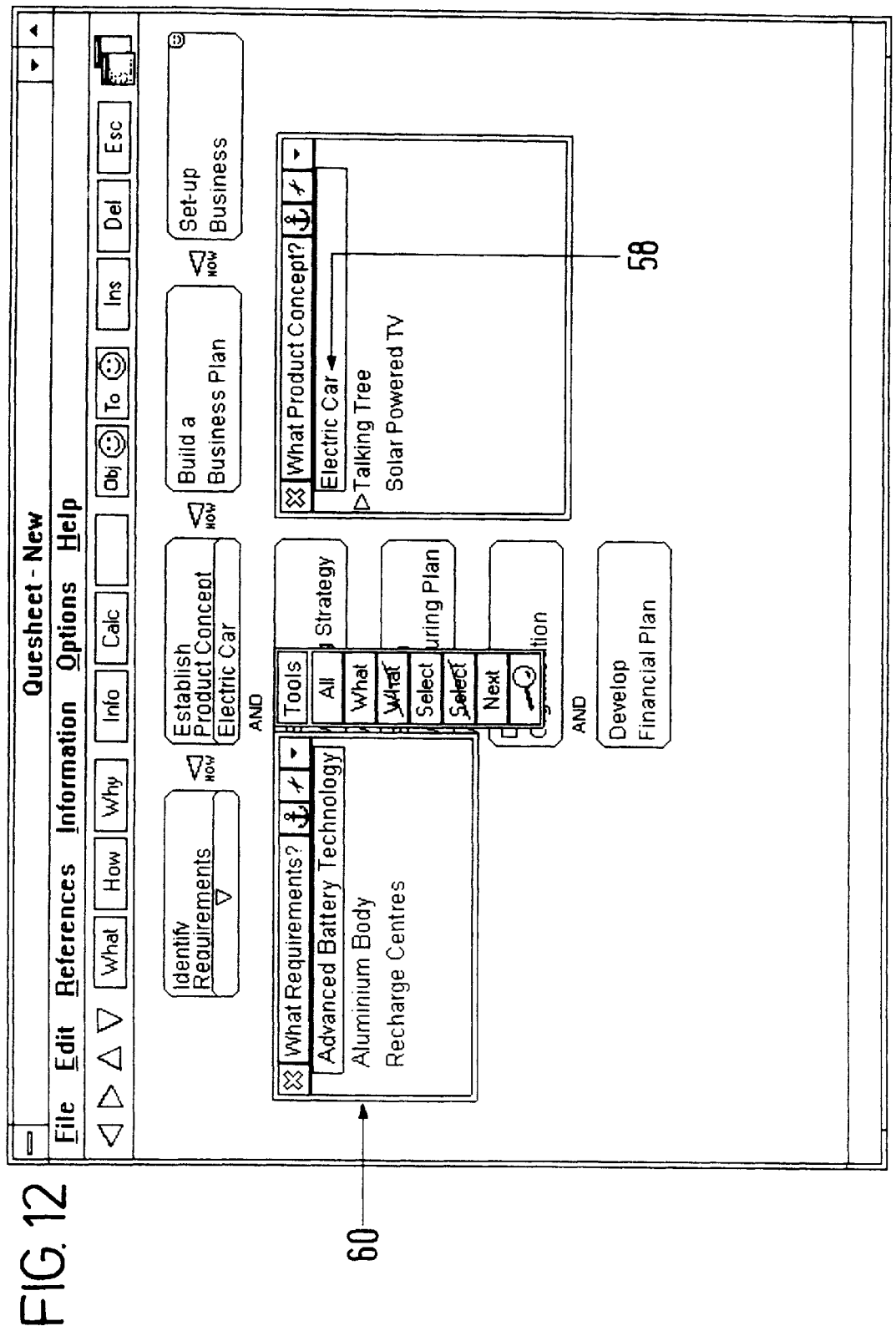
FIG. 12 is a display screen of two overlaid windows indicating association of objects.

Object context changes using a process PSF control the inventory of WHAT? displays. FIG. 12 illustrates the object "Electric Car" 58 promoted to the PSF of process "Establish Product Concept". The WHAT? display opened for process "Identify Requirements" shows the inventory of "Requirements" 60 which are relevant to the "Product Concept" "Electric Car".

Figure 13:
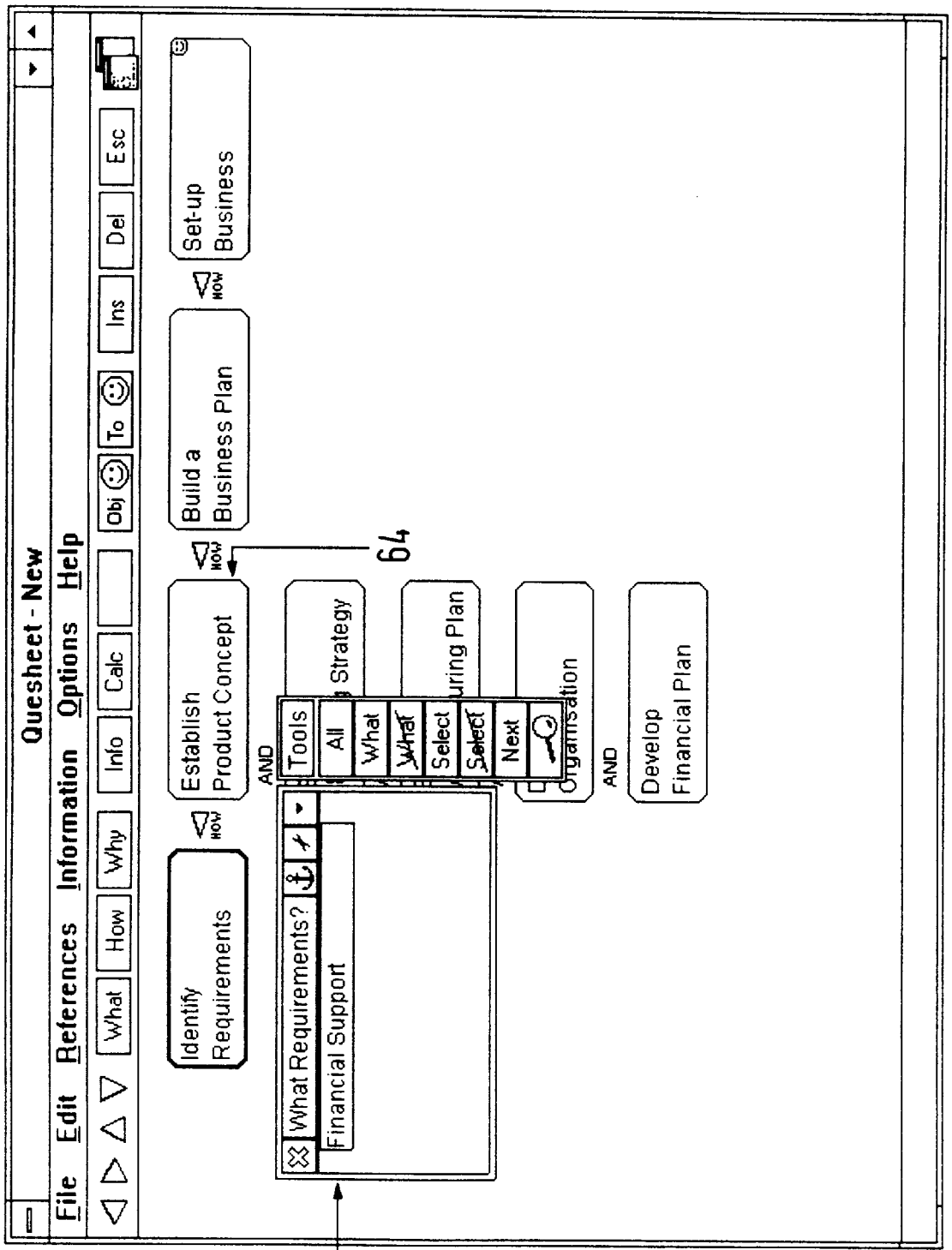
FIG. 13 is a display screen of an overlaid window as in FIG. 6.
Figure 14:
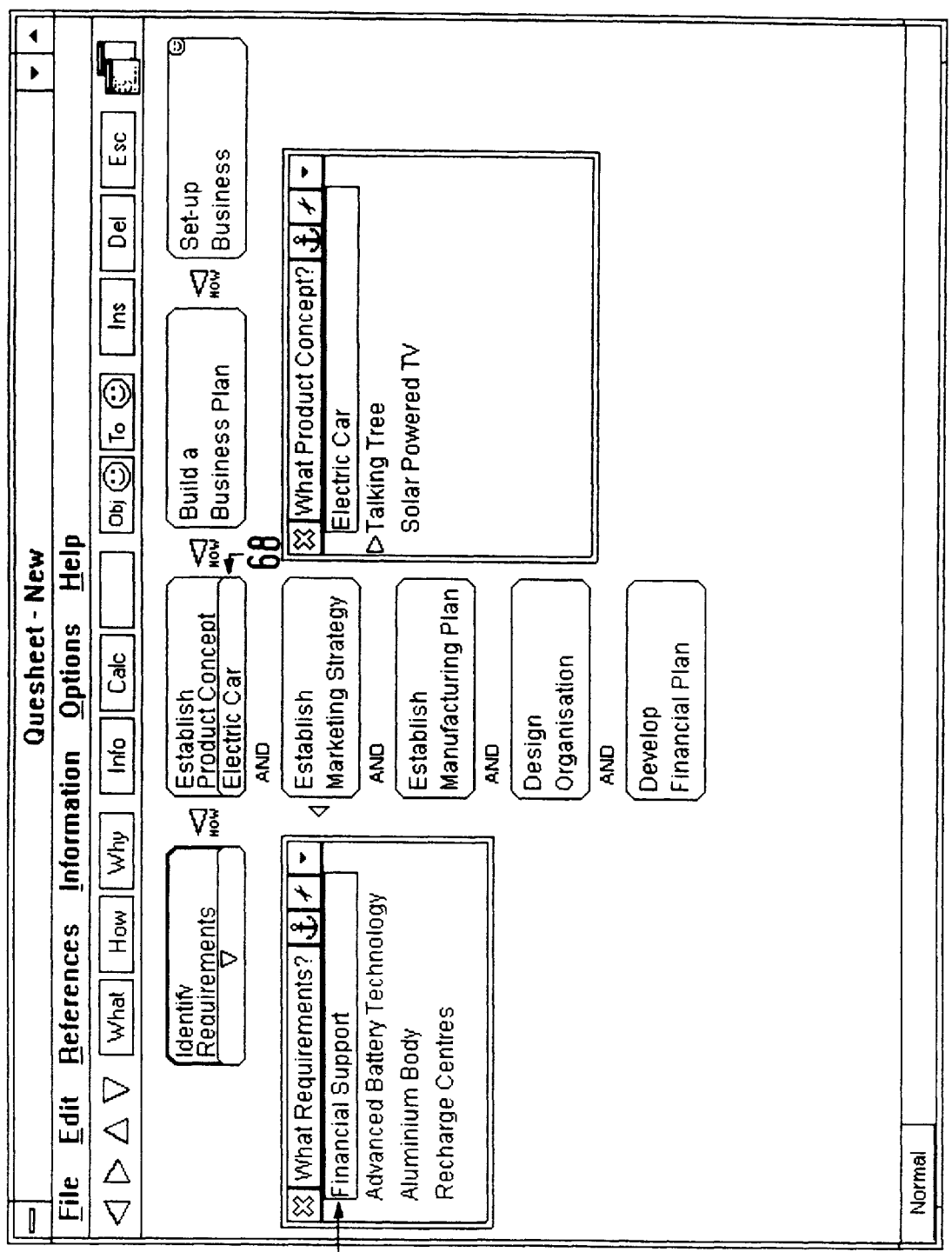
FIG. 14 is a display screen of two overlaid windows indicating object inheritance.

The object inventory that is displayed when there is a PSF for a process to the right is also dependant upon the object inventory of any objects that are more senior in the object hierarchy than the PSF object. This behaviour is Object Inheritance and is illustrated in FIGS. 13 and 14. In FIG. 13 the object "Financial Support" 62 is entered into the inventory of process "Identify Requirements" with the process to the right being "Establish Product Concept" 64 with no PSF selection. The "Requirement" "Financial Support" is therefore associated with "Product Concept" and the complete inventory of objects for "Product Concept". FIG. 14 illustrates "Electric Car" promoted to the PSF of "Establish Product Concept" and its associated WHAT? inventory for process "Identify Requirements" associated with "Product Concept" "Electric Car", as originally illustrated in FIG. 12, now includes "Financial Support" as part of the inventory, because "Financial Support" has been inherited from "Product Concept" ("Electric Car" is a part of the WHAT? inventory of "Product Concept").

Figure 15:
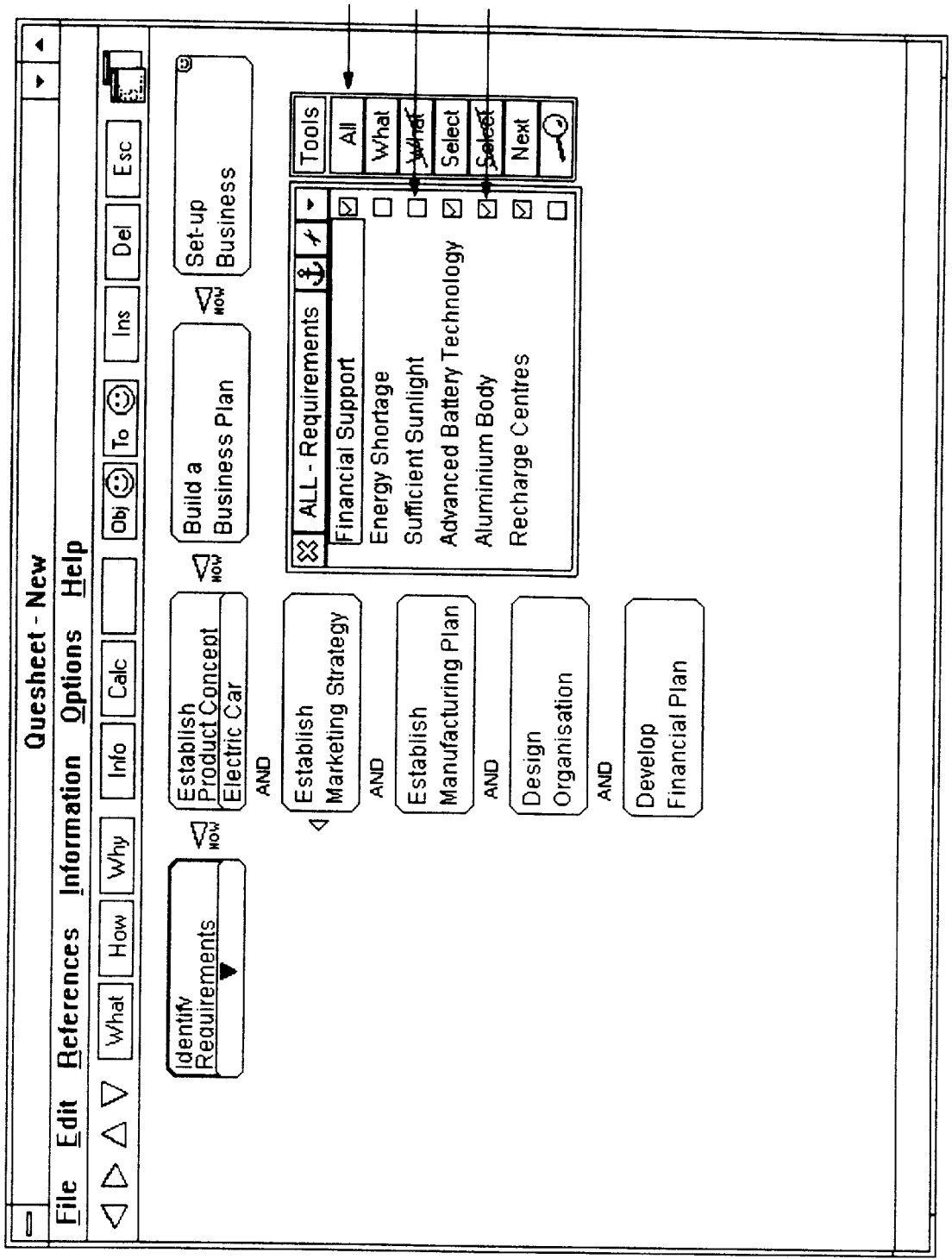
FIG. 15 is a display screen of an overlaid window indicating All mode.

All objects within the inventory of objects can be displayed, irrespective of context, by setting the WHAT? display into All mode. FIG. 15 illustrates the WHAT? inventory for process "Identify Requirements" in All mode, and shows all of the objects that exist in the inventory irrespective of context. To change a WHAT? display from normal to All mode the user clicks on the Tool Bar All button 70. To re-display the normal (non-All) mode for the WHAT? display, the user clicks (and raises) the same All button 70. When a WHAT? display is in All mode, a box icon to the right of each object in the display indicates whether or not the object has context with the process to the right. Objects with context have a tick in the box 72, whilst objects without context do not have a tick in the box 74.

Figure 16:
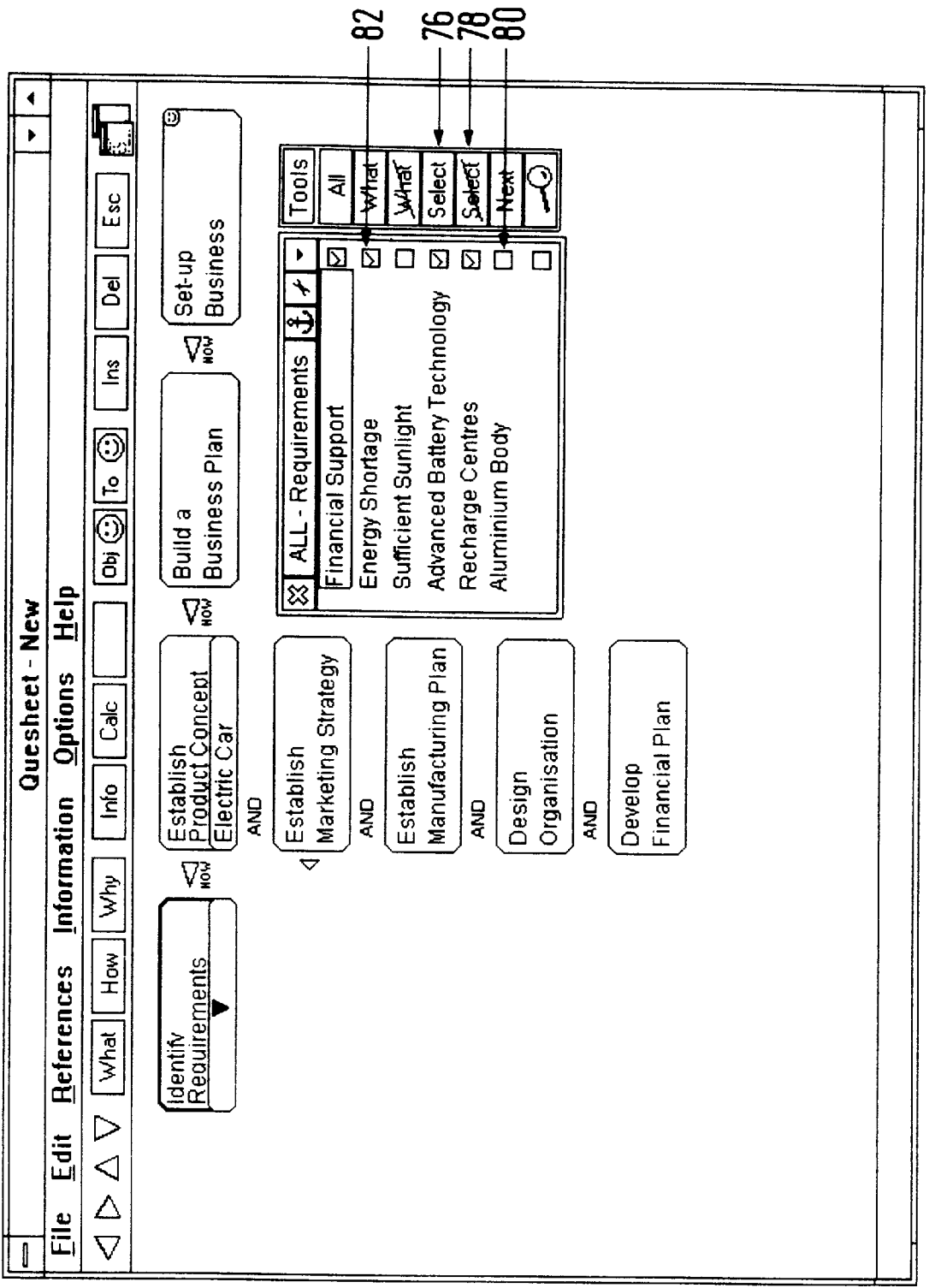
FIG. 16 is a display screen of an overlaid window indicating All mode Select and De-select.
Figure 17:
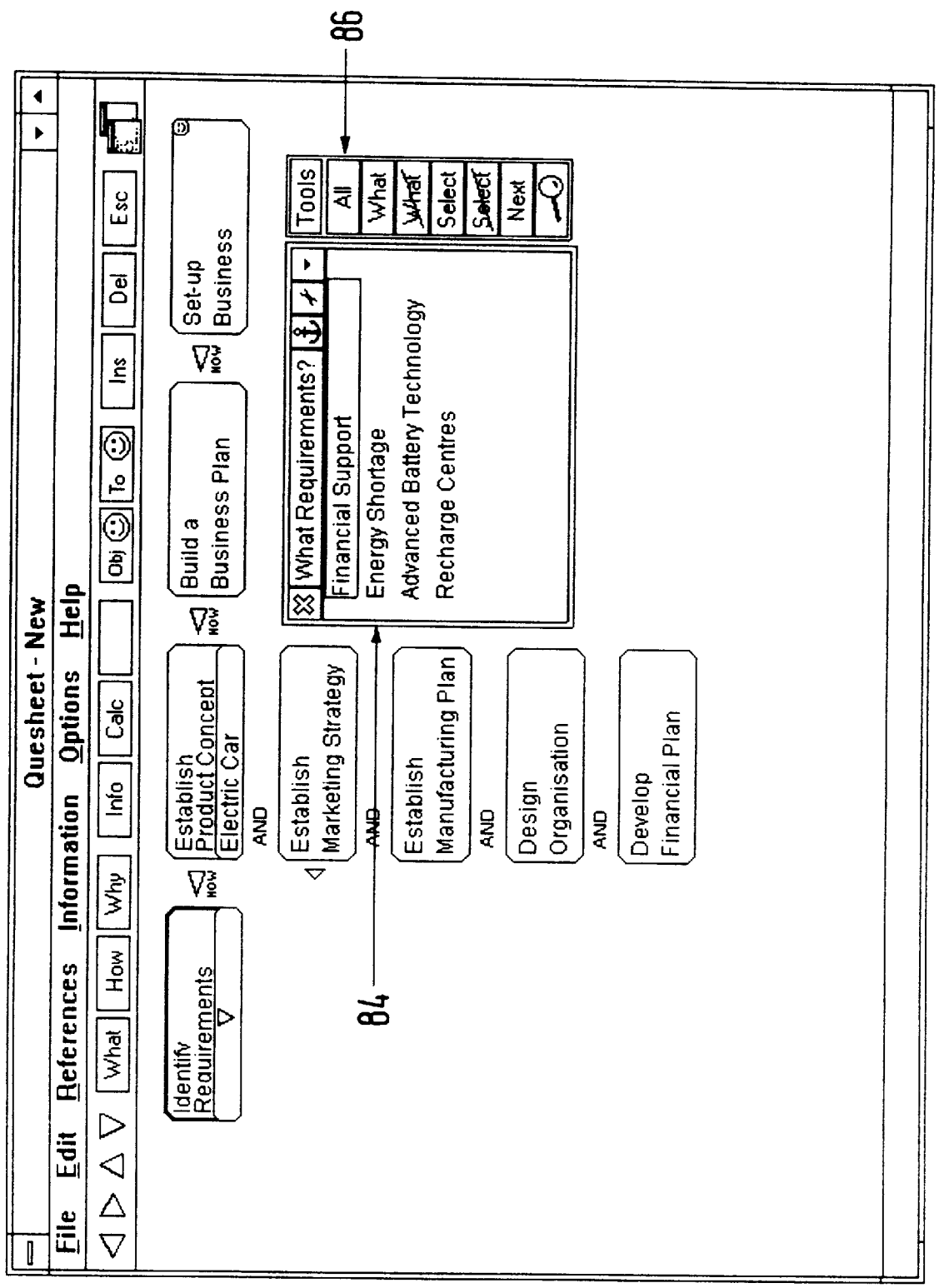
FIG. 17 is a display screen of an overlaid window indicating Normal mode.

The user may create or remove the relationship of an object with the process to the right by using the All mode Select and De-Select. All mode Select and De-Select are illustrated in FIGS. 16 and 17. The "Requirement" "Aluminium Body" in FIG. 16 is removed from relationship with "Product Concept" "Electric Car" by highlighting the object "Aluminium Body" and clicking on the Tool Bar De-Select button 78. The "Requirement" "Energy Shortage" is put into relationship with "Product Concept" "Electric Car" by highlighting the object "Energy Shortage" and clicking on the Tool Bar Select button 76. FIG. 17 shows the results of the above relationship changes. The WHAT? display for "Identify Requirements" has been changed to normal mode by clicking and raising the Tool Bar All button 86 and "Requirement" "Aluminium Body" is no longer displayed in the inventory whereas "Requirement" "Energy Shortage" is displayed in the inventory.

Figure 18:
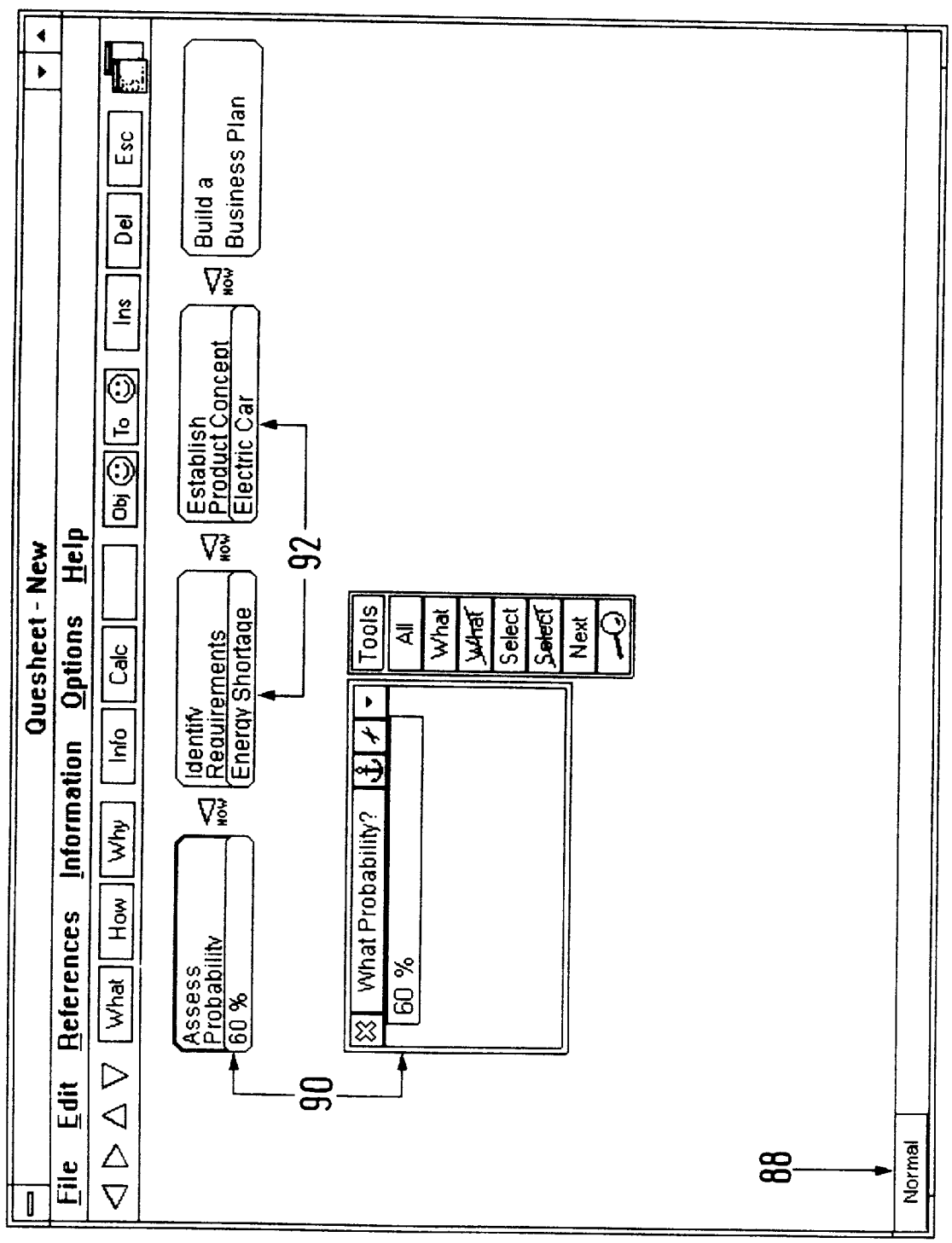
FIG. 18 is a display screen of an overlaid window with process boxes indicating compounding of objects.

Relationship dependency upon the process and/or process PSF selection to the right is termed Compounding. Compounding continues as you move to the left through a process model in How mode. FIG. 18 illustrates compounding further to the left. The process "Establish is Product Concept" has "Electric Car" promoted to the PSF. The process "Identify Requirements" has "Energy Shortage" promoted to the PSF. W now have the compounding "Electric Car Energy Shortage" 92. The process to the left of "Identify Requirements", "Assess Probability", has a PSF selection and WHAT? inventory of "60%". This illustrates that "Electric Car Energy Shortage" has a "Probability" "60%", showing that the "Probability" "60%" is compounded with "Energy Shortage" which is compounded with "Electric Car".

Figure 19:
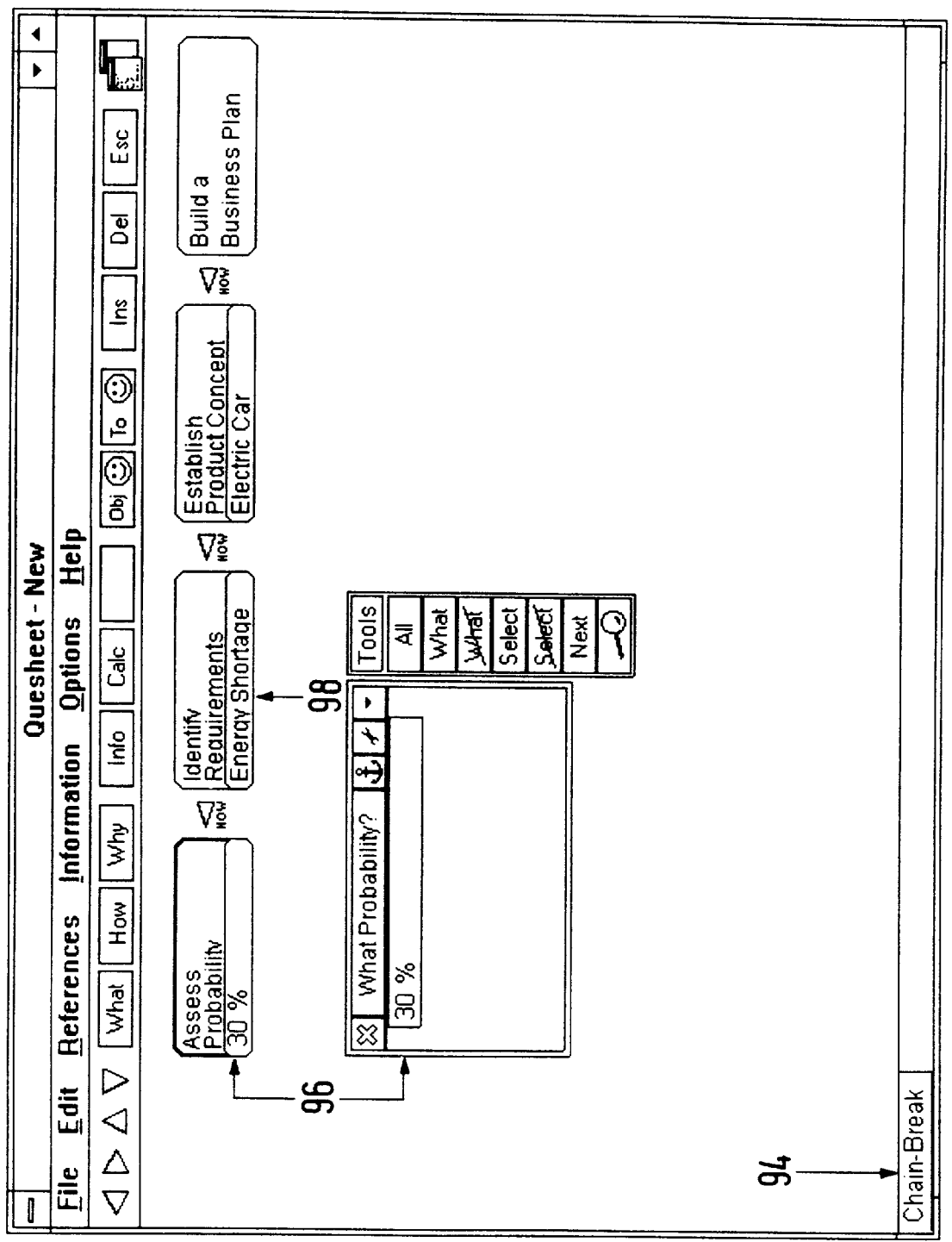
FIG. 19 is a display screen of an overlaid window with process boxes indicating process and object Chain-break.

Compounding can be stopped by Chain-breaks upon processes. When a process is a Chain-break it signifies that further dependencies to the left start compounding from that process. FIGS. 18 and 19 illustrate Chain-breaks and Normal processes. To set a process as Chain-break, clicked the Normal button 88 is clicked or pressed. The button 88 now displays the word Chain-break. The set a Chain-break process back to Normal, the same button (currently displaying the word Chain-break 94) is pressed and the button now displays the word Normal. The button 88/94 will display Chain-break or Normal, dependant upon which mode is set for a process, for each process as it is selected in he process model. FIG. 19 shows the process "Identify Requirements" 98 set as a Chain-break and shows the process "Assess Probability" with a PSF entry and WHAT? inventory of "30%". Under these (Chain-break) circumstances, the "Probability" "30%" is associated with "Requirements" "Energy Shortage" irrespective of what context is set for the process "Establish Product Concept".

Figure 20:
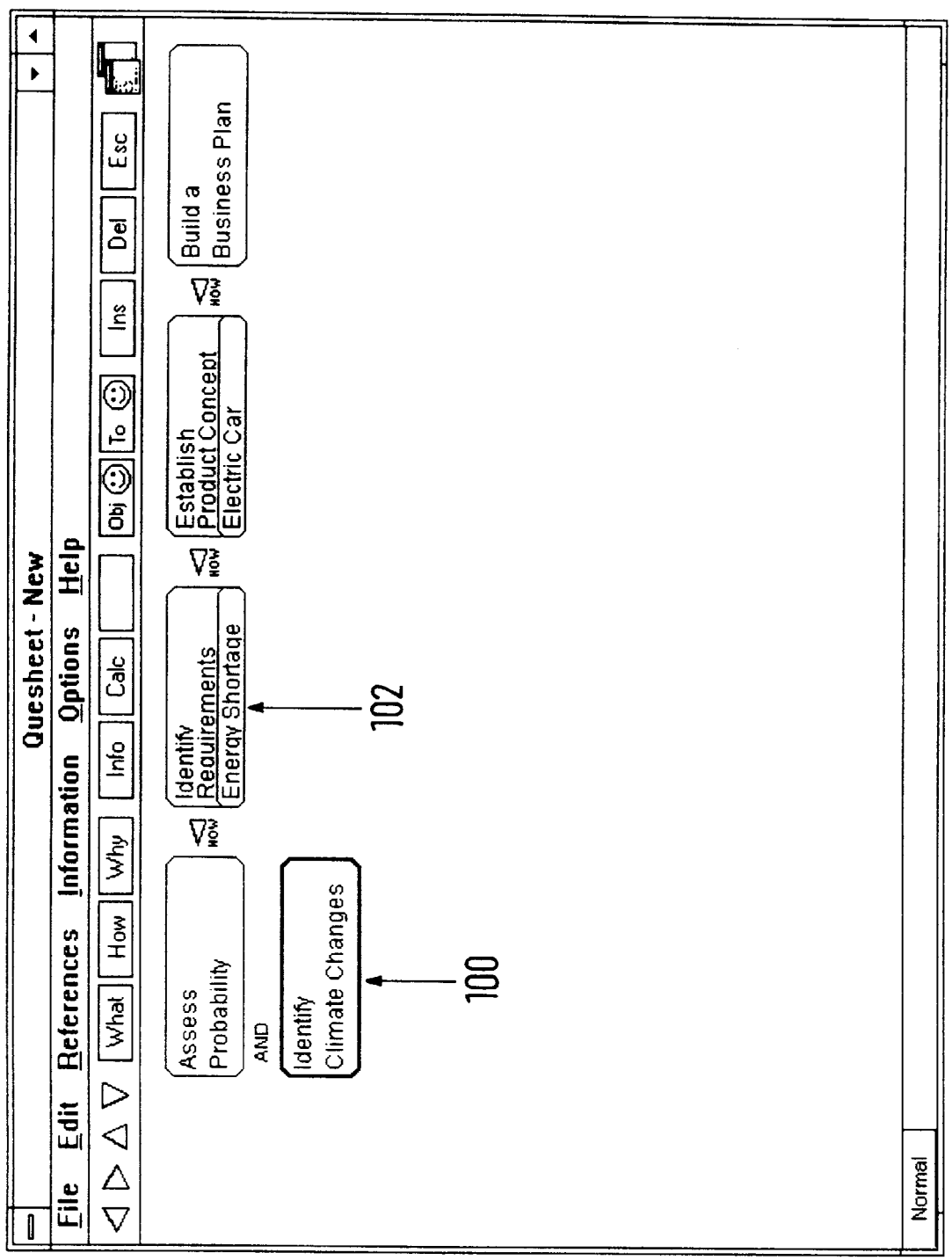
FIG. 20 is a display screen of process boxes in How mode indicating a How process dependent upon a PSF setting.
Figure 21:
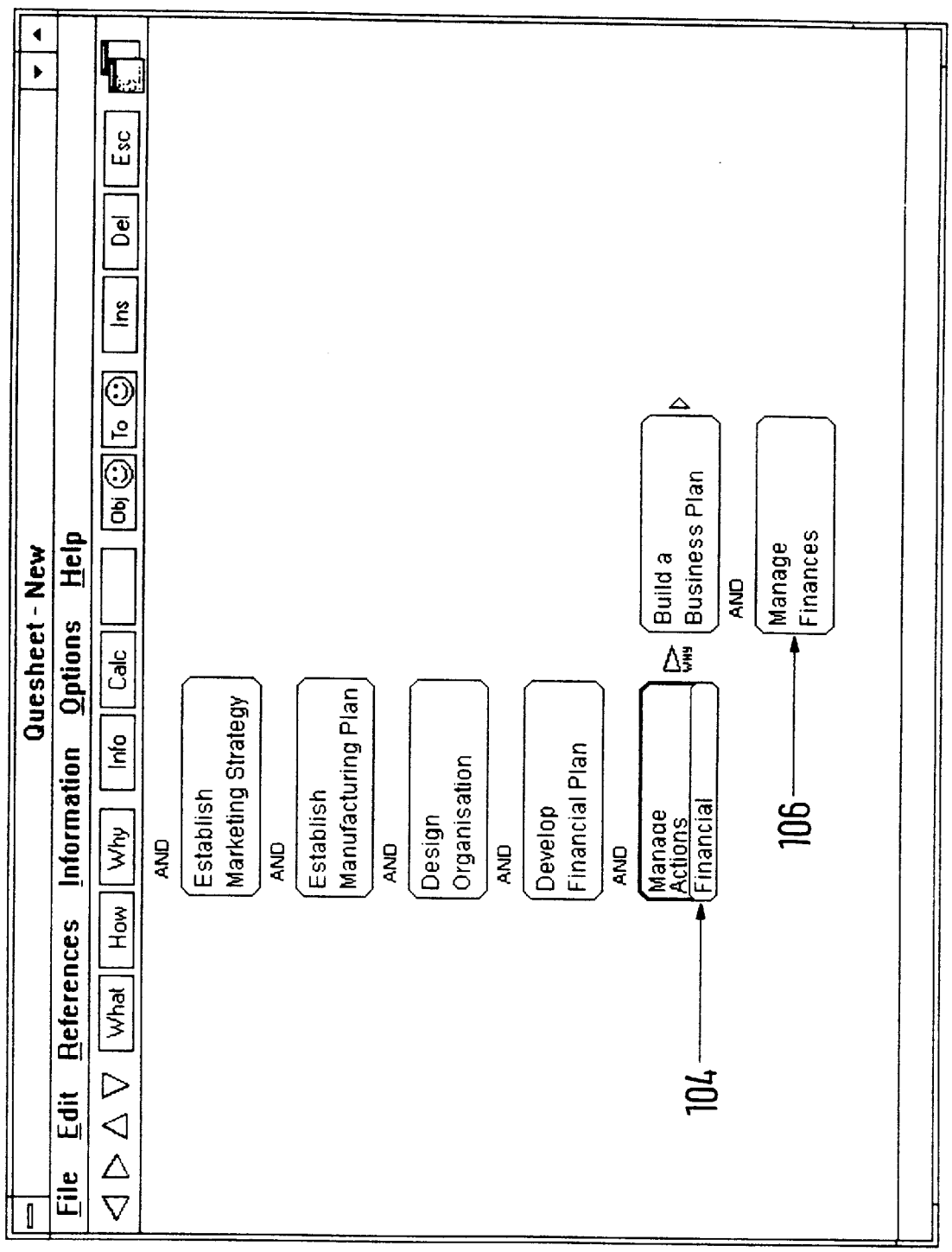
FIG. 21 is a display screen of process boxes in Why mode indicating a Why process dependant upon a PSF setting.

Processes with PSF selections can have How? or Why? process relationships that are only related to the process with its PSF selection. FIG. 20 illustrates a PSF process with a How process relationship. The process "Identify Climate Changes" 100 is only a How? of "Identify Requirements" when the object "Energy Shortage" is selected into the PSF of "Identify Requirements" 102. FIG. 21 illustrates a PSF process with a Why? process relationship. The process "Manage Finances" is only a Why? of "Manage Actions" when the object "Financial" is selected into the PSF of "Manage Actions". Note that inheritance also applies to process relationships—in FIG. 20 the process "Assess Probability" remains as a How? of the process "Identify Requirements" with the PSF selection "Energy Shortage" because the process "Assess Probability" is associated with the process "Identify Requirements" and the PSF selection "Energy Shortage" is part of the inventory of the process "Identify Requirements".

Figure 22:
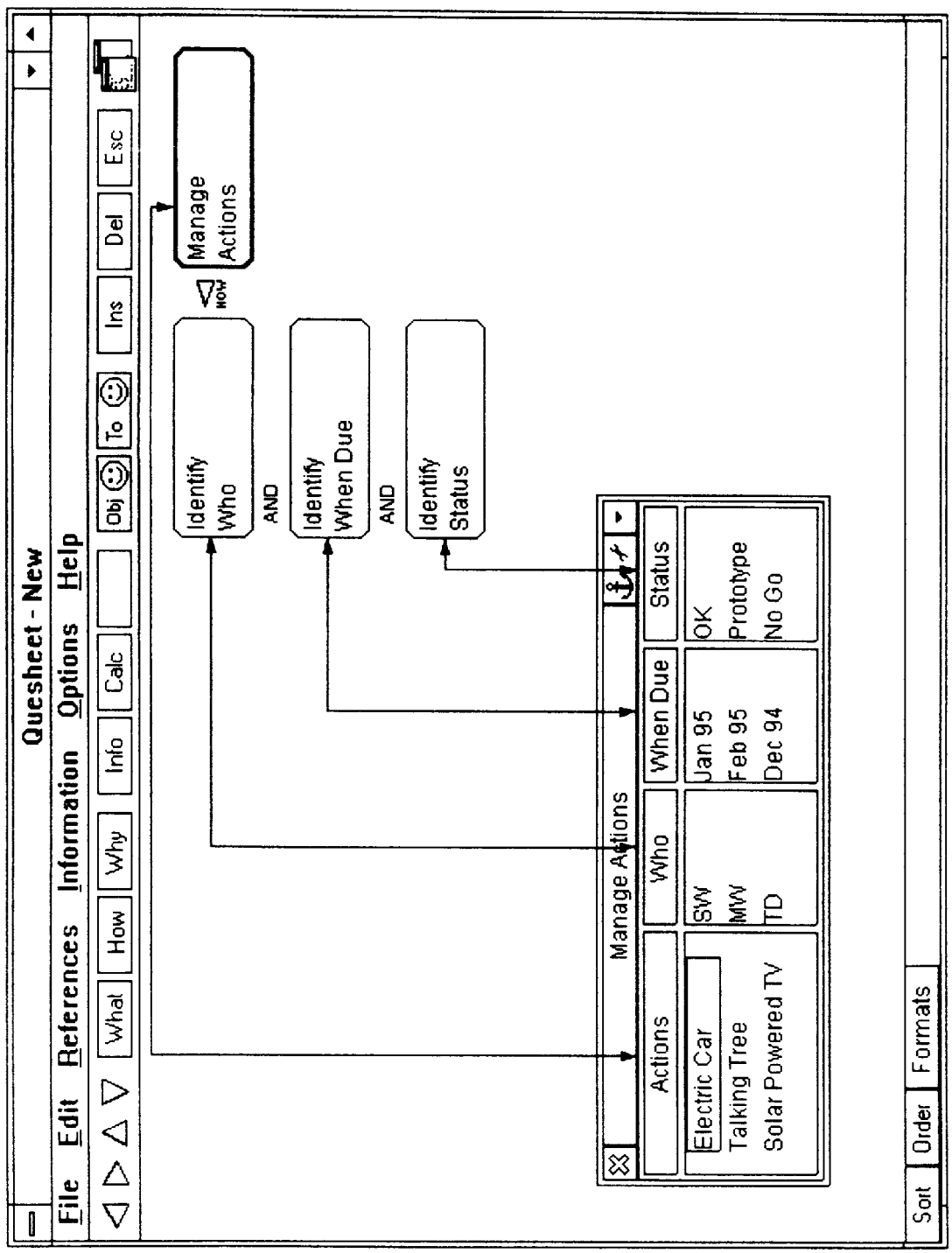
FIG. 22 is a display screen of an information window for a process.

Selection of the Info button generates an information window in which the row headings are of the sub-objects of the current process as with the information template. However, the column headings are automatically derived from the objects of the constituent processes in the stage below (to the left of) the current process. As associated processes are added or taken away, the columns in the information window will change accordingly. As processes are added to the model, the information window for a particular process will automatically generate column headings which will be taken from the object words of the constituent associated processes in the next model stage along in the HOW? direction. By this a tabular illustration of the status of a process can be called up in which the status of the preceding process objects can be laid out. FIG. 22 illustrates the relationships between processes and information window column headings.

By selecting the required object the relevant information window will be displayed. It is found that users can construct task models by blending construction using the process structure and the information window. The invention automatically creates a process box on the constituent level with which the information window is associated for any column heading added to the information window. Thus, a process object added to the template is revealed as a process box in the task model but without a verb attached to it. This missing verb can be added at the option of the user to the task model. Also at the option of the user the invention allows for deletion of such a process box added through the template if the user does not wish it to appear in the task model displayed.

The system may also provide pre-prepared templates for day-to-day usage not necessarily associated with any task model, such as an address list of relevant people. For example, a standard process 'contact people' can be installed in the system which has associated with it an information template for listing essential data on regularly contacted people. It must be borne in mind that this is not a process necessarily a part of a task model, but can be called up independently. Similarly, a diary facility can also be installed as a separate routine not linked to a task model or process.

Figure 23:
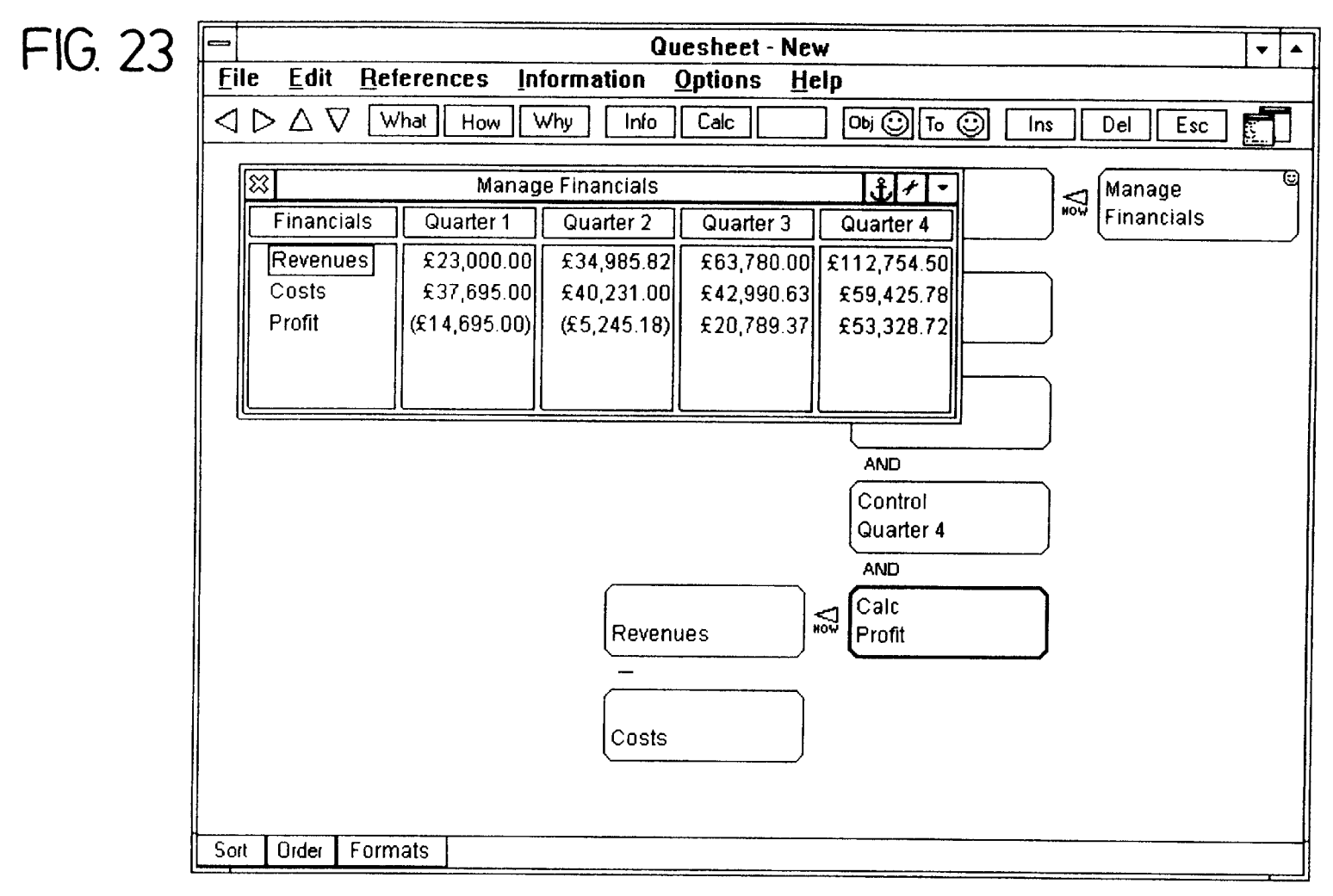

As part of a task model, and illustrative of the flexibility of the system to differing skill requirements, there is a 'Calc' button on the button bar 24 which will allow the user to construct processes in the task model for calculating figures. FIG. 23 illustrates the task model displayed when calculations have been set up for the process "Develop Financial Plan". The steps in the calculation have been set up as task processes.

The calculations represent important data in the steps of the task model. The calculations are applied to the objects in the associated information window illustrated in FIG. 23. Numerical data is entered for the objects on which the calculation is to be performed and the result is displayed automatically under the 'Profit' row heading in the information window. Thus, the information window provides a spreadsheet calculation facility in respect of the 'Calc' processes automatically arranged in tabular form in the information window. Calculations can be performed on rows, columns and specific cells within information windows. Additionally the user can select from pre-defined numerical and financial functions that can be used within calculations.

To review the task model in detail or as an overview, the options mean item has a FEEDBACK button which, when selected, allows the option of either detailed or general feedback on the task model. The detailed view provides a diagnostic on the completeness and logic of the task model, a time based overdue section that highlights processes of the task where, in conjunction with a date-based objective in the action window, no due date has been set or the date has been overrun. Also a comparison can be called up in the detailed feedback mode of the actual achievement of objectives with the targets set.

Figure 24:
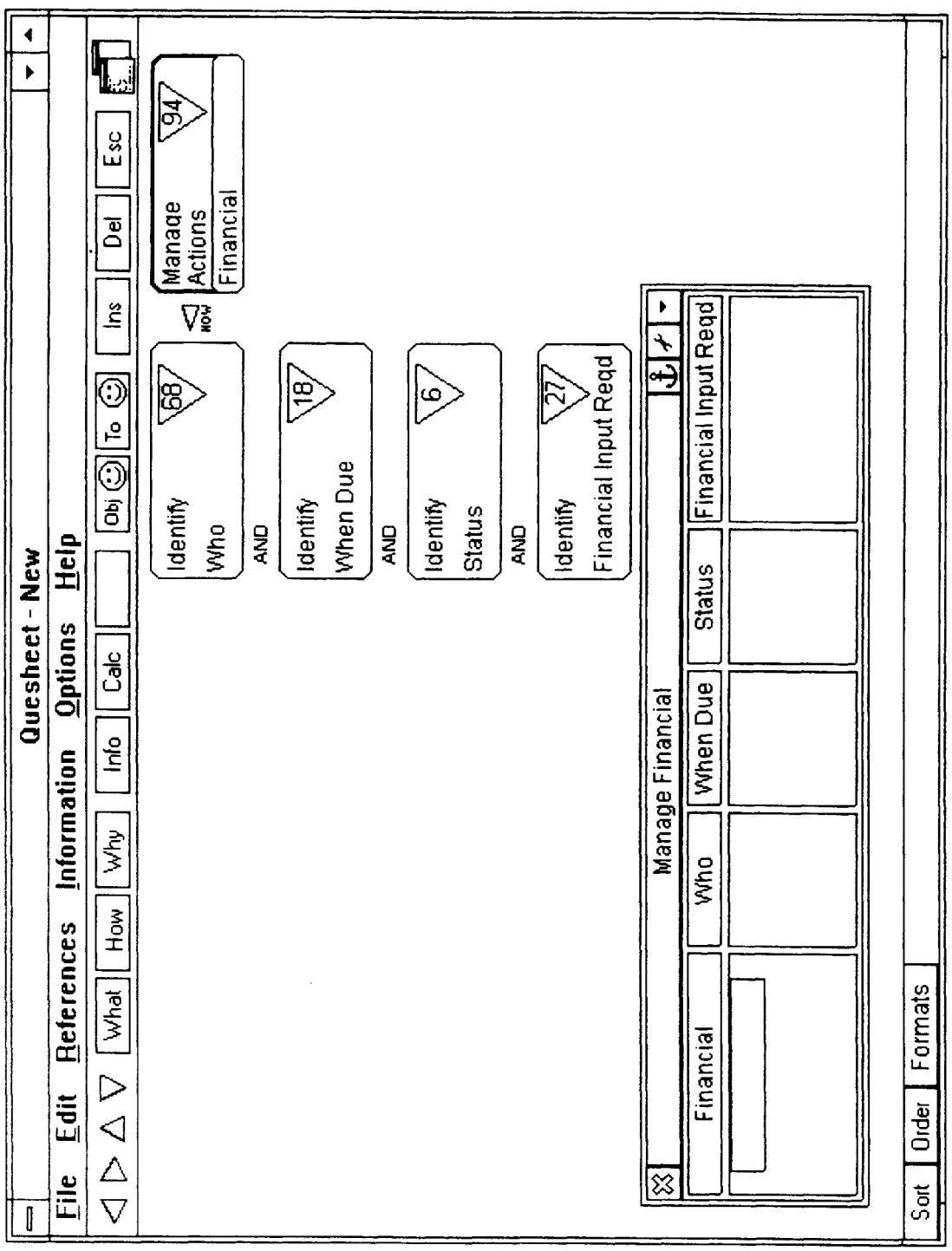
FIG. 24 is a display screen of a weighted task model indicating the degree of difficulty of the processes.

In the overview mode the feedback is displayed as illustrated in FIG. 24 by selecting the OPTIONS menu item on the menu bar 22. Each process is now annotated with a red triangle containing a number reflecting the difficulty of performing the process. The number can be assigned from any convenient range for example 0 to 99. The higher the number, the greater the degree of difficulty associated with the particular process. The weightings are then used by the system as it looks through a model for any of the processes listed. The number of instances of each condition that is found is then multiplied by the weighting to arrive at a total score for this condition. If the user selects detail mode for the feedback the information is displayed for the user condition by condition. In the overview mode, with the triangles displayed, then the total of all conditions for a process is computed to be a number between 0 and 99.

While models can be created by the user from a blank screen it is also possible to load the system with prewritten models for well-known and identified tasks. This may be acquired as part of the system or as a separate file to be loaded onto the existing system.

It will be noted that parallel processes in the same task stage are linked by the word 'AND' which is a logical AND indicating all the processes in that stage need to be satisfied before their associated process in the next stage above to the right can be completed. Of course the logical AND can be replaced with logical OR or THEN to indicate alternative processes and sequential processes, respectively.

It is likely that a particular user will reuse various key object and verb words and phrases in different task models. The system maintains all such words and phrases so that they can be retrieved from a dictionary. An object dictionary maintains a record of all objects together with their sub-objects, if any. An object can exist in many different models and different levels within models. Thus, wherever a particular object is used the subsequent HOW? steps will be those from the highest level, i.e. nearest the fundamental task process which is being modelled. This also applies to calculations which, therefore, need only be defined once and then used again in different models or in different parts of the same model. This has the consequence of allowing information or text that has been associated with an object to be retrieved in association with wherever that object is recited in a task model or in whichever task model the object is subsequently displayed. Thus, the invention also provides a cross referenced database between models.

A verb dictionary maintains a record of all the verbs and the processes in which they are used. The process dictionary maintains a record of all processes and where they are used.

Figure 25:
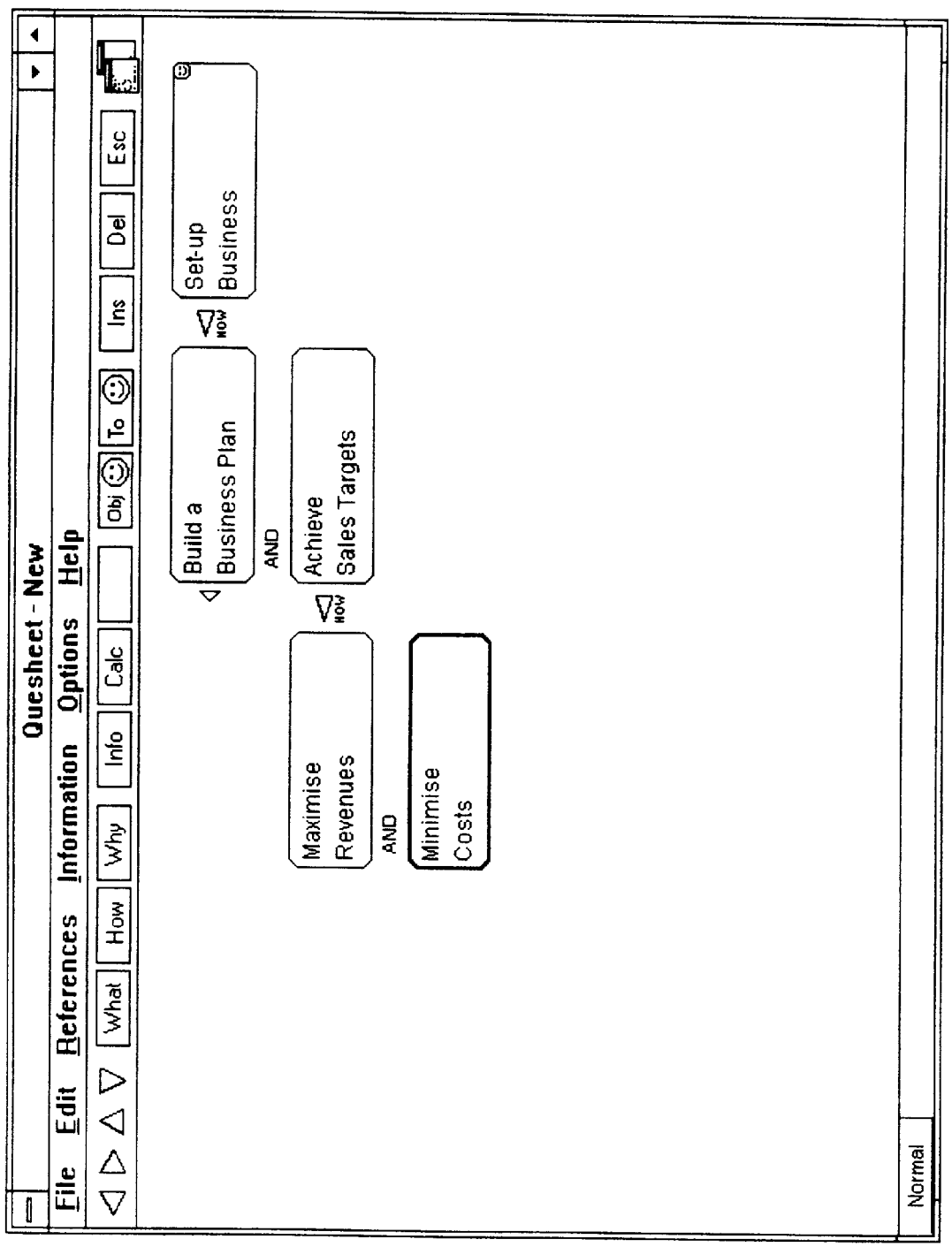
FIG. 25 is a display screen of part of a task model.

To modify a loaded task model, the cursor is moved to a position at the stage in the model at which the modification is to take place. This may be to add steps or to supplement a step already existing in the model. In the latter case the cursor is moved within the vertical area beneath an existing step in the model where the supplementary process is to appear. FIG. 25 illustrates the addition of the process 'achieve sales target' to the task model. In this case various other processes depending from this new process have also been added by means of the HOW? mode and parallel processes in each stage are added as described above using downward movement of the cursor. In the event that a process is inserted into any task model that has an entry in the reference dictionary, the system can be arranged automatically to add these processes as well.

Referring to the Entity Relation Diagram of FIG. 26 and Appendices A and B, the invention is also described in relation to extracts of its source code. All entity references are made using UPPERCASE.

Appendix A is a C++ class for managing movement around the display—What, how, why window. Appendix B is a C++ class for creation of the 1st order, and 2nd order OBJECTS. The appendices set down the key principles of the logical design in terms of the data structure and associated processing.

001 1st and 2nd Order Relationships
1. 1st order relationship is used to denote and store the relationship between any process OBJECT and each of its immediate how processes.
2. 2nd order relationship is used to denote and store the set of all the 1st order relationships for a process.
   and, as an Information Window is simply another way of viewing a part of a task model:
3. A row within an Information Window is a 2nd Order relationship.
4. Each column within an Information Window is a 1st Order relationship between that column and the leftmost column (the what list).

005 Process
1. The process is captured as a verb phrase and noun phrase.
2. Store the verb phrase as an OBJECT of OBJECT CATEGORY (2nd order) and the user entered text as an OBJECT TEXT instance.
3. Store the noun phrase as an OBJECT of CATEGORY (object primitive). Create an OBJECT TEXT instance for this OBJECT PRIMITIVE in order to store the text entered by the user.
4. Create an OBJECT of CATEGORY (2nd order) and connect this as a child of the OBJECT defined in 2 above using the OBJECT INHERITANCE relationship.
5. Create an OBJECT of CATEGORY (1st order) and create an OBJECT ASSOCIATION between this and the noun phrase created in 3 above.
6. Finally, create a relationship between the OBJECTS created in 4 & 5 above using the OBJECT ASSOCIATION entity.

010 How connection
When a how process is entered by the user, perform 005 for this process then make the how connection as follows:
1. Create an OBJECT (1st order) that has separate OBJECT ASSOCIATIONS between this and (1) the 005/4 OBJECT for this how process (the child process) (2) the 005/3 OBJECT for the process to which the how process is to be connected (the parent process)
2. Connect 010/1 to the 005/4 for the parent process
3. If this is not the first how process then connective logic will have been entered by the user i.e. And, Or, Then (AOT). Store the connector by creating an OBJECT CHARACTERISTICS (AOT) entity for the 010/1 OBJECT.

020 Why connection
A why connection is simply a how connection looked at in reverse. Therefore firstly perform 005 for the why process that the user has entered. Then perform 010 but using the process that the user has entered as the parent process and the current process as the child process.

030 What lists
When an object is added to the what list by the user:
1. Create an OBJECT (PRIMITIVE OBJECT) for the noun phrase entered. This is the same routine as 005/3
2. Create an OBJECT INHERITANCE relation with 030/1 as the child and the what is OBJECT as the parent
3. If the entered OBJECT is further broken down using the what command then create further OBJECT INHERITANCE relations with 030/1 as the parent and the further OBJECTS as the children
4. . . . and so on for any further breakdowns the user may enter.

040 Impact of THEN logic
Definitions 010 and 020 are applied when the user has entered connectors AND or OR. The logic however differs slightly when a THEN connector is entered. The difference is as follows :
1. The OBJECT defined in 010/1 (1) is replaced with the object created in 010/1.

Information Window

050 Displaying the Information Window
The information window is an extension of the what list which represents the Y-axis (rows). The X-axis (columns) are created either as a default set by the system or, as specifically instructed by the user (see define outputs) The default window columns are computed as follows :
1. Retrieve the OBJECT (2nd ORDER) for the current process
2. Retrieve the 005/3 for 050/1
3. Walk the OBJECT INHERITANCE relation for 050/2 and display each instance as the what list
4. Now walk the OBJECT ASSOCIATIONS for 050/1 to find each OBJECT (1st ORDER) with which 050/1 is associated 5. For each OBJECT (1st ORDER) found, walk the OBJECT ASSOCIATIONS again to find the 010/1(1) OBJECT
6. For each 010/1(1) OBJECT that is of CATEGORY (2nd ORDER) walk the OBJECT ASSOCIATION again to find the 005/5 OBJECT. For each 005/5 OBJECT walk the OBJECT ASSOCIATION again to find the 005/3 OBJECT. This OBJECT and its associated OBJECT TEXT instance represents a column header.

060 Defining Outputs

The user can override the default information window using the Define Output function:

1. If a deletion of a default column is indicated, then flag this within the data structure by creating an appropriate CHARACTERISTICS instance
2. If an additional column is indicated, store the text entered as an OBJECT of CATEGORY (OBJECT PRIMITIVE) in the same manner as 005/3
3. For these additional columns, also create an OBJECT (1st ORDER) as in 010/1 except that the 010/1(1) OBJECT is replaced with the OBJECT created in 060/2 above. note. use CHARACTERISTICS to indicate that this user defined column object is not a how process and should not be displayed 070 Rows The leftmost column is the what list for the current process and definition 030 applies. For any row to which the user makes a column entry:

1. Create an OBJECT (1st ORDER) for each level of the what hierarchy that the user has navigated to get to this row.
2. For each of these 1st ORDERS create separate OBJECT ASSOCIATIONS between the 1st ORDER and:
   (1) the 030/1 OBJECT for the row
   (2) the 070/2 OBJECT created at the level above.
   If the level above is the process object then use the appropriate 005/3 OBJECT
3. The 070/1 OBJECT at the lowest level (the row required) represents the process object for this row, i.e. a compound object.
4. Now create an OBJECT (2nd ORDER) for the row and create an OBJECT ASSOCIATION between this and 070/3
5. Now create an OBJECT INHERITANCE instance between this 2nd ORDER and 005/4 for the current process
6. For any column entry that the user wishes to make check cardinality—080
7. For each column entry create an OBJECT (PRIMITIVE OBJECT) if it does not already exist and an OBJECT INHERITANCE relationship with the column entry as the child, and the column header as the parent.
18. Then for each column entry, create an OBJECT (1st ORDER) and create separate OBJECT ASSOCIATIONS between this and:
   (1) 070/7
   (2) 070/3
9. Connect 070/8 into 070/4.

075 Selecting rows in the task model window

The user can also create rows using the information window. A row is equivalent to a parent process and its immediate how processes. Selection of sub objects into the process selection field is exactly equivalent to entering into the appropriate columns within the related information window.

078 WHAT versus SELECT

The WHAT command is used to navigate an OBJECT INHERITANCE structure into increasing levels of detail. When the required OBJECT is identified, the SELECT command indicates that this OBJECT and any related 'children' within the OBJECT INHERITANCE network are connected into the current association. With reference to 070 and 075, this applies to any column within a row and any process selection field.

080 Cardinality

The Define Output window allows the user to define cardinality. Specification of a minimum relationship and a maximum relationship is allowed. Each of these is specified in the form 1:n, where n is an integer or the word 'many'. The minimum relationship allows the user to specify a column as mandatory or optional. Also the user can specify that a column entry must already exist as a sub-object of the column header.

If the user has specified ONLY as the logic connector (stored as a characteristic), then the processes either side of this connector are mutually exclusive and entry on both sides of this connector, within the same row, must be prohibited.

090 Structural Sequence

The sequence of entry to the database is important in the following circumstances:

1. In OBJECT INHERITANCE the sequence should reflect the user entry sequence
2. IN OBJECT ASSOCIATION, when used in routine 050 and 070, the sequence between columns and associated row entries must be maintained when navigating the associated OBJECT INHERITANCE The button bar 24 also bears two symbols of a happy face and a sad face. These can be used when the task model is being set up to signify whether the user is confident or not of an identified process. The faces can be 'dragged' when selected by the mouse to any area on the screen. The system is defined in terms of an on-screen display bearing verb/object processes and windowed fields overlaying the basic task model for the purposes of temporary display, but it will be appreciated that other configurations and arrangements of the task model are possible. For example, the process steps of the task model may progress up or down the display. Other peripheral facilities may also be included in the system, such as the daily diary. The diary may be linkable to processes in one or more models on the system so that a diaried event may be used to alert the user to a deadline, for example. Similarly, the system has a pre-installed telephone, fax and address list template which is accessed through the standard process 'contact people' by selecting the Action button when the cursor is in the box denoting the 'contact people' process. The template appears and can be scrolled to the appropriate person or organisation. Selecting the Action button again will bring up the input template bearing the relevant details.

In compliance with the statute, the invention has been described in language more or less specific as to structural and functional features. It is to be understood, however, that the invention is not limited to the specific features shown, since the means of construction and method herein disclosed comprise only a preferred form of putting the invention into effect. Other modifications and other variations of the apparatus and method will occur to those of ordinary skill in the art. Accordingly, the foregoing description is to be interpreted in an illustrative, and not in a limitative sense and the invention is claimed in any of its forms or modifications with the legitimate, valid scope of the appended claims appropriately interpreted in accordance with the doctrine of equivalents.

APPENDIX A

```
// $Source: C:\logical\code\grid/RCS/MOVEMENT.H,v $
// $Revision: 1.2 $
// $Date: 1993/10/05 14:03:45 $
// (c) 1993 Logical Water      - J.R.Shannon ifndef _movement_h
define _movement_h class LWGridWindow;

class LWGridMovement
{
public:
        LWGridMovement(LWGridWindow* _grid);
        virtual ~LWGridMovement();
        // --
        void Left(TMessage&);
        void Right(TMessage&);
        void Up(TMessage&);
        void Down(TMessage&);

protected:
        void GetCurrentCell(int& _x, int& _y, LWGridCell*& _cell);
        LWGridCell* getAbove(int _x, int _y, LWGridCell* _cell);
        LWGridCell* getBelow(int _x, int _y, LWGridCell* _cell);
        LWGridCell* getLeft(int _x, int _y, LWGridCell* _cell);
        LWGridCell* getRight(int _x, int _y, LWGridCell* _cell);
        void UpFromProcess(void);
        void DownFromProcess(void);
        void LeftFromProcess(void);
        void RightFromProcess(void);
        void UpFromEmptyProcess(int _x, int _y, LWGridCell* _cell);
        void DownFromEmptyProcess(int _x, int _y, LWGridCell* _cell);
        void LeftFromEmptyProcess(int _x, int _y, LWGridCell* _cell);
        void RightFromEmptyProcess(int _x, int _y, LWGridCell* _cell);
        void UpFromVConnector(void);
        void DownFromVConnector(void);
        void LeftFromHConnector(void);
        void RightFromHConnector(void);
        //
        void LoseEmptyProcess(int _x, int _y, LWGridCell* _cell,
                              BOOL _setCurrent = FALSE);
        void ShiftCellsRight(int _x, int _y, LWGridCell* _cell, int _level = 0);
        void ShiftCellsLeft(int _x, int _y, LWGridCell* _cell, int _level = 0);
        void ShiftCellsUp(int _x, int _y, LWGridCell* _cell);
        //
        void ShuffleHowChildrenDown(int _x, int _y, LWGridCell* _cell,
                                    int _px, int _py, LWGridCell* _pcell, int _pd);
        void ShuffleWhyChildrenDown(int _x, int _y, LWGridCell* _cell, int _px,
                                    int _py, LWGridCell* _pcell, int _pd);
        int ShuffleChildrenUp(int _x, int _y, LWGridCell* _cell);
        //
        int DropProcess(int _sx, int _sy, LWGridCell* _scell, int& _dx,
                        int& _dy, CurrentType _dt);
        void HandleApresDrop(int _sx, int _sy, LWGridCell* _scell, int _dx,
                             int _dy, CurrentType _dt);
        void HandleVerticalMove(int _dx, int _dy, CurrentType _dt,
                                LWGridCell* dcell, int _sy);
        void HandleLeftMove(int _dx, int _dy, CurrentType _dt, LWGridCell* dcell,
                            int _sx, int _sy, LWGridCell* _scell);
        void HandleRightMove(int _dx, int _dy, CurrentType _dt, LWGridCell* dcell,
                             int _sx, int _sy, LWGridCell* _scell);
private:
        LWGridWindow& _grid;
};

#endif
```

```cpp
// $Source: C:\logical\code\grid/RCS/movement.cpp,v $
// $Revision: 1.2 $
// $Date: 1993/10/05 14:03:45 $
//
// (c) 1993 Logical Water - J.R.Shannon define C_NO_IOSTREAM
include <CDList.h>
#include <CString.h>
include <CVector.h> include "gs.h"

pragma hdrstop include "display.h"

static const char RCSid[] = "$Id: movement.cpp,v 1.2 1993/10/05 14:03:45 jason Exp jason $";

// ---------------------------------------------------------------- inline
void Beep(void)
{
   MessageBeep(-1);
}

// ---------------------------------------------------------------- void
LWGridMovement::UpFromProcess(void)
{
   int x, y; LWGridCell* cell;
   GetCurrentCell(x, y, cell);

if (cell->IsEmpty())
   {
      UpFromEmptyProcess(x,y,cell);
   }
   else
   {
      LWGridCell* above = getAbove(x,y,cell);
      if (above == 0)
      {
         if (cell->IsObjective())
         {
            LWGridCell* empty = grid.grid.GetNewGridCell();
            empty->SetSouthLink(0);
            empty->SetObjective();
            cell->SetNorthLink(-1);
            grid.grid.IncSurrounding(x,y-1);
            grid.grid.AddCell(x,y-1,empty);
            grid.cpxSetCurrent(x,y-1,x,y,0,ctProcess,FALSE);
         }
         else if (cell->GetMode() == gmHow && !cell->CheckEast() && !cell->CheckSouth() && !cell->CheckNorth())
         {
            Beep();
         }
         else if (cell->GetMode() == gmWhy && !cell->CheckWest() && !cell->CheckSouth() && !cell->CheckNorth())
         {
Beep();
         }
         else
         {
            int px, py, pd;
            LWGridCell* pcell;
            cell->GetMode() == gmHow ? grid.grid.LocateHowParent(x, y, cell, px, py, pcell, pd)
                                     : grid.grid.LocateWhyParent(x, y, cell, px, py, pcell, pd);
            if (pcell)   // found a parent?
            {
               grid.LoseCurrent();   // and any displayed children I hope...
               cell->GetMode() == gmHow ? ShuffleHowChildrenDown(x, y, cell, px, py, pcell, pd)
                                        : ShuffleWhyChildrenDown(x, y, cell, px, py, pcell, pd);
            }
            else
               Beep();
```

39

```
            }
        else
        {
            if (above->IsObjective())
            {
                grid.SetCurrent(x,y-1,cell->North());
            }
            else
            {
                grid.SetCurrent(x,y-1,cell->North(), ctVConnector);
            }
        }
    }
} void
LWGridMovement::DownFromProcess(void)
{
    int x, y; LWGridCell* cell;
    GetCurrentCell(x, y, cell);

if (cell->IsEmpty())
    {
        DownFromEmptyProcess(x,y,cell);
    }
    else
    {
        LWGridCell* below = getBelow(x,y,cell);
        if (below == 0)
        {
if (cell->IsObjective())
            {
                LWGridCell* empty = grid.grid.GetNewGridCell();
                empty->SetNorthLink(0);
                empty->SetObjective();
                cell->SetSouthLink(-1);
                grid.grid.IncSurrounding(x,y+1);
                grid.grid.AddCell(x,y+1,empty);
                grid.SetCurrent(x,y+1,0,ctProcess,FALSE);
            }
            else if (cell->GetMode() == gmHow && !cell->CheckEast() && !cell->CheckSouth() && !cell->CheckNorth())
            {
                Beep();
            }
            else if (cell->GetMode() == gmWhy && !cell->CheckWest() && !cell->CheckSouth() && !cell->CheckNorth())
            {
                Beep();
            }
            else
            {
                LWGridCell* empty = grid.grid.GetNewGridCell();
                empty->SetNorthLink(0);
                cell->SetSouthLink(-1);
                grid.grid.IncSurrounding(x,y+1);
                grid.grid.AddCell(x,y+1,empty);
                grid.cpxSetCurrent(x,y+1,x,y,0,ctProcess,FALSE);
            }
        }
        else
        {
if (cell->IsObjective())
            {
                grid.SetCurrent(x,y+1,cell->South());
            }
            else
            {
                grid.SetCurrent(x,y,cell->South(),ctVConnector);
            }
        }
    }
} void
LWGridMovement::LeftFromProcess(void)
{
    int x, y; LWGridCell* cell;
    GetCurrentCell(x, y, cell);

if (cell->IsEmpty())
    {
```

```
            LeftFromEmptyProcess(x,y,cell);
        }
    else
        {
            LWGridCell* left = getLeft(x,y,cell);
            if (cell->GetMode() == gmHow)
            {
                if (left)
                {
                    grid.SetCurrent(x,y,0,ctHConnector);
                }
                else
                {
                    LWGridCell* empty = grid.grid.GetNewGridCell();
                    empty->SetEastLink(0);
                    cell->SetWestLink(-1);
                    grid.grid.IncSurrounding(x+1,y);
                    grid.grid.AddCell(x+1,y,empty);
                    grid.SetCurrent(x+1,y,0,ctProcess,FALSE);
                }
            }
            else
            {
                if (cell->IsObjective())
                {
                    Beep();
                }
                else
                {
                    if (left)
                    {
grid.SetCurrent(x+1,y,cell->West(),ctHConnector);
                    }
                    else
                    {
                        int px, py, pd;
                        LWGridCell* pcell;
                        grid.grid.LocateWhyParent(x,y,cell,px,py,pcell,pd);
                        if (pcell)
                            grid.SetCurrent(px,py,pd);
                        else
                            Beep();
                    }
                }
            }
        }
} void
LWGridMovement::RightFromProcess(void)
{
    int x, y; LWGridCell* cell;
    GetCurrentCell(x, y, cell);

if (cell->IsEmpty())
    {
        RightFromEmptyProcess(x,y,cell);
    }
    else
    {
        LWGridCell* right = getRight(x,y,cell);
        if (cell->GetMode() == gmHow)
        {
            if (cell->IsObjective())
            {
                Beep();
            }
            else
            {
                if (right)
                {
                    grid.SetCurrent(x-1,y,cell->East(),ctHConnector);
                }
                else
                {
                    int px, py, pd;
                    LWGridCell* pcell;
                    grid.grid.LocateHowParent(x,y,cell,px,py,pcell,pd);
                    if (pcell)
                        grid.SetCurrent(px,py,pd);
                    else
                        Beep();
                }
```

SUBSTITUTE SHEET (RULE 26)

```
                        41
        )
      |
    else
      {
        if (right)
          {
            grid.SetCurrent(x,y,0,ctHConnector);
          }
        else
          {
            LWGridCell* empty = grid.grid.GetNewGridCell();
            empty->SetWestLink(0);
            cell->SetEastLink(-1);
            grid.grid.IncSurrounding(x-1,y);
            grid.grid.AddCell(x-1,y,empty);
            grid.SetCurrent(x-1,y,0,ctProcess,FALSE);
          }
      }
    }
  }
} void
LWGridMovement::UpFromEmptyProcess(int _x, int _y, LWGridCell* _cell)
{
  // If there's text that's been entered for this empty process,
  // but not yet entered, enter it and this then becomes a normal
  // process.

if (grid.CheckEmptyEditComplete(_x, _y, _cell))
    {
      return;
    }

LWGridCell* above = getAbove(_x,_y,_cell);
  if (above == 0)
    {
      Beep();
    }
  else
    {
      //int north = _cell->North();
      LoseEmptyProcess(_x, _y, _cell, TRUE);
    }
} void
LWGridMovement::DownFromEmptyProcess(int _x, int _y, LWGridCell* _cell)
{
  // If there's text that's been entered for this empty process,
  // but not yet entered, enter it and this then becomes a normal
  // process.

if (grid.CheckEmptyEditComplete(_x, _y, _cell))
    {
      return;
    }

LWGridCell* below = getBelow(_x,_y,_cell);
  if (below == 0)
    {
      Beep();
    }
  else
    {
      //int south = _cell->South();
      LoseEmptyProcess(_x, _y, _cell, TRUE);
    }
} void
LWGridMovement::LeftFromEmptyProcess(int _x, int _y, LWGridCell* _cell)
{
  // If there's text that's been entered for this empty process,
  // but not yet entered, enter it and this then becomes a normal
  // process.

if (grid.CheckEmptyEditComplete(_x, _y, _cell))
    {
      return;
    }

//LWGridCell* left = getLeft(_x,_y,_cell);
  LoseEmptyProcess(_x, _y, _cell, TRUE);
```

SUBSTITUTE SHEET (RULE 26)

42

```
void
LWGridMovement::RightFromEmptyProcess(int _x, int _y, LWGridCell* _cell)
{
  // If there's text that's been entered for this empty process,
  // but not yet entered, enter it and this then becomes a normal
  // process.

if (grid.CheckEmptyEditComplete(_x, _y, _cell))
    {
      return;
    }

//LWGridCell* right = getRight(_x,_y,_cell);

LoseEmptyProcess(_x, _y, _cell, TRUE);
}
// -----------------------------------------------------------------
void
LWGridMovement::UpFromVConnector(void)
{
  int x, y; LWGridCell* cell;
  GetCurrentCell(x, y, cell);

// If we're on a vertical connector, then we just set the
  // current process to the one we're already on, but set
  // the current type to ctProcess rather than the current
  // ctVConnector grid.SetCurrent(x, y, 0, ctProcess);
}
void
LWGridMovement::DownFromVConnector(void)
{
  int x, y; LWGridCell* cell;
  GetCurrentCell(x, y, cell);

// Is there a cell below this one?  Bloody well should be...

if (cell->CheckSouthLink())
    {
      LWGridCell* below = grid.grid.GetCell(x, y+1, cell->South());
      if (below)
        {
          grid.SetCurrent(x, y+1, cell->South());
        }
    }
  else
    {
      Beep();
    }
}
// -----------------------------------------------------------------
void
LWGridMovement::LeftFromHConnector(void)
{
  int x, y; LWGridCell* cell;
  GetCurrentCell(x, y, cell);

if (grid.mode == gmWhy)
    grid.SetCurrent(x, y, 0, ctProcess, FALSE);

else if (cell->CheckWestLink())
    {
      // If in How mode, then move onto the process box
      // to the left.

LWGridCell* left = grid.grid.GetCell(x+1, y, cell->West());
      if (left)
        {
          grid.SetCurrent(x+1, y, cell->West(), ctProcess, FALSE);
        }
    }
  else
    Beep();
}
```

SUBSTITUTE SHEET (RULE 26)

```
void
LWGridMovement::RightFromHConnector(void)
{
  int x, y; LWGridCell* cell;
  GetCurrentCell(x, y, cell);

if (cell->GetMode() == qmHow)
    grid.SetCurrent(x, y, 0, ctProcess, FALSE);

else if (cell->CheckEastLink())
     {
        // If in Why mode, then move onto the process box
        // to the right.

LWGridCell* right  = grid.grid.GetCell(x-1, y, cell->East());
        if (right)
          {
            grid.SetCurrent(x-1, y, cell->East(), ctProcess, FALSE);
          }
     }
  else
     Beep();
} void
LWGridMovement::ShuffleWhyChildrenDown(int _x, int _y, LWGridCell* _cell, int _px, int
_py, LWGridCell* _pcell, int _pd)
{
  // The new empty process box is to be inserted at (_x,_y) and
  // the current occupant and the ones below it are to be moved
  // down one row.
  // ---------------------------------------------------------------

// Move to the lowest process box in the child list (under _x,_y)

int cx = _x;
  int cy = _y;
  LWGridCell* ccell = _cell;

// get the old link to the northern cell, if any
  int oldNorth = ccell->North();

while (ccell && ccell->CheckSouthLink())
     {
        ccell = grid.grid.GetCell(cx, ++cy, ccell->South());
     } while (ccell && cy >= _y)
     {
        ccell->ClearWestLink();
        grid.grid.DeleteCell(cx, cy, ccell);   // remove
        grid.grid.IncSurrounding(cx, cy+1);
        grid.grid.AddCell(cx, cy+1, ccell);

LWGridCell* cur = ccell;

// Resolve the south link of the cell above...

if (ccell->CheckNorthLink())
          {
             ccell = grid.grid.GetCell(cx, cy - 1, ccell->North());
             if (ccell)
                if (cy != _y)
                  ccell->SetSouthLink(0);    // coz it IS
                else
                  ccell->SetSouthLink(-1);
          }
        else
          ccell = 0;    // no more above this one!
        cur->SetNorthLink(-1);    // coz it will be 0

// Move current process locator one down to follow moved current cell if (grid.currentProcess.x == cx && grid.currentProcess.y == cy)
          grid.currentProcess.y++;

grid.RenderProcessBox(cx, cy + 1, cur);

cy--;
     }

LWGridCell* empty = grid.grid.GetNewGridCell();
```

```
// The parent only gets linked to the new cell if it's
// on the same row, otherwise we can assume that the shuffle
// was to allow a cell to be inserted somewhere other than
// at the top of a list of children.

if (_py == _y)
   {
     _pcell->SetEastLink(-1);        // link to empty cell below current
     grid.RenderProcessBox(_px, _py);
     empty->SetWestLink(_pd);
   }
else
   empty->SetNorthLink(oldNorth);

// Insert a blank cell at _x,_y - resolve west link for parent,
// and east/south links for new the child.

empty->SetSouthLink(0);
grid.grid.IncSurrounding(_x, _y);
grid.grid.AddCell(_x, _y, empty);   // Add the empty cell
grid.SetCurrent(_x, _y);            // And give it currency
} void
LWGridMovement::ShuffleHowChildrenDown(int _x, int _y, LWGridCell* _cell, int _px, int
_py, LWGridCell* _pcell, int _pd)
{
// The new empty process box is to be inserted at (_x,_y) and
// the current occupant and the ones below it are to be moved
// down one row.
// ------------------------------------------------------------

// Move to the lowest process box in the child list (under _x,_y)

int cx = _x;
int cy = _y;
LWGridCell* ccell = _cell;

// get the old link to the northern cell, if any
int oldNorth = ccell->North();

while (ccell && ccell->CheckSouthLink())
   {
     ccell = grid.grid.GetCell(cx, ++cy, ccell->South());
   } while (ccell && cy >= _y)
   {
     ccell->ClearEastLink();
     grid.grid.DeleteCell(cx, cy, ccell);    // remove
     grid.grid.IncSurrounding(cx, cy+1);
     grid.grid.AddCell(cx, cy+1, ccell);

LWGridCell* cur = ccell;

// Resolve the south link of the cell above...

if (ccell->CheckNorthLink())
        {
          ccell = grid.grid.GetCell(cx, cy - 1, ccell->North());
          if (ccell)
             if (cy != _y)
                ccell->SetSouthLink(0);    // coz it IS
             else
                ccell->SetSouthLink(-1);
        }
     else
        ccell = 0;    // no more above this one!
     cur->SetNorthLink(-1);

// Move current process locator one down to follow moved current cell if (grid.currentProcess.x == cx && grid.currentProcess.y == cy)
        grid.currentProcess.y++;

grid.RenderProcessBox(cx, cy + 1, cur);

cy--;
   }

LWGridCell* empty = grid.grid.GetNewGridCell();

// The parent only gets linked to the new cell if it's
```

```
        // on the same row, otherwise we can assume that the shuffle
        // was to allow a cell to be inserted somewhere other than
        // at the top of a list of children.

if (_py == _y)
          {
          _pcell->SetWestLink(-1);        // link to empty cell below current
          grid.RenderProcessBox(_px, _py);
          empty->SetEastLink(_pd);
          }
        else
          empty->SetNorthLink(oldNorth);

// Insert a blank cell at _x,_y - resolve west link for parent,
        // and east/south links for now the child.

empty->SetSouthLink(0);
        grid.grid.IncSurrounding( x,  y);
        grid.grid.AddCell(_x, _y, empty);   // Add the empty cell
        grid.SetCurrent(_x, _y);            // And give it currency
        }

// -------------------------------------------------------------

LWGridMovement::LWGridMovement(LWGridWindow* _grid)
: grid(*_grid)
  {
  }

LWGridMovement::~LWGridMovement()
  {
  } void
LWGridMovement::GetCurrentCell(int& _x, int& _y, LWGridCell*& _cell)
  {
  _x = grid.currentProcess.x;
  _y = grid.currentProcess.y;
  _cell = grid.grid.GetCell(_x, _y);
  } void
LWGridMovement::Left(TMessage&)
  {
  switch (grid.currentType)
    {
    case ctNone:                // None?
    case ctVConnector:          // Can't move left off a vertical connector
      Beep();
      break;
    case ctProcess:
      LeftFromProcess();
      break;
    case ctHConnector:
      LeftFromHConnector();
      break;
    }
  } void
LWGridMovement::Right(TMessage&)
  {
  switch (grid.currentType)
    {
    case ctNone:                // None?
    case ctVConnector:          // Can't move right off a vertical connector
      Beep();
      break;
    case ctProcess:
      RightFromProcess();
      break;
    case ctHConnector:
      RightFromHConnector();
      break;
    }
  } void
LWGridMovement::Up(TMessage&)
  {
  switch (grid.currentType)
```

```
    case ctNone:       // None?
    case ctHConnector: // Can't move up off a horizontal connector
      Beep();
      break;
    case ctProcess:
      UpFromProcess();
      break;
    case ctVConnector:
      UpFromVConnector();
      break;
    }
} void
LWGridMovement::Down(TMessage&)
{
  switch (grid.currentType)
    {
    case ctNone:       // None?
    case ctHConnector: // Can't move down off a horizontal connector
      Beep();
      break;
    case ctProcess:
      DownFromProcess();
      break;
    case ctVConnector:
      DownFromVConnector();
      break;
    }
}

// ------------------------------------------------------------

LWGridCell*
LWGridMovement::getAbove(int _x, int _y, LWGridCell* _cell)
{
  LWGridCell* res = 0;
  if (_cell->CheckNorthLink())
    res = grid.grid.GetCell(_x, _y-1, _cell->North());
  return res;
}

LWGridCell*
LWGridMovement::getBelow(int _x, int _y, LWGridCell* _cell)
{
  LWGridCell* res = 0;
  if (_cell->CheckSouthLink())
    res = grid.grid.GetCell(_x, _y+1, _cell->South());
  return res;
}

LWGridCell*
LWGridMovement::getLeft(int _x, int _y, LWGridCell* _cell)
{
  LWGridCell* res = 0;
  if (_cell->CheckWestLink())
    res = grid.grid.GetCell(_x+1, _y, _cell->West());
  return res;
}

LWGridCell*
LWGridMovement::getRight(int _x, int _y, LWGridCell* _cell)
{
  LWGridCell* res = 0;
  if (_cell->CheckEastLink())
    res = grid.grid.GetCell(_x-1, _y, _cell->East());
  return res;
}

// ------------------------------------------------------------ void
LWGridWindow::WMLeft(TMessage& Msg)
{
  Left(Msg);
} void
LWGridWindow::WMRight(TMessage& Msg)
{
  Right(Msg);
}
```

```
void
LWGridWindow::WMUp(TMessage& Msg)
{
  Up(Msg);
} void
LWGridWindow::WMDown(TMessage& Msg)
{
  Down(Msg);
} void
LWGridWindow::WMOrigin(TMessage&)
{
  ResetToObjectives();
}

// ---------------------------------------------------------------------------
// ------- void
LWGridMovement::LoseEmptyProcess(int _x, int _y, LWGridCell* _cell, BOOL _setcurrent)
{
  int elink = _cell->East();
  int wlink = _cell->West();
  int slink = _cell->South();
  int nlink = _cell->North();

if (_cell->GetMode() == gmHow)
    {
      if (_cell->CheckWestLink() && _cell->CheckEastLink())
          { // 1
            grid.currentType = ctNone;
            grid.grid.DeleteCell(_x, _y, _cell);              // remove empty cell
            LWGridCell* wcell = grid.grid.GetCell(_x+1, _y, wlink);  // get cell to west
            ShiftCellsRight(_x, _y, _cell);                   // shift it and ones below it to the right
            grid.grid.FreeGridCell(_cell);
            wcell->SetEastLink(elink);                        // set link to empty's parent
            LWGridCell* ecell = grid.grid.GetCell(_x-1, _y, elink);  // get empty's parent
            ecell->SetWestLink(0);                            // set empty's parent's link to west cell
            grid.currentProcess.x = _x-1;
            grid.currentProcess.y = _y;
            if (_setcurrent)
               grid.SetCurrent(_x-1, _y);
            grid.RenderProcessBox(_x-1, _y);
            return;
          }
      else if (_cell->CheckSouthLink() && _cell->CheckEastLink())
          { // 2
            grid.currentType = ctNone;
            grid.grid.DeleteCell(_x, _y, _cell);              // remove empty cell
            LWGridCell* scell = grid.grid.GetCell(_x, _y+1, slink);  // get cell to south
            if (scell)
               scell->ClearNorth();
            ShiftCellsUp(_x, _y, _cell);                      // shift it and ones below it up
            grid.grid.FreeGridCell(_cell);
            scell->SetEastLink(elink);                        // set link to empty's parent
            LWGridCell* ecell = grid.grid.GetCell(_x-1, _y, elink);  // get empty's parent
            ecell->SetWestLink(0);                            // set empty's parent's link to west cell
            grid.currentProcess.x = _x;
            grid.currentProcess.y = _y;
            if (_setcurrent)
               grid.SetCurrent(_x, _y);
            grid.RenderProcessBox(_x-1, _y);
            return;
          }
      else if (_cell->CheckEastLink())
          { // 3
            grid.currentType = ctNone;
            grid.grid.DeleteCell(_x, _y, _cell);    // just remove empty
```

```
                grid.grid.FreeGridCell(_cell);
                LWGridCell* ecell = grid.grid.GetCell(_x-1, _y, elink);   // get empty's
parent
                ecell->ClearWestLink();
                ecell->ClearWest();
                grid.currentProcess.x = _x-1;
                grid.currentProcess.y = _y;
                if (_setcurrent)
                    grid.SetCurrent(_x-1, _y);
                grid.RenderProcessBox(_x-1, _y);
                return;
            }
        }
        else
        {
        if (_cell->CheckWestLink() && _cell->CheckEast Link())
            { // 4
                grid.currentType = ctNone;
                grid.grid.DeleteCell(_x, _y, _cell);                      // remove empty
cell
                LWGridCell* ecell = grid.grid.GetCell(_x-1, _y, elink);   // get cell to
east
                ShiftCellsLeft(_x, _y, _cell);                            // shift it and
ones below it to the left
                grid.grid.FreeGridCell(_cell);
                ecell->SetWestLink(wlink);                                // set link to
empty's parent
                LWGridCell* wcell = grid.grid.GetCell(_x+1, _y, wlink);   // get empty's
parent
                wcell->SetEastLink(0);                                    // set empty's
parent's link to east cell
                grid.currentProcess.x = _x+1;
                grid.currentProcess.y = _y;
                if (_setcurrent)
                    grid.SetCurrent(_x+1, _y);
                grid.RenderProcessBox(_x+1, _y);
                return;
            }
            else if (_cell->CheckWestLink() && _cell->CheckSouthLink())
            { // 5
                grid.currentType = ctNone;
                grid.grid.DeleteCell(_x, _y, _cell);                      // remove empty
cell
                LWGridCell* scell = grid.grid.GetCell(_x, _y+1, slink);   // get cell to
south
                if (scell)
                    scell->ClearNorth();
                ShiftCellsUp(_x, _y, _cell);                              // shift it and
ones below it up
                grid.grid.FreeGridCell(_cell);
                scell->SetWestLink(wlink);                                // set link to
empty's parent
                LWGridCell* wcell = grid.grid.GetCell(_x+1, _y, wlink);   // get empty's
parent
                wcell->SetEastLink(0);                                    // set empty's
parent's link to east cell
                grid.currentProcess.x = _x;
                grid.currentProcess.y = _y;
                if (_setcurrent)
                    grid.SetCurrent(_x, _y);
                grid.RenderProcessBox(_x+1, _y);
                return;
            }
            else if (_cell->CheckWestLink())
            { // 6
                grid.currentType = ctNone;
                grid.grid.DeleteCell(_x, _y, _cell);          // just remove empty
                LWGridCell* wcell = grid.grid.GetCell(_x+1, _y, wlink);   // get empty's
parent
                grid.grid.FreeGridCell(_cell);
                wcell->ClearEastLink();
                wcell->ClearEast();
                grid.currentProcess.x = _x+1;
                grid.currentProcess.y = _y;
                grid.RenderProcessBox(_x+1, _y);
                if (_setcurrent)
                    grid.SetCurrent(_x+1, _y);
                grid.RenderProcessBox(_x+1, _y);
                return;
            }
        }
        if (_cell->CheckNorthLink())
```

```
          grid.currentType = ctNone;
          grid.grid.DeleteCell(_x, _y, _cell);
          LWGridCell* scell = grid.grid.GetCell(_x, _y+1, slink);
          if (scell)
            scell->ClearNorth();
          ShiftCellsUp(_x, _y, _cell);
          grid.grid.FreeGridCell(_cell);
          if (scell)
            scell->SetNorthLink(nlink);
          LWGridCell* ncell = grid.grid.GetCell(_x, _y-1, nlink);
          if (scell)
            ncell->SetSouthLink(0);
          else
            ncell->ClearSouthLink();
            ncell->ClearSouth();
          }
          grid.currentProcess.x = _x;
          grid.currentProcess.y = scell ? _y : _y-1;
          if (_setcurrent)
            grid.SetCurrent(_x, scell ? _y : _y-1);
          grid.RenderProcessBox(_x, _y-1);
          return;
        }
      else if (_cell->CheckSouthLink() && _cell->IsObjective())
        { // 8
          grid.currentType = ctNone;
          grid.grid.DeleteCell(_x, _y, _cell);      // just remove empty
          LWGridCell* scell = grid.grid.GetCell(_x, _y+1, slink);  // get empty's parent
          grid.grid.FreeGridCell(_cell);
          scell->ClearNorthLink();
          scell->ClearNorth();
          grid.currentProcess.x = _x;
          grid.currentProcess.y = _y+1;
          if (_setcurrent)
            grid.SetCurrent(_x, _y+1);
          return;
        }
    }
} void
LWGridMovement::ShiftCellsUp(int _x, int _y, LWGridCell* _cell)
{
  // Move the cells from (_x, y+1) onwards up one position LWGridCell* current = _cell;

BOOL first = TRUE;
  int sth = current->South();

for (;;)
    {
      LWGridCell* below;
      if (current->CheckSouthLink())
        below = grid.grid.GetCell(_x, _y+1, sth);
      else
        break;

grid.grid.DeleteCell(_x, _y+1, below);
      grid.grid.IncSurrounding(_x, _y);
      grid.grid.AddCell(_x, _y, below);

sth = below->South();

if (below->CheckSouthLink())
        below->SetSouthLink(-1);

if (first == FALSE)
        below->SetNorthLink(0);
      //else if (!below->CheckNorthLink())
      //  below->ClearNorth();

grid.RenderProcessBox(_x, _y);
      current = below;
      first = FALSE;
      _y++;
    }
} void
LWGridMovement::ShiftCellsLeft(int _x, int _y, LWGridCell* _cell, int _level)
{
  // Move the cells from (_x-1, y) leftwards one position
```

SUBSTITUTE SHEET (RULE 26)

```
LWGridCell* current;

if (_cell)
   current = grid.grid.GetCell(_x-1, _y, _cell->East());
else
   current = grid.grid.GetCell(_x-1, _y, _level);

BOOL first = TRUE;

while (current)
   {
      grid.grid.DeleteCell(_x-1, _y, current);
      grid.grid.IncSurrounding(_x, _y);
      grid.grid.AddCell(_x, _y, current);

LWGridCell* below = 0;
      if (current->CheckSouthLink())
         {
            below = grid.grid.GetCell(_x-1, _y+1, current->South());
            current->SetSouthLink(-1);
         }
      if (first == FALSE)
         current->SetNorthLink(0);

grid.RenderProcessBox(_x, _y);
      current = below;
      first = FALSE;
      _y++;
   }
} void
LWGridMovement::ShiftCellsRight(int _x, int _y, LWGridCell* _cell, int _level)
{
   // Move the cells from (_x+1, y) rightwards one position LWGridCell* current;

if (_cell)
      current = grid.grid.GetCell(_x+1, _y, _cell->West());
   else
      current = grid.grid.GetCell(_x+1, _y, _level);

BOOL first = TRUE;

while (current)
      {
         grid.grid.DeleteCell(_x+1, _y, current);
         grid.grid.IncSurrounding(_x, _y);
         grid.grid.AddCell(_x, _y, current);

LWGridCell* below = 0;
         if (current->CheckSouthLink())
            below = grid.grid.GetCell(_x+1, _y+1, current->South());
            current->SetSouthLink(-1);
            }
         if (first == FALSE)
            current->SetNorthLink(0);

grid.RenderProcessBox(_x, _y);
         current = below;
         first = FALSE;
         _y++;
      }
}

// -------------------------------------------------------------------- int
LWGridMovement::DropProcess(int _sx, int _sy, LWGridCell* _scell, int6 _dx, int6 _dy,
CurrentType _dt)
{
   // We can assume that the source and destination locations are within
   // the same How/Why chain. If not, then something has screwed up and this
   // cannot be expected to work.

grid.StopEdits();

// Get to destination
   LWGridCell* dest = grid.grid.GetCell(_dx, _dy);
```

51

```
MType* parent = 0;
Process* current = 0;
MNwk* next = 0;
MNwk* prior = 0;
int gmode = dest->GetMode();
int insflag = 0;
int objcol = 0;

if (_dt == ctAbove)
   next = dest->getProcess().Rel;
else
   {
   if (dest->CheckSouthLink())
      {
      LWGridCell* below = grid.grid.GetCell (_dx, _dy+1, dest->South());
         if (below)
            next = below->getProcess().Rel;
      }
   } if (_dt == ctVConnector)
   prior = dest->getProcess().Rel;
else
   {
   if (dest->CheckNorthLink())
      {
      LWGridCell* above = grid.grid.GetCell(_dx, _dy-1, dest->North());
      if (above)
         prior = above->getProcess().Rel;
      }
   } if (dest->IsObjective())
   objcol = 1;
else
   {
   int px, py, pd;
   LWGridCell* pcell;
   dest->GetMode() == gmHow ? grid.grid.LocateHowParent(_dx, _dy, dest, px, py,
pcell, pd)
                            : grid.grid.LocateWhyParent(_dx, _dy, dest, px, py,
pcell, pd);
      if (pcell)
         parent = pcell->getProcess().Proc;
   } if (_dt == ctHConnector)
   insflag = 1;

MType* sourceparent = 0;
MNwk* sourcechild = 0;

{
int px, py, pd;
   LWGridCell* pcell;
   _scell->GetMode() == gmHow ? grid.grid.LocateHowParent(_sx, _sy, _scell, px, py,
pcell, pd)
                              : grid.grid.LocateWhyParent(_sx, _sy, _scell, px, py,
pcell, pd);
   if (pcell)
      sourceparent = pcell->getProcess().Proc;
} sourcechild = _scell->getProcess().Rel;

int res = grid.database->UpdateProcess(parent,
                                       current,
                                       prior,
                                       next,
                                       gmode,
                                       insflag,
                                       objcol,
                                       sourceparent,
                                       sourcechild);

if (res == 0)
   {
   // if it worked, then we need to update the grid to show it...

HandleApresDrop(_sx, _sy, _scell, _dx, _dy, _dt);
   }
else
```

SUBSTITUTE SHEET (RULE 26)

```
    {
      grid.DatabaseError(res);
    }
  return 0;
} void
LWGridMovement::HandleApresDrop(int _sx, int _sy, LWGridCell* _scell, int _dx, int
_dy, CurrentType _dt)
{
  LWGridCell* dcell = grid.grid.GetCell(_dx, _dy);

if (dcell == 0)
    grid.ResetToObjectives();

if (dcell->GetMode() == gmHow)
    {
      if (_sx >= _dx && _dt != ctHConnector)
        {
          HandleVerticalMove(_dx, _dy, _dt, dcell, _sy);
        }
      else if (_sx <= _dx)
        {
          HandleLeftMove(_dx, _dy, _dt, dcell, _sx, _sy, _scell);
        }
    }
  else
    {
      if (_sx <= _dx && _dt != ctHConnector)
        {
          HandleVerticalMove(_dx, _dy, _dt, dcell, _sy);
        }
      else if (_sx >= _dx)
        {
          HandleRightMove(_dx, _dy, _dt, dcell, _sx, _sy, _scell);
        }
    }
} void
LWGridMovement::HandleVerticalMove(int _dx, int _dy, CurrentType _dt, LWGridCell*
dcell, int _sy)
{
  int px, py, pd;
  LWGridCell* pcell;
  int mode = dcell->GetMode();
  mode == gmHow ? grid.grid.LocateHowParent(_dx, _dy, dcell, px, py, pcell, pd)
                : grid.grid.LocateWhyParent(_dx, _dy, dcell, px, py, pcell, pd);
  if (pcell)
    {
      grid.LoseCurrent();
      grid.grid.RemoveChildren(px, py, pcell, (pcell->GetMode() == gmHow) ? TRUE :
FALSE);
      grid.GenerateChildren(px, py, pcell);
      grid.RenderProcessBox(px, py, pcell);
      if (_dt == ctVConnector)
        grid.SetCurrent(_dx, _sy < _dy ? _dy : _dy+1);
      else if (_dt == ctAbove)
        grid.SetCurrent(_dx, _dy);
      else if (_dt == ctHConnector)
        if (mode == gmHow)
          grid.SetCurrent(_dx+1, _sy < _dy ? _dy : _dy+1);
        else
          grid.SetCurrent(_dx-1, _sy < _dy ? _dy : _dy+1);
    }
  else
    grid.ResetToObjectives();
} void
LWGridMovement::HandleLeftMove(int _dx, int _dy, CurrentType _dt, LWGridCell* dcell,
int _sx, int _sy, LWGridCell* _scell)
{
  CStack<MNwk*> relStack;

grid.LoseCurrent(FALSE);

relStack.push(dcell->getProcess().Rel);

// Move back up this process's chain until we hit the rightmost process.
  // Push parent Rels onto the stack as we go so we can get back to
  // the dx,dy later on.
```

```
                                          53
int x = _dx;
int y = _dy;
LWGridCell* cell = grid.grid.GetCell(x, y);
int dep = 0;

if (cell)
{
for (;;)
    {
        if (cell->CheckNorthLink())
           {
              y--;
              dep = cell->North();
              cell = grid.grid.GetCell(x, y, dep);
           }
        else if (cell->CheckEastLink())
           {
  X--;       dep - cell->East(), cell = grid.grid.GetCell(x, y, dep);
              relStack.push(cell->getProcess().Rel);
           }
        else
           break;
     } if (cell && cell->HasChildren())
        {
           grid.grid.RemoveChildren(x, y, cell, cell->GetMode() == gmHow ? TRUE :
FALSE);

// Rebuild the children and wander back down to the destination
           // cell...

grid.SetCurrent(x, y, dep);
           relStack.pop();

while (relStack)
              {
  X++;          if (cell->CheckWestLink())
                   {
                      dep = cell->West();
                      cell = grid.grid.GetCell(x, y, dep);

MNwk* target = relStack.pop();

while (cell->getProcess().Rel != target)
                         {
                            if (cell->CheckSouthLink())
                               {
                                  y++;
                                  dep = cell->South();
                                  cell = grid.grid.GetCell(x, y, dep);
                               }
                            else
                               break;
                         }
                      if (cell->getProcess().Rel == target)
                         grid.SetCurrent(x, y, dep, ctProcess, FALSE);
                   }
                else
                   break;
              }
        }
} void
LWGridMovement::HandleRightMove(int _dx, int _dy, CurrentType _dt, LWGridCell* dcell,
int _sx, int _sy, LWGridCell* _scell)
{
CStack<MNwk*> relStack;

grid.LoseCurrent(FALSE);

relStack.push(dcell->getProcess().Rel);

// Move back up this process's chain until we hit the rightmost process.
  // Push parent Rels onto the stack as we go so we can get back to
  // the dx,dy later on.

int x = _dx;
```

```
                                        54
int y = _dy;
LWGridCell* cell = grid.grid.GetCell(x, y);
int dep = 0;

if (cell)
    {
    for (;;)
        {
        if (cell->CheckNorthLink())
            {
            y--;
            dep = cell->North();
            cell = grid.grid.GetCell(x, y, dep);
            }
        else if (cell->CheckWestLink())
X++;        {
            dep = cell->)West();
            cell = grid.grid.GetCell(x, y, dep);
            relStack.push(cell->getProcess().Rel);
            }
        else
            break;
        } if (cell && cell->HasChildren())
        {
        grid.grid.RemoveChildren(x, y, cell, cell->GetMode() == gmHow ? TRUE : FALSE);
//Rebuild the children and wander back down to the destination
        // cell...

grid.SetCurrent(x, y, dep);
        relStack.pop();

while (relStack)
            {
            x--;
            if (cell->CheckEastLink())
                {
                dep = cell->East();
                cell = grid.grid.GetCell(x, y, dep);

MNwk* target = relStack.pop();

while (cell->getProcess().Rel != target)
                    {
                    if (cell->CheckSouthLink())
                        {
                        y++;
                        dep = cell->South();
                        cell = grid.grid.GetCell(x, y, dep);
                        }
                    else
                        break;
                    }
                if (cell->getProcess().Rel == target)
                    grid.SetCurrent(x, y, dep, ctProcess, FALSE);
                }
            else
                break;
            }
        }
    }
```

APPENDIX B

```
// $Source: D:\logical\code\dbase/RCS/LWDBASE.CPP,v $
// $Revision: 1.13 $
// $Date: 1993/09/24 14:57:04 $
//

// (C) 1993 by LOGICAL WATER

// Source file for LWRELATION   Functions
//                 LWBASE        Functions
//                 LWVERB        Functions
//                 LWOBJECT      Functions          note: In this CLASS, 'Type'
                                                          refers to 'Object'
// Date last updated : 17/08/93                            within the ER model // Notes : ---- include "lwdb.h"

//LWRELATION CLASS FUNCTIONS \\\\\\\\\\\\\\\\\\\\\\\\\\

LWRelation::LWRelation()                          //MType Category = 1 for 2nd Ord
Relations
{                                                 //               4 for 1st Ord
Relations
RelFlag = 0;
} int LWRelation::Get1Ord(MType* Rel1)
{
MNwk *MNRec1;
if (Rel1->Category != 4) { return -1; }
MNRec1 = Rel1->PTA[0];
RetRel1.Rel = Rel1;                               //Put pased 1st ord as parent.
RetRel1.Parent = MNRec1->PType[1];                //Put 1st ord 1st TA child Type
RetRel1.Child = MNRec1->PNext[0]->PType[1];       //Put 1st ord 2nd TA child Type
return 0;
}

MType* LWRelation::Get1Ord(int VersNo, long int TypeKey)
{
return PLWTp->GetType(4, VersNo, TypeKey);
} int LWRelation::Get1Ord(MType* TA1st, MType* TA2nd)
{
MNwk *MNRec1 = TA1st->PTA[1];
while (MNRec1 != NULL)
   {
   if (MNRec1->PNext[0] != NULL
       && MNRec1->PNext[0]->PType[1] == TA2nd
       && MNRec1->PType[0]->Category == 4)
      {
      break;
      }
   MNRec1 = MNRec1->PNext[1];
   }
if (MNRec1 == NULL) { return -1; }
RetRel1.Rel = MNRec1->PType[0];                   //Put TA parent type as parent
RetRel1.Parent = MNRec1->PType[1];                //Put 1st ord 1st TA child Type
RetRel1.Child = MNRec1->PNext[0]->PType[1];       //Put 1st ord 2nd TA child Type
return 0;
} int LWRelation::Get1Ordlst(MType* Target)
{
MType *MRec1;
if (Target->PTA[1] != NULL)
   {
   MRec1 = Target->PTA[1]->PType[0];
   }
else
   {
   return -1;
   }
if (MRec1->Category != 4)
   {
   return GetlOrdDir(Target, MRec1, 0);
   }
```

56

```
RetRell.Rel = MRec1;
RetRell.Parent = RetRell.Rel->PTA[0]->PType[1];
RetRell.Child = RetRell.Rel->PTA[0]->PNext[0]->PType[1];
return 0;
} int LWRelation::GetlOrdDir(MType* Target, MType* DirChRel, int Dir)
{
MNwk *MNRec1 = NULL;
MType *MRec1 = DirChRel;
while (MRec1 != NULL)
{
  if (MRec1->PTA[0] != NULL)
  {
    if (MRec1->PTA[0]->PType[1] == Target)
    {
      if (Dir == NEXT)
      {
        MNRec1 = MRec1->PTA[0]->PNext[1];
      }
      else
      {
        MNRec1 = MRec1->PTA[0]->PPrior[1];
      }
    }
    if (MRec1->PTA[0]->PNext[0] != NULL
      && MRec1->PTA[0]->PNext[0]->PType[1] == Target)
    {
      if (Dir == NEXT)
      {
        MNRec1 = MRec1->PTA[0]->PNext[0]->PNext[1];
      }
      else
      {
        MNRec1 = MRec1->PTA[0]->PNext[0]->PPrior[1];
      }
    }
  }
  if (MNRec1 == NULL) { return -1; }
  if (MNRec1->PType[0]->Category == 4) { break; }
  MRec1 = MNRec1->PType[0];
  MNRec1 = NULL;
}
RetRell.Rel = MNRec1->PType[0];
RetRell.Parent = RetRell.Rel->PTA[0]->PType[1];
RetRell.Child = RetRell.Rel->PTA[0]->PNext[0]->PType[1];
return 0;
}

MType* LWRelation::AddlOrd(MType* TA1st, MType* TA2nd, MType *PriorTA2, MType
*NextTA2, int Mode)
{
MType *MRec1;
MNwk *MNRec1, *MNRec2 = NULL;
if (RelFlag != 0) { return 0; }
MRec1 = PLWTp->AddType(0, 4);              //Create 1st Order Relation
if (PLWTp->IsTypeError())                  //(Category 4)
{
  RelFlag = 2;
  return NULL;
}
MNRec1 = PLWTA->AddNwk(MRec1, TA1st, NULL, NULL);//Add a TA record with parent of
if (PLWTA->IsNwkError())                   //new Type, child of TA1st and no
{                                          //prior position for parent or child
  PLWTp->DelType(NULL, NULL, NULL, MRec1); //Type
  RelFlag = 3;                             //If error delete created Type, set
  return NULL;                             //flag and return
}
if (Mode != -1)                            //If How or Why Process Rel -
{                                          //For How Get last rel for TA2nd for
  MNRec2 = TA2nd->PTA[1];                  //prior in relationship
  while (MNRec2 != NULL && MNRec2->PNext[1] != NULL) //For Why Get rel that matches
  {                                        //prior/next if either parameter is set
    if (Mode == WHY && MNRec2->PType[0]->PTA[1]->PType[0] == PriorTA2)
    {
      break;
    }
    if (Mode == WHY && MNRec2->PType[0]->PTA[1]->PType[0] == NextTA2)
    {
      MNRec2 = MNRec2->PPrior[1];
      break;
    }
    MNRec2 = MNRec2->PNext[1];
```

SUBSTITUTE SHEET (RULE 26)

```
PLWTA->AddNwk(MRec1, TA2nd, MNRec1, MNRec2);   //Add an TA record with parent of new
if (PLWTA->IsNwkError())                        //Type, child of TA2nd and prior
{                                               //parent of previously created TA and
  PLWTp->DelType(NULL, NULL, NULL, MRec1);      //no previous child
  PLWTA->DelNwk(NULL, MNRec1);                  //If error delete created Type and
  RelFlag = 3;                                  //first created TA, set flag and
  return NULL;                                  //return
}
return MRec1;
} int LWRelation::Del1Ord(MType* RelType)
{
if (RelFlag != 0) { return -1; }
if (RelType->Category != 4)                    //If the target Type is not a 1st
{                                              //order relation set error flag and
  RelFlag = 4;                                 //return
  return -1;
}
PLWTA->DelNwk(NULL, RelType->PTA[0]->PNext[0]);//Delete the 2 TA records & Type record
PLWTA->DelNwk(NULL, RelType->PTA[0]);          //(Note check for special case 1OR for
PLWTp->DelType(NULL, NULL, NULL, RelType);
return 0;
}

MType* LWRelation::Get2Ord(int VersNo, long int TypeKey)
{
return PLWTp->GetType(1, VersNo, TypeKey);
}

MType* LWRelation::Get2Ord(int VersNo, MType* Verb, MType* Obj)//Gets a 2OR for the
{                                              //requested Verb, Object and VersNo
WorkStack = new CStack<MNwk*>;                 //Create work stack
MType *MRec1, *MRec2 = NULL;
MNwk *MTI1;
if (Verb->PTI[0] != NULL)
  {
  WorkStack->push(Verb->PTI[0]);               //Push Verb first TI onto stack
  }
while (!WorkStack->isEmpty())                  //Loop while stack not empty
  {
  MTI1 = WorkStack->pop();                     //Pop from stack and check 2OR
  MRec1 = MTI1->PType[1];                      //object for match with param object
  if (MRec1->PTA[0] != NULL                    //If match set NRec2 and break
     && MRec1->VersNo == VersNo
     && MRec1->PTA[0]->PType[1]->PTA[0] != NULL
     && MRec1->PTA[0]->PType[1]->PTA[0]->PType[1] == Obj)
     {
     MRec2 = MRec1;
     break;
     }
  if (MTI1->PNext[0] != NULL)                  //If popped TI has a next push
     {                                         //onto stack
     WorkStack->push(MTI1->PNext[0]);
     }
  if (MTI1->PType[1]->PTI[0] != NULL)          //If popped TI's Child Type has
     {                                         //a child TI push onto stack
     WorkStack->push(MTI1->PType[1]->PTI[0]);
     }
  }
delete WorkStack;                              //Delete work stack
return MRec2;
} int LWRelation::Get2OrdDir(MType* Rel2, MNwk* DirTA, int Mode, int Dir)
{                                              //Get next or prior, HOW or WHY relation
int Mode1 = (1 - Mode);                        //after/before DirTA, for 2OR Rel2
MType *MRec1;                                  //Mode & Mode1 must be 0 & 1 or 1 & 0
MNwk *MTA1, *MTI1;
if (DirTA == NULL)
  {
  MTA1 = Rel2->PTA[Mode];                      //Dependant upon Dir and whether DirTA
  }                                            //has a value, set MTA1 to either the
else                                           //1st TA for the relation or the TA
  {                                            //before / after DirTA
  if (Dir == NEXT)
     {
     MTA1 = DirTA->PNext[Mode];
     }
```

```cpp
   MTA1 = DirTA->PPrior(Mode);
   }
  }
 if (MTA1 == NULL                                  //Check for valid relationships (see
    || MTA1->PType[Model] == NULL                  //directly below for explanation)
    || MTA1->PType[Model]->PTA[Mode] == NULL
    || (Mode == 0
        && MTA1->PType[Model]->PTA[Mode]->PNext[Mode] == NULL))
   {
    return -1;
   }
 if (Mode == 0)                                    //Set Type variable to TA-Child Type-
   {                                               //Parent TA-Next Parent TA-Child Type
    MRecl = MTA1->PType[1]->PTA[0]->PNext[0]->PType[1];//if mode 0
   }
 else
   {
    MRecl = MTA1->PType[0]->PTA[1]->PType[0];      //Set Type variable to TA-Parent Type-
   }                                               //Child TA-Parent Type if mode 1
 if (Mode == 0
     && MRecl == NULL)                             //If Mode 0 (HOW) and MRecl == null
   {                                               //then it is 2ORs 1st "empty" relation
    return -1;
   }
 RetRel2.RelTA = MTA1;                             //Set return relationship to new current
 if (MRecl->Category != 1)                         //If type not a 2nd Ord Rel set verb to
   {                                               //null set RelChild to MRecl (1st Ord
    RetRel2.Verb = NULL;                           //Rel or Object)
    RetRel2.RelChild = MRecl;
   }
 else
   {
    MTI1 = MRecl->PTI[1];
    while (MTI1->PType[0]->Category != 3)          //Otherwise loop 'up' TI hierarchy until
      {                                            //verb found & put into verb & set
       MTI1 = MTI1->PType[0]->PTI[1];              //RelChild to 2nd Ord Rel
      }
    RetRel2.Verb = MTI1->PType[0];
    RetRel2.RelChild = MRecl;
   }
 return 0;
 }

MType* LWRelation::Get2OrdHWParent(MNwk* ProcTA, int Mode)
{
return ProcTA->PType[Mode];
}

MType* LWRelation::Get2OrdSubDir(MType* Rel2, MNwk* DirTI, int Dir)
{
MNwk *MTI1;                                        //Dir = 0 for next, 1 for prior
if (DirTI == NULL)
   {
    MTI1 = Rel2->PTI[0];                           //Dependant upon Dir and whether DirTI
   }                                               //has a value, set MTI1 to either the
else                                               //1st TI for the relation or the TI
   {                                               //before / after DirTI
    if (Dir == NEXT)
      {
       MTI1 = DirTI->PNext[0];
      }
    else
      {
       MTI1 = DirTI->PPrior[0];
      }
   }
if (MTI1 != NULL)
   {
    return MTI1->PType[1];
   }
return NULL;
}

MType* LWRelation::Get2OrdParent(MType* Rel2)
{
if (Rel2->PTI[1] != NULL)                          //If child TI for parameter 2nd ord
   {                                               //not null, Parent type for that
    return Rel2->PTI[1]->PType[0];                 //TI May be the verb relation.
   }                                               //Return the type else return null
return NULL;
}

MType* LWRelation::Get2OrdChildOfRel(MNwk* RelChild, int Mode)
```

```
// If How mode check that relationship is not empty first
if (Mode == 0)
{
    if (RelChild->PType[1]->PTA[0]->PNext[0] == NULL) { return NULL; }
    return RelChild->PType[1]->PTA[0]->PNext[0]->PType[1];
}
if (Mode == 1)
{
    return RelChild->PType[0]->PTA[1]->PType[0];
}
return NULL;
}

MType* LWRelation::Add2Ord(int VersNo, MType* Verb, MType* Obj)
{
MType *MRec1, *MRec2;
if (RelFlag != 0) { return NULL; }
MRec1 = PLWTp->AddType(VersNo, 1);              //Create 2nd ord relation type
if (PLWTp->IsTypeError())                        //If error set flag and return
{
    RelFlag = 6;
    return NULL;
}
MRec2 = Add1Ord(Obj, NULL, NULL, NULL, -1);      //Create a 1st ord rel type for
if (RelFlag != 0)                                //parameter object. If error del
{                                                //2nd ord rel and return null
    PLWTp->DelType(NULL, NULL, NULL, MRec1);
    return NULL;
}
PLWTA->AddNwk(MRec1, MRec2, NULL, NULL);         //Add new TA record for 2OR and
if (PLWTA->IsNwkError())                         //1OR
{
    RelFlag = 12;
    return NULL;
}
Connect2OrdToTI(Verb, Obj, MRec1);               //Connect 2nd ord rel to verb in
if (RelFlag != 0)                                //TI structure. If error remove
{                                                //1st ord from 2nd ord and delete
    DelFrom2Ord(MRec1, MRec2->PTA[1]);           //1st and 2nd ord relations and
    Del1Ord(MRec2);                              //return null
    PLWTp->DelType(NULL, NULL, NULL, MRec1);
    return NULL;
}
return MRec1;
} int LWRelation::Del2Ord(MType* Target, int VersNo, MType* Verb, //Deletes a 2OR
                MType* Obj, int ForceFlag)//and its 1ORs and any associated
{                                          //1ORs for 2ORs it participates in
MType *MRec1;
MNwk *MNRec1, *MNRec2;
if (RelFlag != 0) { return -1; }
if (Target != NULL)
{
    MRec1 = Target;
}
else
{
    if ((MRec1 = Get2Ord(VersNo, Verb, Obj)) == NULL)
    {
        return -1;
    }
}
if (HasSubs(MRec1)
    && ForceFlag == 0)                           //If the target 2nd ord has sub
{                                                //relations (in TI structure) and
    RelFlag = 7;                                 //forceflag is not set set flag
    return -1;                                   //and return -1;
}
Del2OrdTI(MRec1, NULL, NULL, NULL);              //Delete TI connection for target
if (RelFlag != 0) { return -1; }                 //If error return -1
MNRec1 = MRec1->PTA[0];
while (MNRec1 != NULL)                           //Loop around 2nd ord relation TA
{                                                //set deleting its 1ORs & Nwk records
    Del1Ord(MNRec1->PType[1]);                   //Delete the 1OR
    if (RelFlag != 0) { return -1; }             //If error return -1
    MNRec2 = MNRec1;
    MNRec1 = MNRec1->PNext[0];
    PLWTA->DelNwk(NULL, MNRec2);                 //Delete the 1OR/2OR Nwk record
    if (PLWTA->IsNwkError())                     //in Target TA set
    {                                            //If error set flag and return
        RelFlag = 14;
```

60

```cpp
    return -1;
    }
  }
  MNRec1 = MRec1->PTA[1];
  while (MNRec1 != NULL)                    //Loop around 2ORs where MRec1
    {                                        //participates and remove MRec1
    Get2OrdDir(MRec1, NULL, 1, 0);           //from them
    if (RetRel2.RelChild != NULL)
      {
      DelFrom2Ord(RetRel2.RelChild, RetRel2.RelTA->PType[0]->PTA[1]);
      if (RelFlag != 0) { return -1; }
      }
    MNRec1 = MRec1->PTA[1];
    }
  PLWTp->DelType(NULL, NULL, NULL, MRec1);   //Delete the 2nd ord rel. if error
  if (PLWTp->IsTypeError())                  //set error flag and return -1
    {
    RelFlag = 8;
    return -1;
    }
  return 0;
  }

MNwk* LWRelation::AddTo2Ord(MType* Target, MType* Obj, MNwk* Prior,
                            MNwk* Next, MType* NewRel, int Mode)
  {
  MType *MRec1, *MRec2 = NULL, *MRec3 = NULL;
  MNwk *MNRec1 = NULL;
  if (RelFlag != 0) { return NULL; }
  if (Next != NULL) { MRec2 = Get2OrdChildOfRel(Next, Mode); }
  if (Prior != NULL) { MRec3 = Get2OrdChildOfRel(Prior, Mode); }
  MRec1 = Add1Ord(Obj, NewRel, MRec2, MRec3, Mode); //Create a 1st ord between the
  if (RelFlag != 0) { return NULL; }         //target 2OR Object and the Child 2OR
  if (IsEmpty2Ord(Target))                   //If the target 2nd ord does not
    {                                        //have relations then delete the
    Del1Ord(RetRel1.Rel);                    //'dummy' relation with Obj + null
    if (RelFlag != 0) { return NULL; }       //in it
    PLWTA->DelNwk(NULL, Target->PTA[0]);
    if (PLWTA->IsNwkError())
      {
      RelFlag = 11;
      return NULL;
      }
    }
  if (Mode == HOW                            //If the prior or next type parameter
      && Prior != NULL || Next != NULL)     //is not null and is HOW mode find
    {                                        //the TA record for the prior or next
    MNRec1 = Target->PTA[Mode];
    while (MNRec1 != NULL)
      {
      if (Prior != NULL
          && MNRec1 == Prior)
        {
        break;
        }
      if (Next != NULL
          && MNRec1 == Next)
        {
        MNRec1 = MNRec1->PPrior[Mode];
        break;
        }
      MNRec1 = MNRec1->PNext[Mode];
      }
    }
  if (Mode == WHY)
    {
    MNRec1 = Target->PTA[0];
    while (MNRec1 != NULL
           && MNRec1->PNext[0] != NULL)
      {
      MNRec1 = MNRec1->PNext[0];
      }
    }
  MNRec1 = PLWTA->AddNwk(Target, MRec1, MNRec1, NULL); //Add new TA record for target
  if (PLWTA->IsNwkError())                   //and passed newrel at correct
    {                                        //(MNRec1) position
    RelFlag = 12;
    return NULL;
    }
  return MNRec1;
  } int LWRelation::DelFrom2Ord(MType* Target, MNwk* RelRel,
```

61

```
MType *MRecl, *TargetObj;
MNwk *MNRecl;
if (RelFlag != 0) { return -1; }
TargetObj = Target->PTA[0]->PType[1]->PTA[0]->PType[1];
MNRecl = Target->PTA[0];
while (MNRecl != NULL)                      //Get to DelRel TA position
  {                                          //in Target TA set
  if (MNRecl == DelRel)
    {
    break;
    }
  MNRecl = MNRecl->PNext[0];
  }
if (MNRecl == NULL)                          //If DelRel not found in set
  {                                          //set flag and return
  RelFlag = 13;
  return -1;
  }
DelIOrd(MNRecl->PType[1]);                   //Delete the 1OR
if (RelFlag != 0) { return -1; }             //If error return -1
PLWTA->DelNwk(NULL, MNRecl);                 //Delete the Delrel relationship
if (PLWTA->IsNwkError())                     //in target TA set
  {                                          //If error set flag and return
  RelFlag = 14;
  return -1;
  }
if (Target->PTA[0] == NULL)                  //If target 2nd ord no longer has TAs;-
  {
  MRecl = AddIOrd(TargetObj, NULL, NULL, NULL, -1);//Create a 1st ord rel type for
  if (RelFlag != 0)                          //parameter object. If error
    {                                        //return
    return -1;
    }
  PLWTA->AddNwk(Target, MRecl, NULL, NULL);  //Add 1st ord rel to 2nd ord
  if (PLWTA->IsNwkError())                   //rel. If error delete 1st ord
    {                                        //rel and return null
    RelFlag = 15;
    DelIOrd(MRecl);
    PLWTp->DelType(NULL, NULL, NULL, MRecl);
    return -1;
    }
  }
return 0;
} void LWRelation::Connect2OrdToTI(MType* Verb, MType* Target, MType* New2Ord)
{
MNwk *MTI1, *MTI2 = NULL, *MTI3 = NULL;
MType *MRecl;
if (RelFlag != 0) { return; }
MTI1 = Verb->PTI[0];
while (MTI1 != NULL)                         //Walk the TI set for the verb
  {                                          //looking for a parent or child
  MRecl = MTI1->PType[1]->PTA[0]->PType[1]->PTA[0]->PType[1];
  if (PLWObj->IsChildObj(MRecl, Target))     //of the target object (Object
    {                                        //function IsChidlObj is called
    MTI2 = MTI1;                             //to do the comparison in the
    MTI1 = MTI1->PType[1]->PTI[0];           //Object TA structures). If a
    continue;                                //parent of the target is found
    }                                        //store in variable and go down
  if (PLWObj->IsChildObj(Target, MRecl))     //one level in loop to the
    {                                        //'parents' children. If a child
    MTI3 = MTI1;                             //is found break out of loop.
    break;                                   //If at end of verb set end loop
    }
  MTI1 = MTI1->PNext[0];
  }
if (MTI2 == NULL)                            //If no parents found set parent
  {                                          //variable to verb
  MRecl = Verb;
  }
else
  {
  MRecl = MTI2->PType[1];
  }
PLWTI->AddNwk(MRecl, New2Ord, NULL, NULL);   //Ad new TI with parent variable
if (PLWTI->IsNwkError())                     //as parent and new 2ord as child
  {                                          //If error set flag and return
  RelFlag = 5;
  return;
  }
while (MTI2 != NULL                          //Loop around child level and for
```

```
         && PLWObj->IsChildObj(Target, MTI3->PType[1]))   //each child :-
      {                                                    //delete the childs current TI rec
      MRec1 = MTI3->PType[1];                              //with its currewnt parent. If error
      PLWTI->DelNwk(NULL, MTI3);                           //set flag and return
      if (PLWTI->IsNwkError())
         {
         RelFlag = 5;
         return;
         }
      PLWTI->AddNwk(New2Ord, MRec1, NULL, NULL);           //Add a new TI record with new 2ord
      if (PLWTI->IsNwkError())                             //as parent and child as child
         {                                                 //if error set error flag
         RelFlag = 5;
         }
      MTI3 = MTI3->PNext[0];
      }
   } int LWRelation::Del2OrdTI(MType* Target, int VersNo, MType* Verb, MType* Obj)
{
MType *MRec1, *MRec2, *MRec3;
MNwk *MNRec1, *MNRec2;
if (RelFlag != 0) { return -1; }
if (Target != NULL)
   {
   MRec1 = Target;
   }
else
   {
   if ((MRec1 = Get2Ord(VersNo, Verb, Obj)) == NULL)
      {
      return -1;
      }
   }
MNRec1 = MRec1->PTI[0];
MNRec2 = MRec1->PTI[1];
MRec2 = MRec1->PTI[1]->PType[0];
while (MNRec1 != NULL)                              //Loop round Target TI set (1st
   {                                                //level children) and disconnect
   MRec3 = MNRec1->PType[1];                        //each child from target and connect
   PLWTI->DelNwk(NULL, MNRec1);                     //to targets parent by deleting and
   if (PLWTI->IsNwkError())                         //and creating TI records. If an error
      {                                             //on any disconnection or connection
      RelFlag = 9;                                  //set error flag and return
      return -1;
      }
   PLWTI->AddNwk(MRec2, MRec3, NULL, NULL);
   if (PLWTI->IsNwkError())
      {
      RelFlag = 10;
      return -1;
      }
   MNRec1 = MRec1->PTI[0];
   }
PLWTI->DelNwk(NULL, MNRec2);                        //Delete the TI connection between
if (PLWTI->IsNwkError())                            //targets parent and target. If error
   {                                                //set flag and return
   RelFlag = 10;
   return -1;
   }
return 0;
} long int LWRelation::IsManyRel(MType* PType)
{
long int i = 0;
MNwk *MNRec1 = PType->PTA[1];
while (MNRec1 != NULL)                              //Walk the child set for the target
   {                                                //Type until end, adding to a long
   i += 1;                                          //integer count. return long integer
   MNRec1 = MNRec1->PNext[1];                       //count
   }
return i;
}

BOOL LWRelation::IsEmpty2Ord(MType* Target)
{
if (Target->PTA[0] == NULL)                         //If 2nd Ord has no TAs then it is
   {                                                //being created and therefore is
   return FALSE;                                    //setup with null child
   }
GetlOrd(Target->PTA[0], PType[1]);                  //Get 1st ord for 2nd ord 1st TA
if (RetRel.Child == NULL)                           //If child of 1st ord is null then
```

63

```
{
  return TRUE;                        //is empty, setup 2nd ord and return
}                                     //true, otherwise return false
return FALSE;
} void LWRelation::ResetRelFlag()
{
RelFlag = 0;                          //Reset the Relation error flag plus
PLWTp->ResetFlag();                   //all other flags potentially effected
PLWTA->ResetFlag();                   //by this class
PLWTI->ResetFlag();
}
```

```
// $Source: D:\logical\code\dbase/RCS/LWDBASE.H,v $
// $Revision: 1.9 $
// $Date: 1993/09/21 12:58:59 $
//

// (C) 1993 by LOGICAL WATER

// Class definitions for Database classes
//                      LWRELATION
//                      LWBASE
//                      LWVERB
//                      LWOBJECT // Date last updated : 17/08/93 ifndef __LWDBASE_H
define __LWDBASE_H

// Classes \\ class LWRelation
{
private:

int RelFlag;

CStack<MNwk*> *WorkStack;

public:

MRel1 RetRel1;
        MRel2 RetRel2;

LWRelation();
    MType* Get1Ord(int VersNo, long int TypeKey);
        int Get1Ord(MType* Rel1);
        int Get1Ord(MType* TA1st, MType* TA2nd);
        int Get1Ord1st(MType* Target);
        int Get1OrdDir(MType* Target, MType* DirChRel, int Dir);
    MType* Add1Ord(MType* OA1st, MType* OA2nd, MType *PriorTA2, MType *NextTA2, int
Mode = -1);
        int Del1Ord(MType* RelType);
    MType* Get2Ord(int VersNo, long int TypeKey);
    MType* Get2Ord(int VersNo, MType* Verb, MType* Obj);
        int Get2OrdDir(MType* Rel2, MNwk* DirTA, int Mode, int Dir);
    MType* Get2OrdHWParent(MNwk* ProcTA, int Mode);
    MType* Get2OrdSubDir(MType* Rel2, MNwk* DirTI, int Dir);
    MType* Get2OrdParent(MType* Rel2);
    MType* Get2OrdChildofRel(MNwk* RelChild, int Mode);
    MType* Add2Ord(int VersNo, MType* Verb, MType* Obj);
        int Del2Ord(MType* Target, int VersNo, MType* Verb, MType* Obj,
                int ForceFlag);
     MNwk* AddTo2Ord(MType* Target, MType* Obj, MNwk* Prior,
                MNwk* Next, MType* NewRel, int Mode);
        int DelFrom2Ord(MType* Target, MNwk* DelRel);
       void Connect2OrdToTI(MType* Verb, MType* Target, MType* New2Ord);
        int Del2OrdTI(MType* Target, int VersNo, MType* Verb, MType* Obj);
long int IsManyRel(MType* PType);
       BOOL IsEmpty2Ord(MType* Target);
       void ResetRelFlag();
     MNwk* Get2OrdRel(long int RelKey)
            {
             return PLWTA->GetNwk(RelKey);
            }
       BOOL HasSubs(MType* Target)
            {
            if (Target->PTI[0] != NULL) {return TRUE;} else {return FALSE;}
            };
       BOOL IsSub(MType* Target)
            {
            if (Target->PTI[1] != NULL) {return TRUE;} else {return FALSE;}
            };
        int IsRelError()
            {
            if (RelFlag != 0) {return TRUE;} else {return FALSE;}
            };
};
```

I claim:

1. A computer-readable medium encoded with a computer program which when executed on a computer directs performance of steps of:
   receiving from a user a first process definition;
   prompting a user of the computer to select of one of two complementary relationships, a first relationship defining how the first process is performed and a second relationship defining why the first process is performed;
   displaying representations of the first and second process definitions in a physical relationship in which the representations are logically connected by an indicator of the selected relationship;
   prompting the user to provide a verb and object that together define a first process;
   prompting the user to provide a verb and object that together define a second process;
   receiving from the user, plural instance of at least one of the first and the second processes; and
   displaying the plural instances in a two dimensional grid having one axis along which the plural instances are arrayed and another axis along which processes bearing the relationship of how are arrayed adjacent to each other, related instances of different processes aligned in a single row.

2. The encoded medium of claim 1, wherein the computer program, when executed on a computer, further directs performance of steps of:
   for at least one instance received, further receiving at least one sub-instance.

3. The method of claim 1, wherein the second process B defines one aspect of how the first process A is performed and a third process C defines another aspect of how the first process A is performed, the second process B defining a process required to be performed before the third process C, representations of the second process B and the third process C connected by an indicator of their sequential relationship, and forming a compound process A.B.C.

4. A computer-implemented method of modeling a task, the method comprising:
   displaying on a display of a computer a first graphical element inviting entry of a first process definition;
   prompting a user of the computer to select of one of two complementary relationships, a first relationship defining how the first process is performed and a second relationship defining why the first process is performed; and
   displaying on the display a second graphical element adjacent to the first graphical element inviting entry of a second process definition related to the first process definition by the selected relationship;
   wherein prompting the user to select further comprises:
      displaying a graphical connector representative of the selected relationship between the first and second graphical elements; and
      displaying a control element which when activated toggles the graphical connector between the two complementary relationships.

5. The method of claim 4, wherein activation of the control element toggles the graphical connector between representing that the second process defines how the first process is performed and representing that the first process defines why the second process is performed.

6. The method of claim 5, wherein the graphical connector indicates a relationship between the first and second graphical elements as perceived by one of the first and second graphical elements, and toggling the graphical connector indicates the relationship as perceived by another of the first and second graphical elements.

7. The method of claim 4, wherein displaying the first graphical element and displaying the second graphical element each further comprises:
   prompting the user to provide a verb and object that together define the process.

8. The method of claim 7, wherein the second process B defines one aspect of how the first process A is performed and a third process C defines another aspect of how the first process A is performed, the second process B defining a process required to be performed before the third process C, representations of the second process B and the third process C connected by an indicator of their sequential relationship, and forming a compound process of A.B.C.

9. The method of claim 7, wherein displaying a first graphical element inviting entry of a first process definition further comprises:
   displaying a graphical control which when activated invites entry of at least one instance of the first process.

10. The method of claim 9, further comprising:
    inviting entry of at least one sub-instance of the instance.

11. The method of claim 9, further comprising:
    inviting promotion of an instance to a process selection field; and
    displaying only those processes relevant to the promoted instance.

12. The method of claim 11, further comprising:
    displaying the instances in a tabular format having rows representative of different instances of the first process and columns representative of the processes, wherein instances of processes other than the first process are associated with corresponding instances of the first process.

13. The method of claim 12, wherein the columns represent the first process, the second process and a third process, and wherein the second process defines how the first process is performed and the third process defines how the second process is performed, and wherein an instance a of the first process is associated with an instance b of the second process which is associated with an instance c of the third process, forming a compound instance a.b.c, the method further comprising:
    disassociating a compound instance b.c, from the instance a.

14. The method of claim 11, further comprising:
    displaying a table for a process, each row of the table containing one instance of the process.

15. The method of claim 14, further comprising:
    selecting one instance of the table; and
    displaying a table of sub-instances of the selected instance.

16. A computer-implemented method of structuring development of a computer model of a task by a user, the method comprising:
    prompting the user to input into a computer a first process definition, the first process being one component of performing the task;
    prompting a user of the computer to select of one of two complementary relationships, a first relationship defining how the first process is performed and a second relationship defining why the first process is performed;
    displaying on a display of the computer representations of the first and second process definitions in a manner indicating the one of the first or second relationship;

receiving from the user plural instances of at least one of the first and the second processes; and displaying the plural instances in a two dimensional grid having one axis along which the plural instances are arrayed and another axis along which processes bearing the relationship of how are arrayed adjacent to each other, related instances of different processes aligned in a single row.

17. The method of claim 16, wherein prompting the user to input the first process definition further comprises:

prompting the user to provide a verb and object that together define the process.

18. The method of claim 16, wherein prompting the user to input the second process definition further comprises:

prompting the user to provide a verb and object that together define the process.

19. The method of claim 16, further comprising:

for at least one instance received, further receiving at least one sub-instance.

20. The method of claim 16, further comprising:

displaying on a computer display a first graphical element inviting entry of a first process definition;

prompting a user to select of one of two complementary relationships, a first relationship defining how the first process is performed and a second relationship defining why the first process is performed; and displaying on a computer display a second graphical element adjacent to the first graphical element inviting entry of a second process definition related to the first process definition by the selected relationship.

21. The method of claim 20, wherein displaying the first graphical element and displaying the second graphical element each further comprise a step of:

prompting the user to provide a verb and object that together define the process.

22. The method of claim 21, wherein displaying a first graphical element inviting entry of a first process definition further comprises:

displaying a graphical control which when activated invites entry of at least one instance of the first process.

23. The method of claim 22, further comprising:

inviting entry of at least one sub-instance of the instance.

24. The method of claim 22, further comprising:

inviting promotion of an instance to a process selection field; and displaying only those processes relevant to the promoted instance.

25. The method of claim 24, further comprising:

displaying the instances in a tabular format having rows representative of different instances of the first process and columns representative of the processes, wherein instances of processes other than the first process are associated with corresponding instances of the first process.

26. The method of claim 25, wherein the columns represent the first process, the second process and a third process, and wherein the second process defines how the first process is performed and the third process defines how the second process is performed, and wherein an instance a of the first process is associated with an instance b of the second process which is associated with an instance c of the third process, forming a compound instance a.b.c, the method further comprising:

disassociating a compound instance b.c from the instance a.

27. The method of claim 24, further comprising:

displaying a table for a process, each row of the table containing one instance of the process.

28. The method of claim 27, further comprising:

selecting one instance of the table; and displaying a table of sub-instances of the selected instance.

29. A computer implemented method of structuring development of a computer model of a task by a user, the method comprising:

prompting the user to input into a computer a first process definition, the first process being one component of performing the task;

prompting a user of the computer to select of one of two complementary relationships, a first relationship defining how the first process is performed and a second relationship defining why the first process is performed; and displaying on a display of the computer representations of the first and second process definitions in a manner indicating the one of the first or second relationship;

wherein prompting a user to select further comprises:

displaying a graphical connector representative of the selected relationship between the first and second graphical elements; and displaying a control element which when activated toggles the graphical connector between the two complementary relationships.

30. The method of claim 29, wherein activation of the control element toggles the graphical connector between representing that the second process defines how the first process is performed and representing that the first process defines why the second process is performed.

31. The method of claim 30, wherein the graphical connector indicates a relationship between the first and second graphical elements as perceived by one of them, and toggling the graphical connector indicates the relationship as perceived by another of them.

32. A method of presenting on a display medium a model of a task including representations of a plurality of processes, the method comprising:

arranging the representations in such a manner on the display medium that it is evident from the arrangement when a first process defines at least one aspect of how a second process is performed and when the second process defines at least one aspect of why the first process is performed;

including in the representations, instances of the plurality of processes, thus defining what one of the processes are modeled; and displaying a table of instances associated with one of the plurality of processes;

wherein displaying the table further comprises:

arranging along one axis of the table the plurality of processes, the first and second processes located in adjacent relationship to each other; and arranging along another axis of the table the instances.

* * * * *